(12) United States Patent
Ghercioiu et al.

(10) Patent No.: US 7,647,562 B2
(45) Date of Patent: Jan. 12, 2010

(54) DEPLOYMENT AND EXECUTION OF A GRAPHICAL PROGRAM ON AN EMBEDDED DEVICE FROM A PDA

(75) Inventors: Marius Ghercioiu, Austin, TX (US); Horea Hedesiu, Cluj. Napora (RO); Silviu Folea, Cluj-Napoca (RO); Gratian I. Crisan, jud Cluj (RO); Ciprian Ceteras, Baia Mare (RO); Ioan Monoses, Gherla jud Cluj (RO)

(73) Assignee: National Instruments Corporation, Austin, TX (US)

( * ) Notice: Subject to any disclaimer, the term of this patent is extended or adjusted under 35 U.S.C. 154(b) by 926 days.

(21) Appl. No.: 10/733,735

(22) Filed: Dec. 11, 2003

(65) Prior Publication Data

US 2004/0199897 A1 Oct. 7, 2004

Related U.S. Application Data

(60) Provisional application No. 60/459,918, filed on Apr. 3, 2003.

(51) Int. Cl.
*G06F 3/048* (2006.01)
*G06F 3/01* (2006.01)

(52) U.S. Cl. .................. 715/763; 715/749; 715/762; 715/771; 709/231

(58) Field of Classification Search ......... 715/762–763, 715/771; 714/36–38, 4, 25; 707/500, 103 R, 707/103 Y; 709/201, 218, 224, 212, 219, 709/228, 231; 702/119
See application file for complete search history.

(56) References Cited

U.S. PATENT DOCUMENTS

| | | | |
|---|---|---|---|
| 5,481,741 A | 1/1996 | McKaskle et al. | |
| 5,724,074 A * | 3/1998 | Chainani et al. | 345/474 |
| 5,760,788 A * | 6/1998 | Chainini et al. | 345/474 |
| 5,920,479 A * | 7/1999 | Sojoodi et al. | 700/86 |
| 6,173,438 B1 * | 1/2001 | Kodosky et al. | 717/109 |
| 6,199,196 B1 * | 3/2001 | Madany et al. | 717/165 |
| 6,270,271 B1 * | 8/2001 | Fujiwara | 400/693 |
| 6,282,699 B1 * | 8/2001 | Zhang et al. | 717/109 |
| 6,751,787 B1 * | 6/2004 | Blaszczak et al. | 717/105 |
| 6,880,147 B1 * | 4/2005 | Pauly | 717/104 |
| 7,020,701 B1 * | 3/2006 | Gelvin et al. | 709/224 |

(Continued)

*Primary Examiner*—Ba Huynh
*Assistant Examiner*—Nicholas Augustine
(74) *Attorney, Agent, or Firm*—Meyertons Hood Kivlin Kowert & Goetzel, P.C.; Jeffrey C. Hood; Mark S. Williams

(57) ABSTRACT

System and method for deploying and executing a program, e.g., a graphical program, on an embedded device, e.g., a compact sensor interface (CSI) that includes or is coupled to one or more sensors. The program is stored on a host mobile computer, e.g., a PDA, then downloaded to the CSI over a wired or wireless serial link, e.g., cable, infrared (IR), Bluetooth, etc. The embedded device executes the graphical program to perform the function, thereby generating data. The data is sent to the mobile computer over a wired or wireless serial link, e.g., via a Front Panel Protocol, where the data is displayed. Alternatively, the mobile computer executes a different program to perform a discovery operation to detect and establish communications with the embedded device, retrieves the data from the embedded device via a wireless serial transmission medium, e.g., IR link (e.g., IrDA), Bluetooth, etc., and displays the data.

24 Claims, 34 Drawing Sheets

U.S. PATENT DOCUMENTS

| | | | |
|---|---|---|---|
| 7,061,381 B2 * | 6/2006 | Forcier et al. | 340/572.2 |
| 7,120,874 B2 * | 10/2006 | Shah et al. | 715/733 |
| 7,197,743 B2 * | 3/2007 | Borg et al. | 717/120 |
| 7,202,861 B2 * | 4/2007 | Lynggaard | 345/179 |
| 7,206,824 B2 * | 4/2007 | Somashekar et al. | 709/220 |
| 7,406,393 B2 * | 7/2008 | Ely et al. | 702/150 |
| 7,484,008 B1 * | 1/2009 | Gelvin et al. | 709/249 |
| 2001/0034879 A1 * | 10/2001 | Washington et al. | 717/1 |
| 2002/0055947 A1 | 5/2002 | Schultz et al. | |
| 2002/0080174 A1 * | 6/2002 | Kodosky et al. | 345/762 |
| 2003/0014615 A1 * | 1/2003 | Lynggaard | 712/220 |
| 2003/0035004 A1 * | 2/2003 | Dove et al. | 345/762 |
| 2003/0036875 A1 * | 2/2003 | Peck et al. | 702/127 |
| 2004/0004637 A1 | 1/2004 | Ghercioiu et al. | |
| 2004/0005859 A1 | 1/2004 | Ghercioiu et al. | |
| 2004/0010734 A1 * | 1/2004 | Ghercioiu et al. | 714/38 |

* cited by examiner

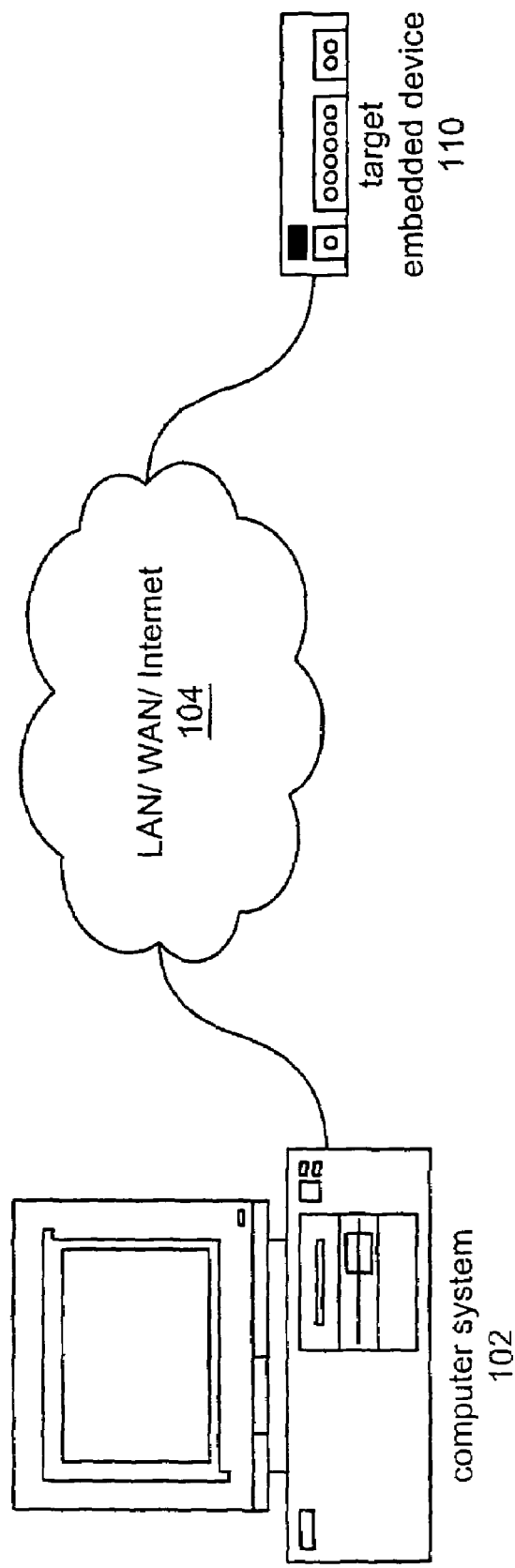

| Plane | Size (Bytes) |
|---|---|
| A | 8K |
| A | 8K |
| A | 8K |
| A | 8K |
| A | 8K |
| A | 8K |
| A | 8K |
| A | 8K |
| A | 64K |
| A | 64K |
| A | 64K |
| A | 64K |
| A | 64K |
| A | 64K |
| A | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |
| B | 64K |

- afu matchbox symbols (9151 bytes)
- matchbox (141224 bytes)
- running VIs (read-only sections)
- stored flat object

FIG. 16

Front Panel Protocol communication from CBSI to PDA front panel chart

DEPLOYMENT AND EXECUTION OF A GRAPHICAL PROGRAM ON AN EMBEDDED DEVICE FROM A PDA

PRIORITY DATA

This application claims benefit of priority of U.S. Provisional Application Ser. No. 60/459,918 titled "Deployment and Execution of a Graphical Program on an Embedded Device From a PDA" filed Apr. 3, 2003, whose inventors were Marius Ghercioiu, Horea Hedesiu, Silviu Folea, Gratian I. Crisan, Ciprian Ceteras, and loan Monoses.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to the field of programming, and more particularly to a system and method for deploying and executing a program, such as a graphical program, on an embedded device from a mobile computer.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the user interface may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

In parallel with the development of the graphical programming model, embedded measurement and control systems have been developed for a wide variety of applications, such as automated manufacturing and remote data collection, among others. However, in many prior art systems it is often the case that the memory footprint of an application, e.g., a program, e.g., a graphical program, is too large to be stored and executed on an embedded device. This situation may be exacerbated by the fact that an execution system and/or operating system required to execute the application may also have a relatively large footprint in the target embedded device, thereby limiting further the applications which may be run on the device.

Many embedded systems operate in conjunction with computer systems, e.g., where a GUI executing on the computer system provides an interface for the application executing on the embedded device. However, such systems have typically utilized workstations or personal computers, and thus have limited mobility.

Therefore, improved systems and methods are desired for deploying and executing programs on embedded devices.

SUMMARY OF THE INVENTION

One embodiment of the present invention comprises a system and method for deploying and executing a program, e.g., a graphical program, on an embedded device. The system may include a host computer system coupled to a target embedded device over a network or other transmission means. The program may be created on the computer system and transmitted to the embedded device for execution.

In one embodiment, the program that is created on the computer system may require use of an execution system to execute the program. For example, the program may require an operating system or similar software to execute. As another example, in one embodiment, the program is a graphical program and requires a graphical program execution system to execute. Due to the small allowable footprint of the target device, in one embodiment, the program execution system is configured in such a way so as to only transmit the minimum amount of the program execution system (e.g., a portion of a modular callback system) actually required by the program that is being executed. Thus, in one embodiment, the program execution system is partitioned into a (minimal) base execution system, and a plurality of components for enabling execution of different program functionality. The base portion of the program execution system may only be capable of executing the very simplest commands. This minimal system may comprise the smallest set of commands which allows the other components to be executed. The base portion of the program execution system may be stored on the target device, and only the required components (as determined based on the program to be executed) may be transmitted to the target device, e.g., on an as-needed basis.

In one embodiment, when the program is developed by the user, a software program executing on the computer may operate to analyze the program to determine the functionality contained in the program. Once the functionality of the program has been identified, the program uses the functionality to determine which of the respective components of the program execution system are actually required by the program. In one embodiment, the method determines the functionality of the program, and uses the functionality to index into a data structure or look-up table to determine which program execution system components will be required to execute this program. When the program is then transmitted or deployed to target device, the computer system may operate to only provide the program execution system base portion (if the base portion is not already resident on the target device) and the respective components that are actually required to execute the program. Thus, a smaller amount of execution system code may be transmitted to the target device. This allows a smaller footprint for one or more of the target devices and/or the sensor devices. In other words, the target device may include a smaller processor and/or a smaller memory medium since a full program execution system is not required to be transmitted.

In one embodiment, after the software program analyzes the program to determine the functionality contained in the program, an execution system analysis program may determine which execution system components are required for execution of the program. A deployment program may then assemble the required components of the execution system and the program, for example, by interspersing the required execution system components and the program together according to the order of execution of the program. These interspersed program execution system components and program may then be assembled into a file (e.g., a flatfile or "deployment file"), and respective portions of the file may be transmitted to the target device for execution. The file may optionally be compressed prior to transmission.

In one embodiment, the flatfile may be received by the target device and used to construct a combined program including executable code from the program and executable code from the required execution system. This combined program may then be executed by the embedded device. The combined program may also be stored in non-volatile memory of the embedded device for subsequent execution.

In one embodiment, successive portions of the file may be streamed to the target device and/or sensor device for dynamic execution. In other words, the target device may execute the program as it is streamed to the device. For example, the device may receive a first portion of the file comprising a first portion of a program to be executed and a first portion of the execution system components that are used for executing this first portion of the program. After this first portion of the program has been executed along with the first portion of the execution system components, the first portion of the program may be flushed or removed from the memory of the sensor device. In a similar manner, the execution system components that are no longer required may be also removed from the memory. However, execution system components that may be required by other portions of the program to be executed may be retained in the memory for execution. In one embodiment, the deployment program determines which execution system components may be required for a plurality of different portions of the program, and includes a variable or data structure or other indication with the execution system component to indicate that this component should not be flushed immediately after it has been executed, but rather should be retained by the target device for execution with another part of the program. Thus, the target device may maintain a type of "component buffer" for temporarily storing execution system components that are required later by other parts of the program (or by subsequent programs to be executed).

After the first portion of each of the program execution components and the program has been executed, the computer system and/or target device may then provide a second portion of the program interspersed with the second portion of the execution system components. The second portion of the file may be provided by the computer system to the target device. Operation then proceeds as above. Thus, for example, the computer system may operate to provide respective portions of the deployment file to the target device for execution on an as needed basis, based on the memory availability or memory capacity of the target device. The target device may receive a portion of the program that it is supposed to execute along with the execution system components used by that portion of the program, execute the program under direction of the execution system components, and then receive further portions of the deployment file, and so forth. Thus, the computer system may essentially provide a stream of the program and its corresponding execution system components to the target device according to the order of execution of the program.

BRIEF DESCRIPTION OF THE DRAWINGS

A better understanding of the present invention can be obtained when the following detailed description of the preferred embodiment is considered in conjunction with the following drawings, in which:

FIGS. 1A and 1B illustrate embodiments of a system for execution of a program in a minimal embedded system;

FIG. 16 illustrates a CSI flash memory map, according to one embodiment;

Figure 1B:
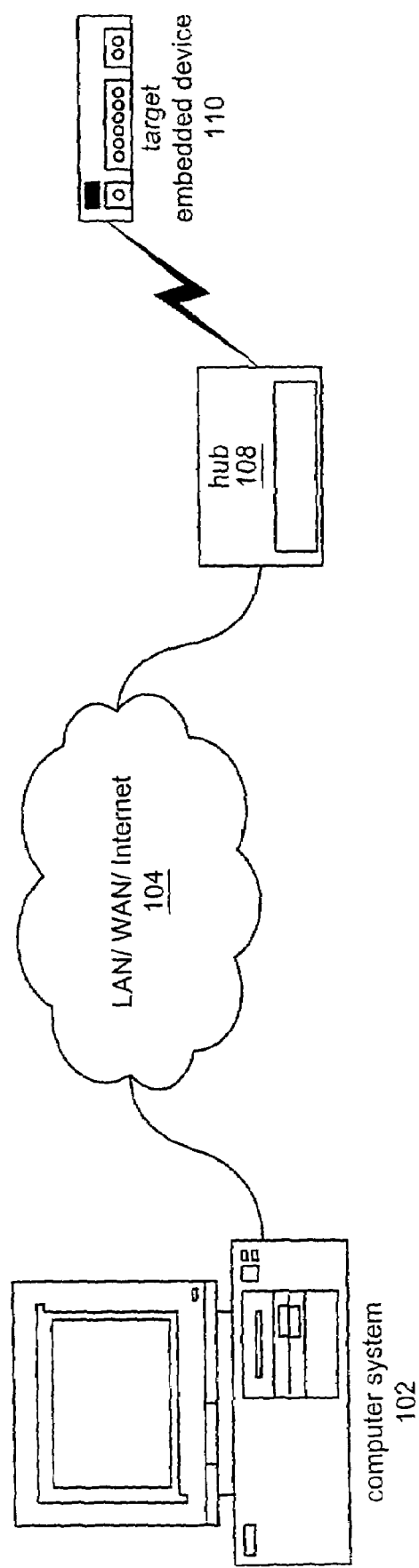

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

U.S. patent application Ser. No. 10/283,758, titled "Wireless Deployment/Distributed Execution of Graphical Programs to Smart Sensors", filed Oct. 10, 2002

U.S. Provisional Application Ser. No. 60/459,918 titled "Deployment and Execution of a Graphical Program on an Embedded Device From a PDA" filed Apr. 3, 2003.

The LabVIEW graphical programming manuals, including the "G Programming Reference Manual", available from National Instruments Corporation, are also hereby incorporated by reference in their entirety.

FIGS. 1A and 1B—Embedded Systems

FIGS. 1A and 1B illustrate embodiments of an embedded system for executing programs. As shown in FIG. 1A, the system may include a computer system 102 coupled through a network 104 (or other transmission medium) to an embedded device 110, also referred to as a target device 110. In other embodiments, such as illustrated in FIG. 1B, the computer system 102 may be coupled to the target device 110 via an intermediate hub 108, which may communicate with the computer system 102 over the network 102, and which may communicate with the target device 110 via wireless means.

The computer system 102 may be any of various types of computer systems. Computer system 102 may include a processor, a memory medium, as well as other components as may typically be found in a computer system. The memory medium of the computer system may store a program development environment for creating programs. The computer system 102 is described in more detail below with reference to FIG. 3. As used herein, the term program is intended to include text-based or graphical instructions which are executable, compilable, and/or interpretable by a processor or programmable hardware element (such as a Field Programmable Gate Array (FPGA)) to perform a specified function or functions.

In one embodiment, the program development environment is a graphical program development environment for creating graphical programs. An exemplary graphical program development environment is the LabVIEW development environment offered by National Instruments Corporation. A user may create a program on a computer system, and computer system 102 may provide the program to target embedded device 110, optionally via hub device 108.

Target device 110 may include a processor and memory medium for executing programs, such as graphical programs. In one embodiment, the target device 110 executes programs, e.g., graphical programs, received from the computer system over the network 104. In another embodiment, the computer system 102 sends the program to the hub device 108 over the network 104, and the hub device 108 operates to deploy the programs to the target device 110 in a wireless fashion, and the program executes on target device 110. It should be noted that in various embodiments, the target device 110 may be implemented in different devices, such as, for example, a device with an ARM processor, as described below, a PXI chassis which includes an embedded device card, or any other processor based device suitable for embedded systems. One exemplary target device 110 is a smart sensor (e.g., a smart camera).

In one embodiment, the target device 110 may include a programmable hardware element, such as an FPGA. The target device 110 may be operable to receive a hardware configuration file, e.g., a netlist, which encodes a desired functionality, and to deploy the hardware configuration file to the FPGA, thereby configuring the FPGA to perform the desired functionality.

Target device 110 may be connected to computer system 102 by a network 104 as shown. The network may be comprised of any of the various types of networks including local area networks (LAN), wide area networks (WAN), etc. One example of a wide area network is the Internet. Target device 110 may also connect to computer system 102 through other communication mediums, such as a serial bus, e.g., USB or IEEE 1394, a parallel bus, or through wireless means. The wireless communication mechanism may comprise any of various types of wireless transmission, including Blue Tooth, IEEE 802.11 (wireless Ethernet), RF communication, and other types of wireless communications, such as, for example, communication via satellite, and cell towers, such as used for cellular telephone communication, among others. In various embodiments, the target device 110 may include or may be coupled to one or more sensors or actuators. For example, the target device may include a radio and may be coupled to a sensor via wireless means. In one embodiment, one or more of the sensors coupled to the target device 110 may be smart sensors, i.e., may include a processor and memory (and/or a programmable hardware element, such as an FPGA), and therefore may be operable to execute program code and/or receive commands from the target device 110 as a result of execution of the program code.

Embedded Devices

As mentioned above, in various embodiments of the present invention, an embedded device 110 may be coupled to the host computer 102. As used herein, the term "embedded device" refers to a small platform which includes dedicated hardware, and which includes a processor and memory (or FPGA) on which may be installed dedicated programs or software. An embedded device is typically designed to perform a defined task very well. In particular, an embedded device is typically not a device with general capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. An example of an embedded system is an Internet remote camera, with dedicated hardware and software that implements the following tasks:

it acquires images from the optical device, it compresses these images as GIF or JPEG files, or perhaps as MPEG streams, and it sends the images to a host computer upon request, using TCP/IP, HTTP, or multimedia streams.

Other examples of embedded devices include a measurement device with a specific type of measurement hardware and/or software for taking certain measurements, a control measurement device with a specific type of hardware and/or software for performing certain control operations, etc.

The end user does not care about how these tasks are implemented, but only wants a device that sends real-time images over the Internet. Embedded systems are often used as building blocks for more complicated applications. Thus, an embedded device generally includes both hardware and software. Additionally, embedded devices are generally built around a specialized hardware component, which is the "reason to exist" for these devices (like the camera in the above example). Other typical components include: a processor, such as an ARM processor, RAM and ROM memory, a storage medium, a display, one or more communication devices, and power and over-voltage protection components. Generally, flash memory is used for data storage in addition to RAM.

Figure 2:
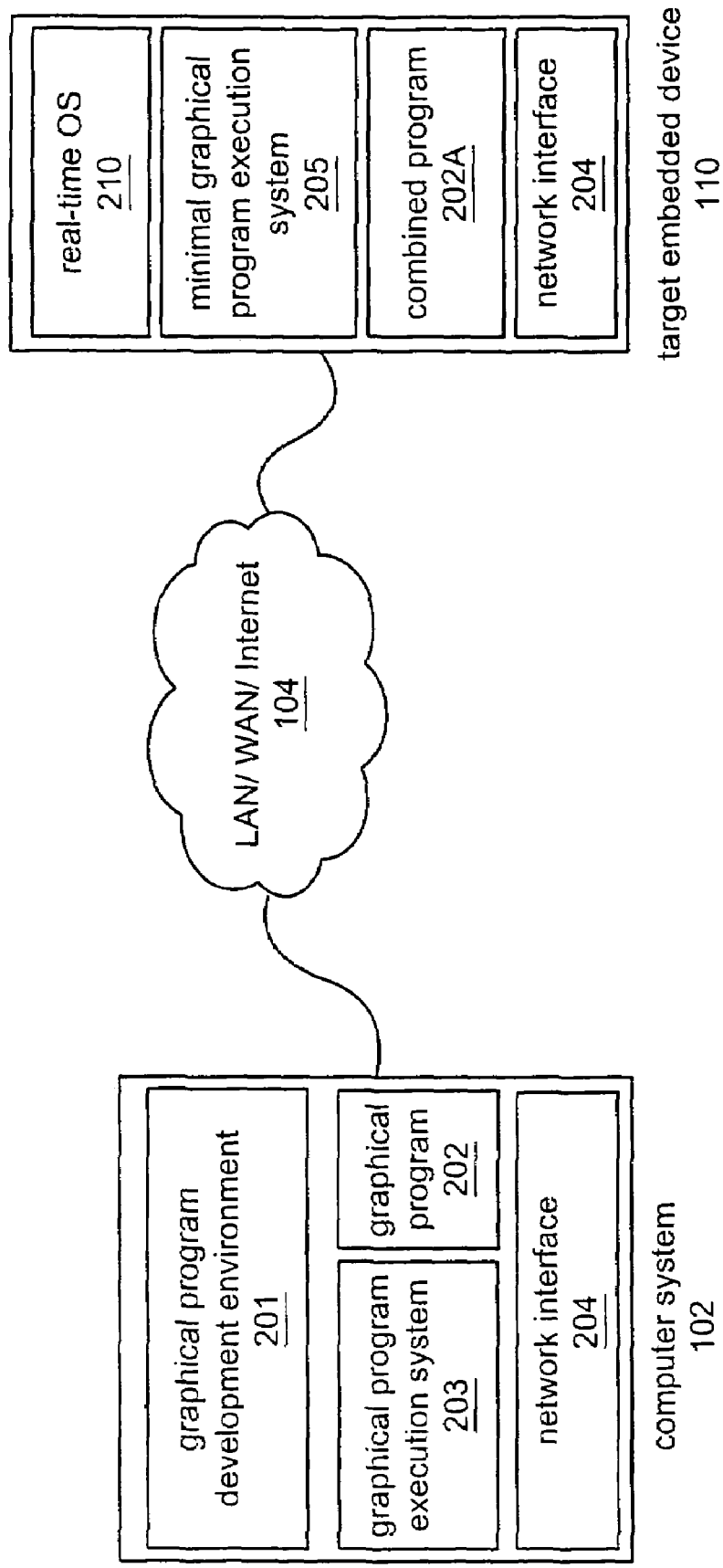
FIG. 2 is a block diagram of the system of FIGS. 1A, according to one embodiment.

FIG. 2—Block Diagram of the Data Acquisition System

FIG. 2 is a block diagram of the system of FIG. 1A, according to one embodiment. In the embodiment shown in FIG. 2, the computer system 102 includes a program development environment 201, e.g., a graphical program development environment, which facilitates development of programs, e.g., graphical programs, for implementing desired functions or operations, as well as a program execution system 203, also referred to as the execution system 203. The execution system 203 may be operable to execute programs developed with the program development environment 201 (or other program development environments).

As used herein, the term "execution system" may include at least one software program that is designed to execute a certain class of programs. For example, LabVIEW programs utilize an execution system (a LabVIEW graphical program execution engine) that executes in a system in order to execute LabVIEW graphical programs.

As will be described in more detail below, the execution system 203 may include a componentized or modular architecture, e.g., a componentized callback system, stored on the computer system for partial transfer to an external device, e.g., the target device 110. In other words, the functions of the execution system 203 may be organized into modular components which may be operable to be transferred entirely or in part to the target embedded device 110 to facilitate execution of programs on the target embedded device 110. In many of the embodiments described herein, the systems and methods are described in terms of graphical programs, although it should be noted that the invention is broadly applicable to other types of programs as well, e.g., text-based programs, etc., and is not intended to be limited to graphical programs.

As FIG. 2 also shows, the computer system 102 may also store one or more programs 202 (e.g., graphical programs) which are executable via the execution system 203 (or portions thereof) to perform specified functions or operations, as desired. In the embodiment shown, the graphical program 202 may be stored for transferal to the target embedded device 110 for execution. As will also be described in more detail below, various components of the execution system 203 may be combined with respective portions of the graphical program 201 for transferal to the target device 110 for execution. The computer system 102 may also include a network interface 204 for communicating over the network 104 with devices on the network 104. For example, the network interface 204 may be an Ethernet interface for communicating over the Internet 104. Further details of the computer system 102 are provided below with reference to FIG. 3.

In an alternate embodiment, the graphical program 201 may be provided from a first computer, and components of the execution system 203 necessary for execution of this graphical program may be provided from a second different computer system.

In the embodiment of FIG. 2, the target device 110 includes an operating system 210, e.g., a real-time operating system (OS), for managing program execution, managing device resources, and communications in embedded devices, as is well known in the art. Examples of real-time operating systems 210 include, but are not limited to, Linux, NetBSD, vxWorks, eCos, and Windows CE. Due to size and performance issues, the eCos real-time operating system may be particularly suitable for use in the embedded target device 110, although other real-time operating systems are also contemplated. The target device 110 may also include a target execution system (or "minimal execution system") 205, which preferably is a minimal embedded graphical program execution system 205, and which may include a subset of the execution system 203 stored on the computer system 102, mentioned above. The minimal execution system 205 may be optimized to minimize the memory footprint on the target device 110, as described below with reference to FIG. 5. In one embodiment, the minimal execution system 205 may comprise an execution system virtual machine. The minimal execution system 205 may facilitate execution of graphical program(s) 202 by the target device 110. More specifically, the graphical program 202 stored on the computer system 102 may be combined with one or more components of the componentized callback system of execution system 203 to generate a flatfile 207 which may be transferred to the target embedded device 110. The flatfile 207 may be directly executable by the target device 110. Alternatively, the flatfile 207 may be used in constructing a combined program 202A on the target device 110, wherein the combined program 202A may be executed on the target device 110. The flatfile 207 and the combined program 202A are described in detail below. The target embedded device 110 may also include software for performing various functions related to the present invention, such as a program linker/loader, which in various embodiments may be comprised in the real-time OS, the minimal execution system 205, or may be stored and executed as a separate program. The structure and processing of the flatfile 207 according to one embodiment are described in detail below with reference to FIGS. 11A-11C.

Figure 3:
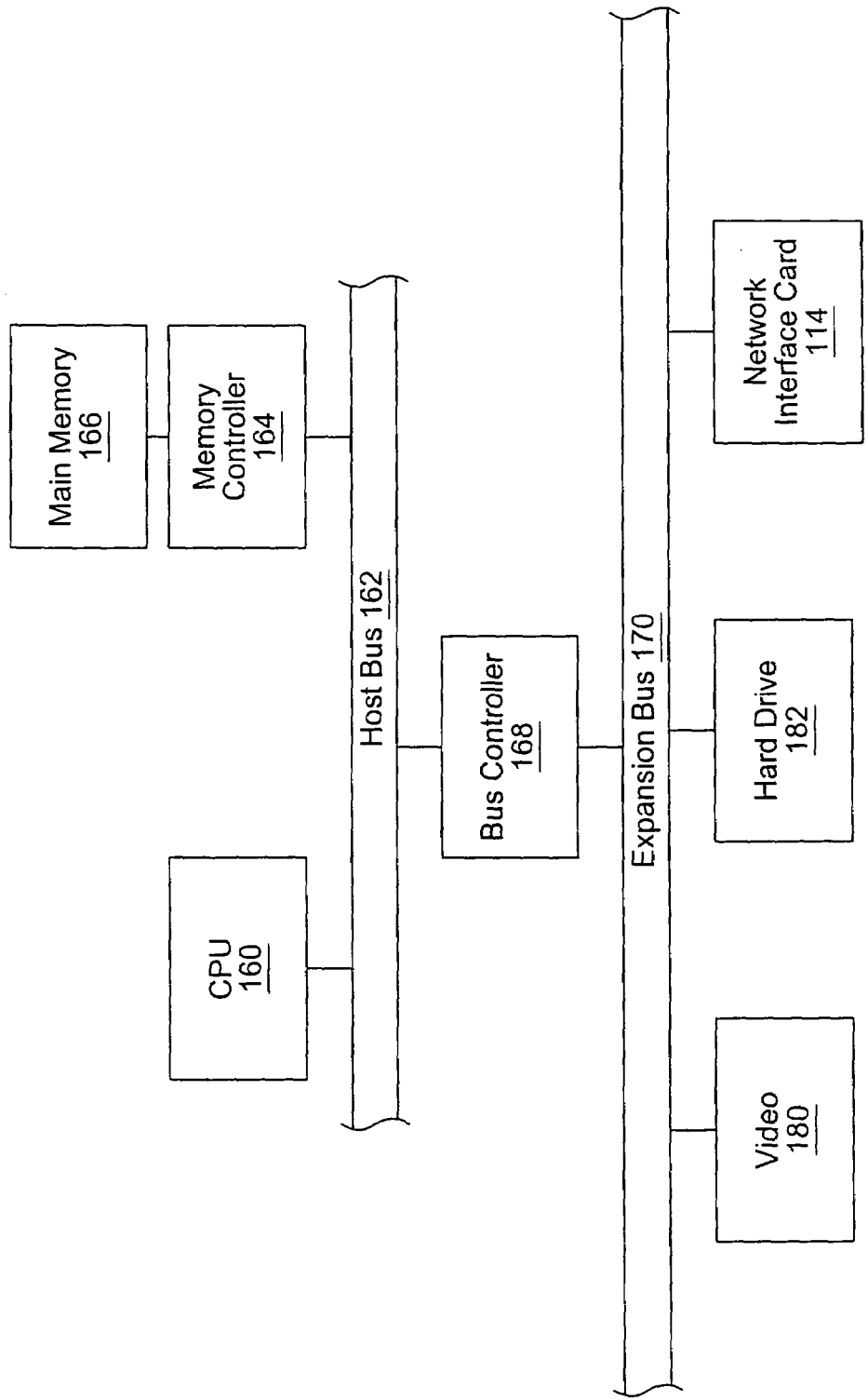
FIG. 3 is a block diagram of the computer system of FIGS. 1A, 1B, and 2, according to one embodiment.

FIG. 3—Computer System Block Diagram

FIG. 3 is a block diagram for a computer system 102 suitable for implementing various embodiments of the present invention. More specifically, the computer system 102 may be operable to store and download to the target device 110 a graphical program that is configured to perform a specified function. Embodiments of a method for transmitting and executing the graphical program are described below. The computer system 102 may be any type of computer system, including a personal computer system, mainframe computer system, workstation, network appliance, Internet appliance, personal digital assistant (PDA), laptop computer, tablet computer, television system or other device. In general, the term "computer system" can be broadly defined to encompass any device having at least one processor that executes instructions from a memory medium. The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others.

The computer system 102 may include a memory medium(s) 166 on which one or more computer programs or software components according to one embodiment of the present invention may be stored. For example, the memory medium may store a graphical program execution system, as well as one or more graphical programs, as described above. Also, the memory medium may store a graphical programming development environment application used to create and/or execute such graphical programs. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

As FIG. 3 shows, the memory medium 166 may be coupled to the host bus 162 by means of memory controller 164. The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices, such as a network interface card 114, a video display subsystem 180, and hard drive 1102 coupled to the expansion bus 170.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface operates as a front panel, wherein the user can interactively control or manipulate the input being provided to the graphical program during program execution and can view resulting output.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

Figure 4A:
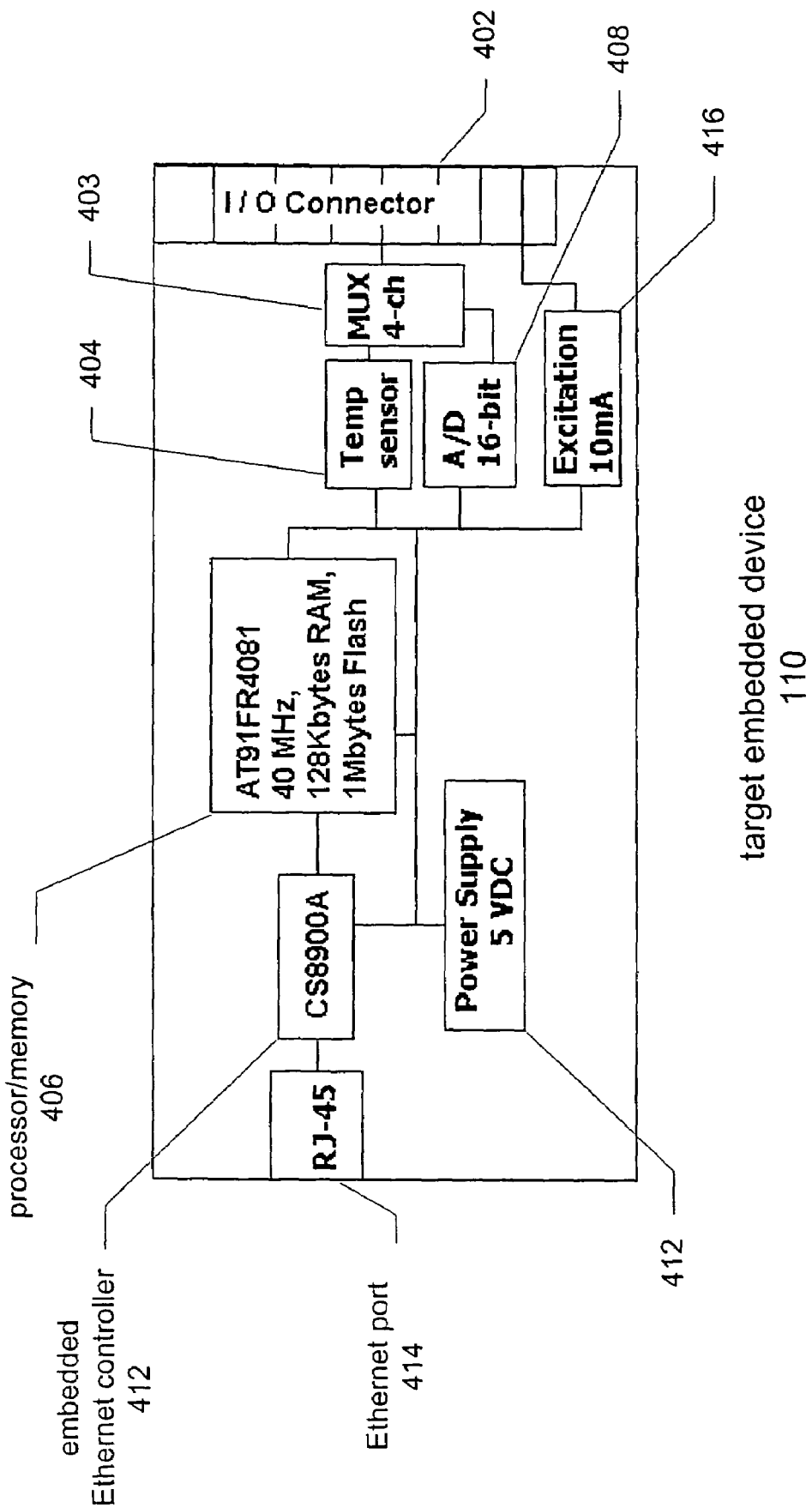
FIG. 4A is a hardware layout of a minimal embedded system, according to one embodiment.

FIG. 4A—Embedded Device Hardware Configuration

FIG. 4A illustrates a hardware configuration of one embodiment of a target embedded device, as shown in FIGS. 1A, 1B, and 2. It should be noted that the embodiment shown is intended to be exemplary only, and is not meant to limit the target embedded device to any particular architecture, components, size, or form.

In the embodiment shown in FIG. 4, the target embedded device 110 may include an I/O connector 402 coupled to a 4-channel multiplexer (MUX) 402, connected to a 4-channel 16-bit ADC 408, a temperature sensor 404, a micro-controller with internal flash program memory and data SRAM 406, and Ethernet port 414. In this embodiment, power is provided by a 5 volt DC power supply 412. The processor 406, an ATMEL ARM Thumb AT91FR4081, has a high-performance 32-bit RISC architecture with high-density 16-bit instruction set and very low power consumption. By combining the micro-controller, featuring 136 Kbytes on on-chip SRAM and a wide range of peripheral functions, with 8 Mbits of Flash memory in a single compact 120-ball BGA package, the Atmel AT91FR4081 406 provides a powerful, flexible, and cost-effective solution to the minimal embedded control application. Significant board size reduction is also noted as a benefit.

Figure 4B:
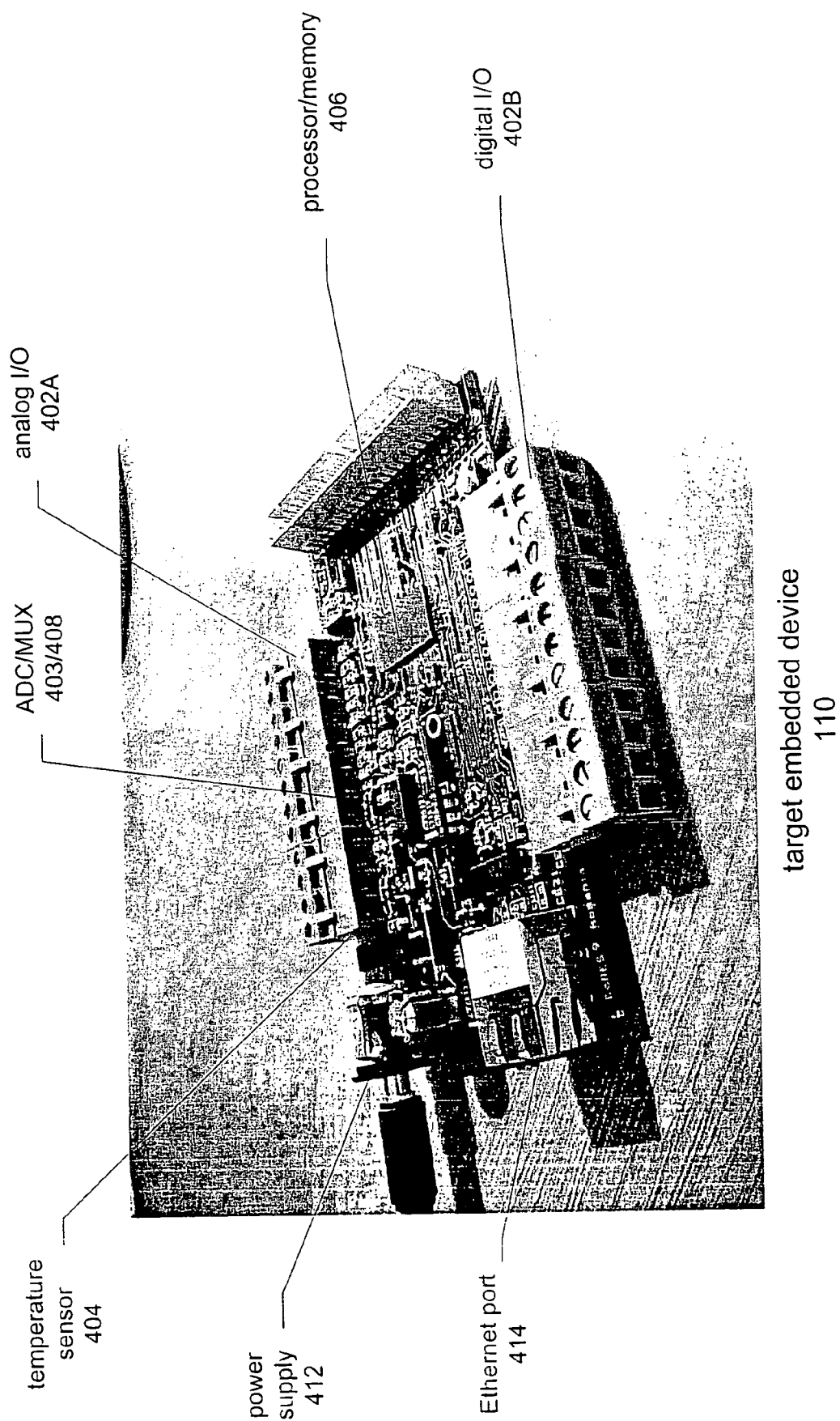
FIG. 4B illustrates the embedded target device of FIG. 4A, according to one embodiment.

FIG. 4B—Embedded Device Hardware

FIG. 4B illustrates the embedded hardware of FIG. 4A, according to one embodiment. As FIG. 4B shows, the hardware components included in the target embedded device 110 facilitate an extremely compact form factor.

Figure 4C:
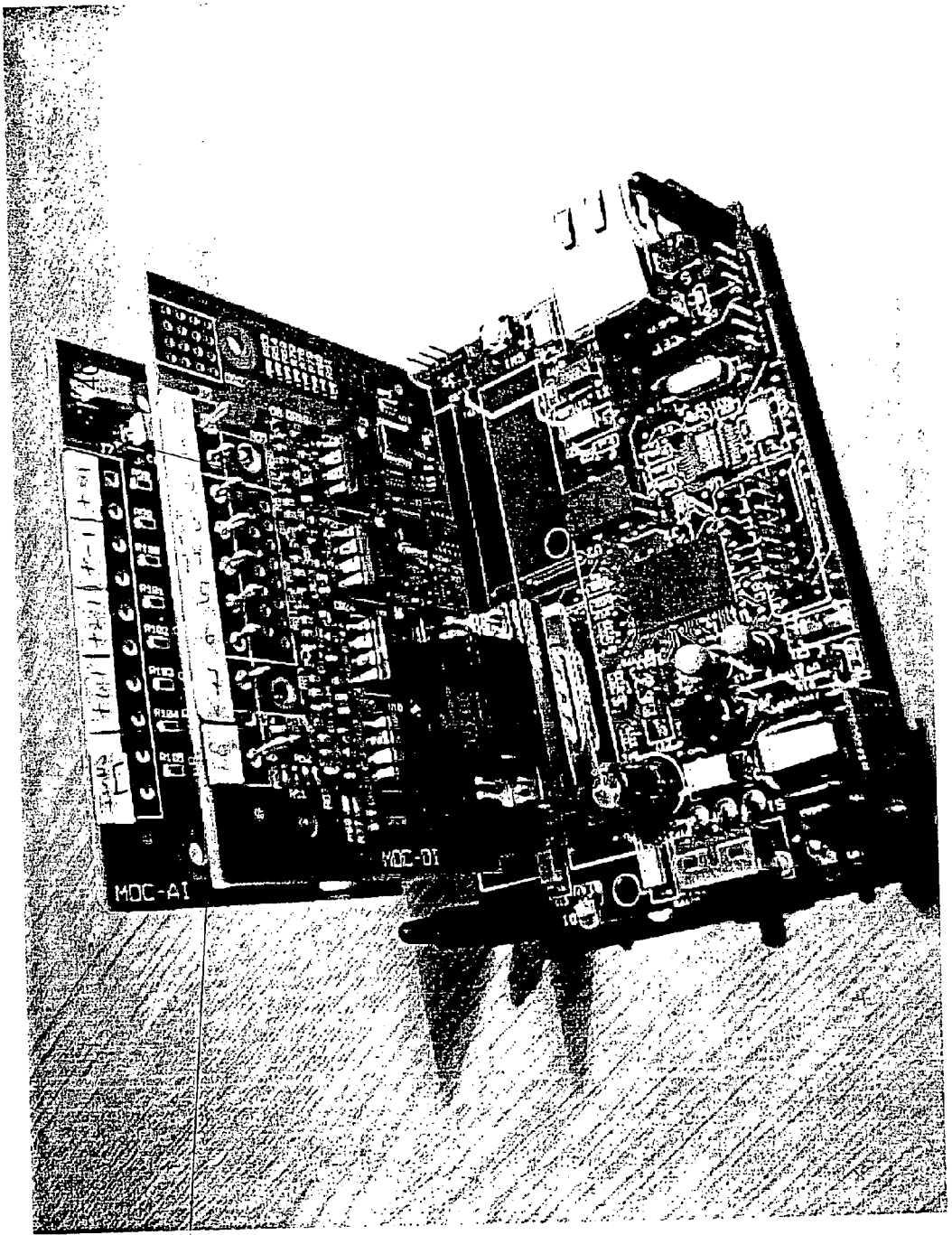
FIG. 4C illustrates another example of an embedded target device, according to one embodiment.

FIG. 4C—Another Example of Embedded Device Hardware

FIG. 4C illustrates another embodiment of the embedded target device 110, according to one embodiment. As FIG. 4C shows, in this embodiment, substantially all of the functionality included on the board is modular. For example, different I/O boards 420 may be selected and plugged-in depending on the type of sensors required by the application. In this embodiment, components which may be provided by additional modules (e.g., cards) have been remove, such as the temperature sensor 404 and the ADC 408. In this embodiment, a micro-controller with internal 1 MB of flash program memory and 128 kb of data SRAM is connected via SPI (serial peripheral interface) to an analog small form-factor DAQ slot, and is further connected via a digital bus to a digital small form-factor DAQ slot. This embodiment may be particularly suited for smart sensing, computing, and control, due to the design emphasis on modularity.

In all of the embodiments shown above, it is noted that only necessary acquisition and processing code is packaged and downloaded onto the embedded device (using the flatfile). An approach for generating this minimized code is described below with reference to FIGS. 5-9.

Figure 5:
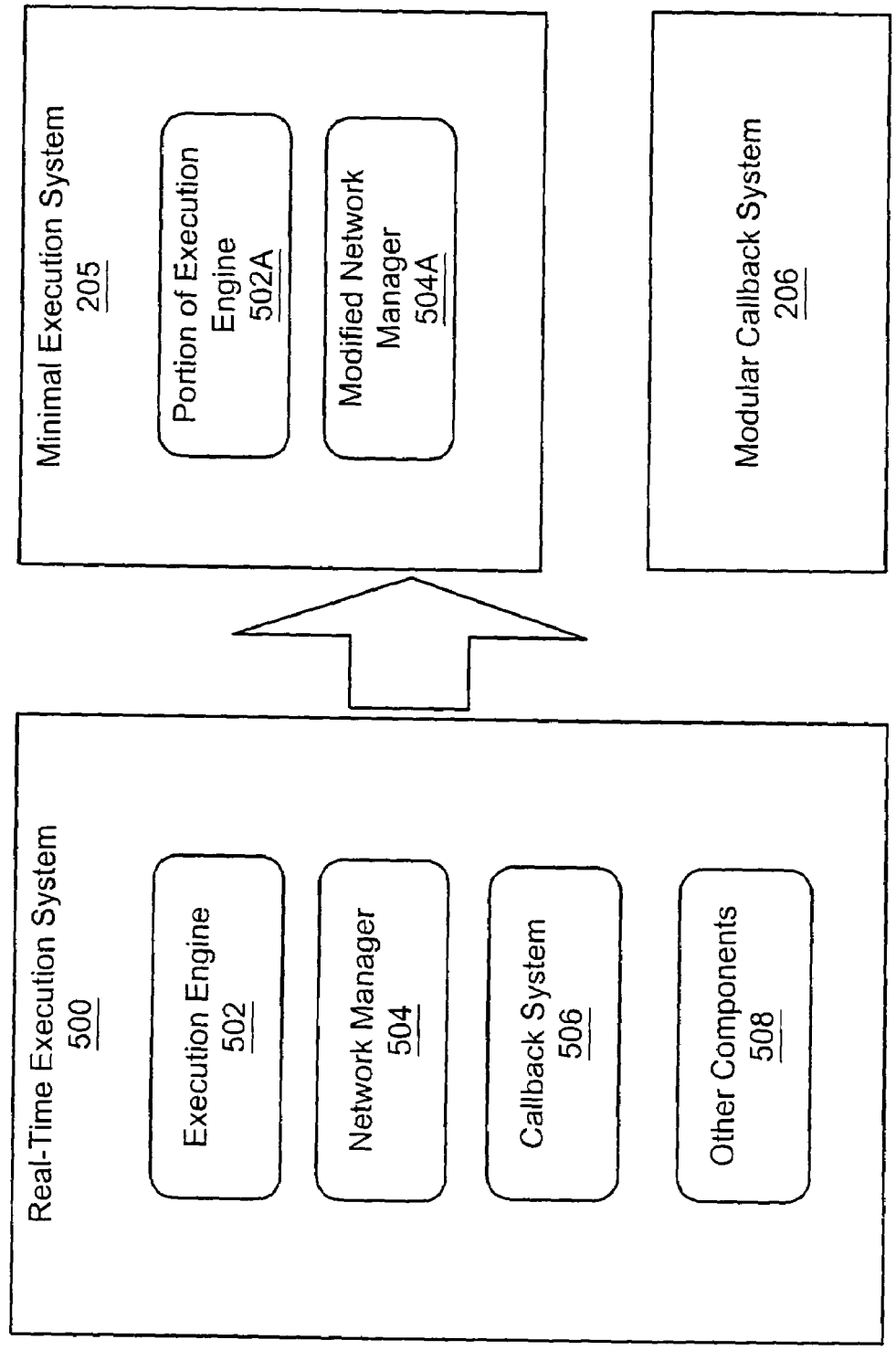
FIG. 5 illustrates a minimal execution system, according to one embodiment.

FIG. 5—Minimal Execution System

FIG. 5 illustrates the determination of a reduced or minimal set of functionality needed to execute graphical programs. This minimal set is included in the minimal graphical program execution system 205 which is installed on the target embedded device 110, and which operates to execute the (combined) graphical program (via the graphical program flatfile 207) on the target device 110. The term "minimal" is not used FIG. 5 compares a minimal graphical program execution system 205 with an un-optimized (for small memory footprint) graphical program execution system 500. As FIG. 5 shows, the graphical program execution system 500 may include an execution engine 502, a network manager 504, a callback system 506, and other components 508. In a typical graphical program execution system, there may be as many as (or more than) 30 components, and so the execution system may be quite large. Such a system may operate under a real-time OS, such as Linux, which has a size of roughly 1.5 MB (mega-bytes). In this typical graphical program execution system, the amount of available memory may be quite large, and hence there is typically no need to reduce the size of the graphical program execution system.

In contrast, the target device may have a limited memory size, e.g., due to power and/or cost constraints. In addition, a real-time OS 210 for the embedded target device 110, such as eCos, may only be 50 KB in size, and so the execution engine is preferably scaled down accordingly to run on the embedded device 110 under the embedded real-time OS 210. This may be accomplished by modifying or removing various subsystems of the execution system 500 that are not required for basic execution. For example, in one embodiment, the minimal execution system may include only a portion of the execution engine 502A, as shown, along with a substantially modified network manager 504A. Other components may be omitted altogether. Thus, a minimal execution system 205 may be generated with greatly reduced size, and somewhat reduced functionality in order to fit on the embedded target device 110. The minimal execution system 205 may be the absolute smallest executable execution system 205, or simply a reduced version of the execution system 205 including a core set of functionality.

As FIG. 5 also shows, in one embodiment, the callback system 506 may be omitted from the minimal execution system 205. Instead, the callback system 506 may be replaced with a componentized or modular callback system 206 which is stored on the host computer 102, and which may be transferred in part to the target device 110 depending on the needs of the particular graphical program. The componentization of the callback system 506 is described below with reference to FIGS. 7 and 8.

Figure 6:
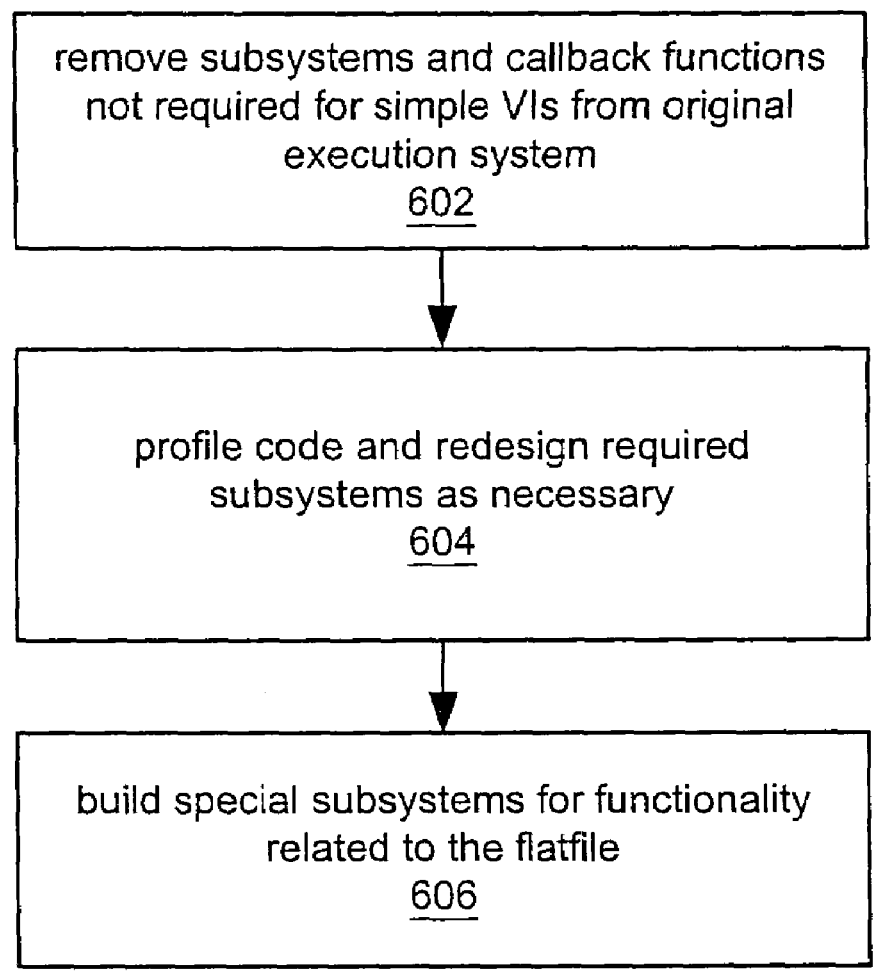
FIG. 6 flowcharts a method for creating the minimal execution system of FIG. 5, according to one embodiment.

FIG. 6—Method of Creating a Minimal Graphical Program Execution System

FIG. 6 flowcharts one embodiment of a method for creating a minimal graphical program execution system, as described above with reference to FIG. 5. It is noted that in various embodiments, one or more of the steps may be performed in a different order than shown, or may be omitted. Additional steps may also be performed as desired.

As FIG. 6 shows, in 602, the original graphical program execution system 500, as described above in FIG. 5, may be analyzed and pared down to the minimum set of functionality required to execute an extremely simple VI, e.g., a two integer addition (1+1=2) or a set of simple VIs. In one embodiment, this may include removing such subsystems as the web server, XML support, and the callback table. Then, all the functions that are named in the callback table (which are candidates for modularization and aren't required for the simple VIs) may be removed. Finally, a code coverage test may be perform in order to find and remove the functions that were not called in executing the simple VI (or a set of simple VIs). The resulting code comprises an initial version of the minimal execution engine 205.

Then, in 604, the resulting code may be profiled to determined how much code memory and RAM memory it occupies, and to decide which of the remaining subsystems are too large and should be redesigned. For example, for the system described above based on the ARM processor, a target memory footprint of 50K may require trimming those subsystems that are required and are too large in the original execution system. As an example, the network manager and type system may need to be redesigned if they were implemented with too large buffers in the original execution system.

Finally, in 606, if the original execution system VI linker does not fit the design, special subsystems, e.g., VI2OBJ and FLATFILE systems, may be built. In other words, components for converting VIs to object files (VI2OBJ) and for generating the modules for the flatfile (FLATFILE) may be created. Further information regarding the generation of object files for VIs is provided below in the section titled VI Object Files.

Thus, in one embodiment, a minimal execution engine 205 may be constructed by removing all but the minimum functionality required to execute a VI (graphical program), including most or all of the callback system 506, leaving the portion of the execution engine 502A and a modified network manager 504A, as described above. Such a minimal execution system 205 may then be suitable for loading and executing on an embedded device 110. In one embodiment, the minimal execution system may comprise an execution system virtual machine.

It should be noted that the process described above with reference to FIGS. 5 and 6 may also be applied to operating systems, such as a real-time operating system (OS). In other words, an operating system may be optimized, modularized, and/or modified to minimize the footprint on the target device 110. For example, the operating system may be analyzed to determine a minimal kernel or core functionality necessary for the OS to operate. For example, in one embodiment, the minimum functionality may include a simple Basic I/O Service (BIOS) and/or a minimum communication service, such as a TCP/IP service, as is well known in the art. As another example, the minimum functionality may include a simple downloading capability or functionality, e.g., a download protocol. Thus, in various embodiments, the minimum functionality may include one or more of: a simple BIOS, a minimum network communications protocol (e.g., TCP/IP), and/or a minimum download capability. In another embodiment, the minimum functionality may include a hardware and/or software checking capability. Other functions or services of the OS, such as I/O, memory management (e.g., trash collection, etc.) etc., may be modularized or partitioned such that subsets of the functions or services needed for a particular application or device may be determined and transmitted as needed. Thus, in one embodiment, a distributed "on-demand" OS may be created which includes the kernel (or minimum functionality), and one or more transferable OS modules which provide additional OS functionality in a modular fashion. Thus, the minimum functionality may facilitate subsequent downloading of support libraries and executing kernel components, i.e., in one embodiment, the minimum functionality may be just enough to allow the device to download further basic OS capabilities, including portions of the kernel and/or the BIOS. In another embodiment, these further basic OS capabilities may be included with an application, as described in detail below.

Thus, in one embodiment, the OS kernel or core functionality may reside on the target device 110, and may be executable to perform basic OS functionality on the device. Then, based on analysis of the application (e.g., a graphical program and/or the desired task, and/or the target device), one or more OS modules may be selected to provide particular needed services. These OS modules may then be transmitted to the target device 110 and installed (e.g., by the kernel or other loader program) to augment the basic OS functionality provided by the kernel, after which the OS (now extended) may be operable to provide the additional OS services or functionality.

In various embodiments, the one or more OS modules may be transmitted alone, or along with or as part of the target application. For example, in one embodiment, the one or more OS modules may be included in a flatfile 207 (or other structure or file) along with modules from the graphical program, and possibly also with modules (components) of the modular callback system 206.

Figure 7:
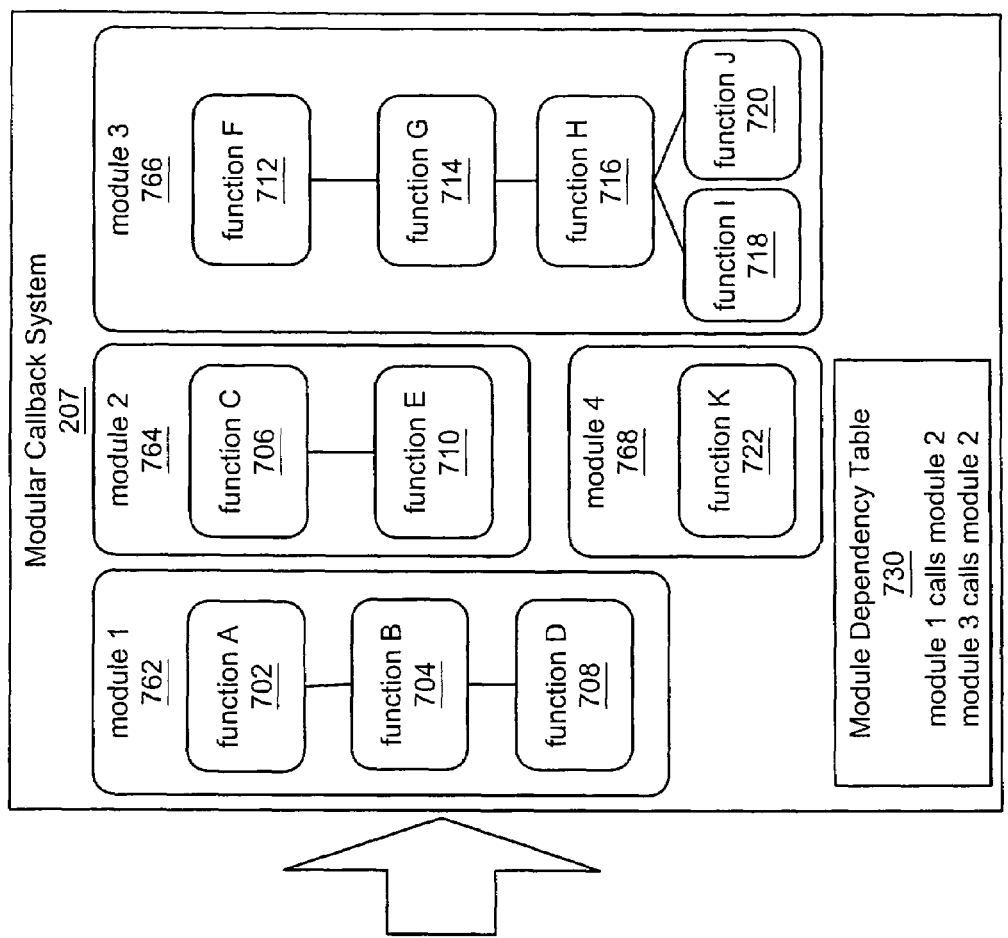
FIG. 7 graphically illustrates componentization of a callback system, according to one embodiment.
Figure 7:
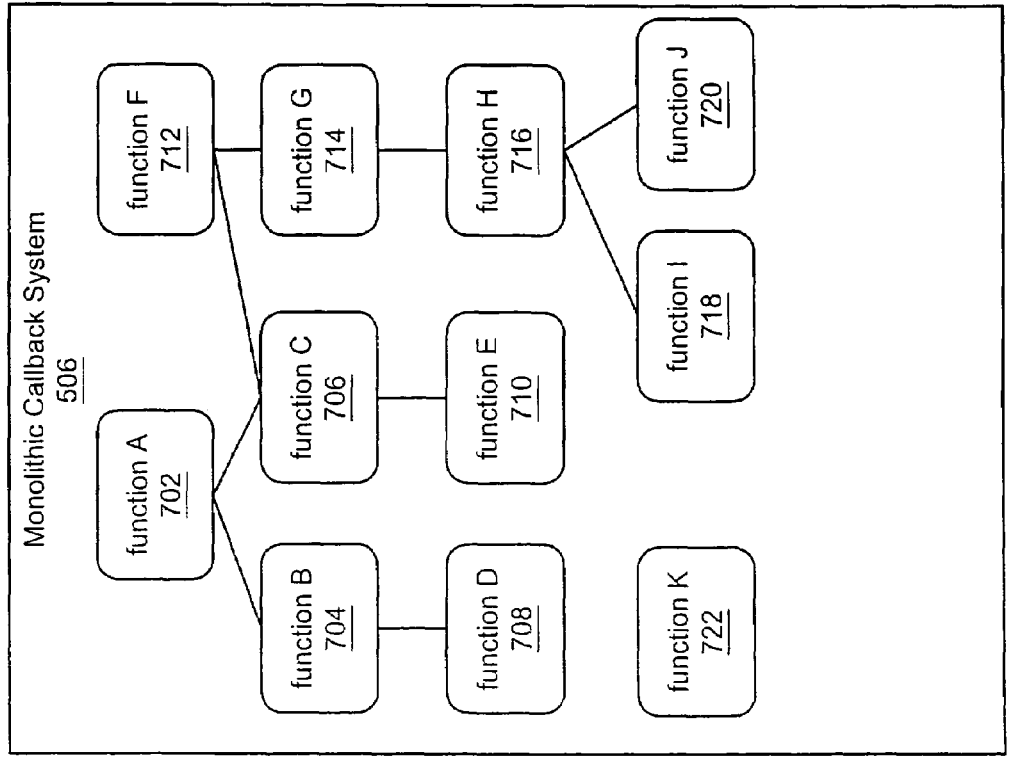

FIG. 7—Componentization of the Graphical Program Callback System

FIG. 7 illustrates the process of componentizing a monolithic graphical program callback system 506 to generate the modular graphical program callback system 206, according to one embodiment. It should be noted that the callback system of FIG. 7 is a highly simplified model which is intended only to illustrate the process, and is not meant to represent an actual callback system.

As FIG. 7 shows, the monolithic graphical program callback system 506 includes a plurality of functions A-K (702-722) with varying dependencies. In many prior systems, the functions are arbitrarily stored in many different files, which generally accumulate over time as the function library is developed. Thus, locating functions for linking and execution may be difficult and expensive, since functional dependencies may span numerous files in a substantially haphazard manner. As a result, when linking files for a particular application (graphical program), many unnecessary functions may be included due to the fact that they happened to be located in the same files as need functions, thus, the resulting memory footprint of the executable may be unnecessarily large.

The approach used herein to modularize the functions is to analyze the functional dependencies of the functions, and to group functions which operate relatively independently from other functions as a module. For example, as FIG. 7 shows, function A 702 calls function B 704 and function C 706. Function B 704 calls function D 708, and function C 706 calls function E. Thus, function A 702 has a dependency on function B 704, function C 706, function D 708, and function E 710.

Similarly, function F 712 depends on function G 714, function H 716, function I 718 and function J 720, as well as function C 706 (and its child function E 710). Note that function C 706 (and its child function E 710) is called by both function A 702 and function F 712. This dependency overlap may be resolved by grouping any function (with its children) which is called by multiple other functions as a separate module. Thus, a first module, module 1 762, may include function A 702, function B 704, and function D 708, as indicated in the modular callback system 203. Module 2 764 includes function C 706 and function D 708, as shown. Module 3 766 includes function F 712, function G 714, function H 716, function I 718 and function J 720. Note that module 1 762 and module 3 766 both depend on module 2 764 (since both function A 702 and function F 712 call function C 706). This module dependency relationship may be maintained in a module dependency table 730 or its equivalent. As FIG. 7 also shows, function K is independent of any other functions, and so has its own module, module 4 768.

In one embodiment, each module may be stored in a separate file, greatly easing the task of a dependency checker when selecting modules/files needed by the graphical program 202, i.e., for inclusion in the flatfile 207. A method for performing this componentization is described below with reference to FIG. 8.

Figure 8:
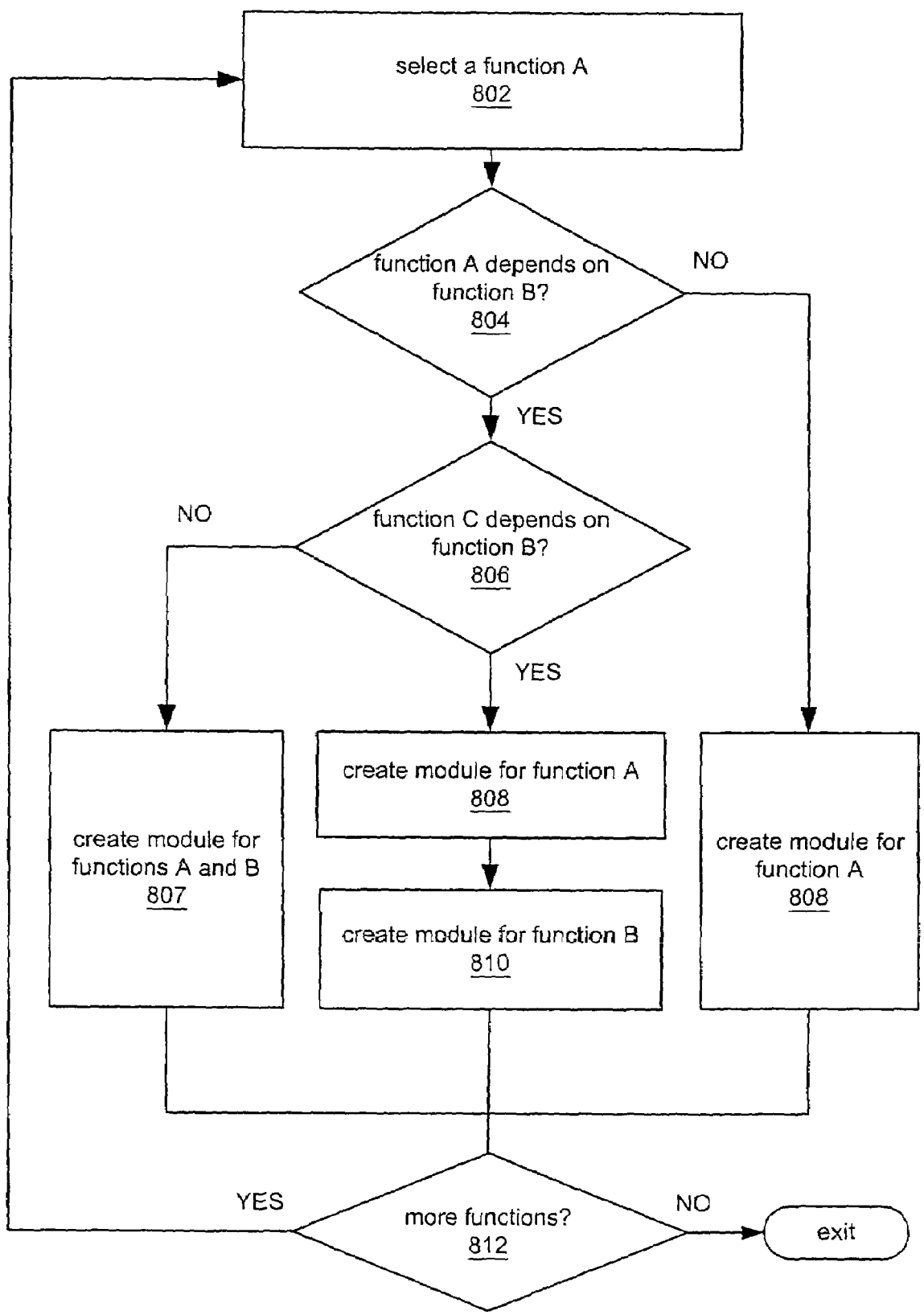
FIG. 8 flowcharts one embodiment of a method for componentizing a callback system to generate a modular callback system.

FIG. 8—Method for Componentizing a Graphical Program Execution System

FIG. 8 flowcharts one embodiment of a method for componentizing a graphical program execution system, such as, for example, LabVIEW RT. More specifically, as described above with reference to FIG. 7, the method componentizes or modularizes a set of functions (e.g., the function library) of the execution system, also referred to as the callback system of the execution system, by grouping functions in files or modules based on dependencies.

For example, in one embodiment, the original source code of the callback system includes a set of files that each contains functions that may call other functions, that may call other functions, etc., that belong to other files. If a function's dependencies extend into several files, it may be difficult or impossible for a dependency checker to identify and retrieve the function. To facilitate a dependency checker being able to select from the callback system source code only those functions that are needed by a particular application, an attempt may be made to place each function with it's dependencies into a single file. This "complete" function file (e.g., with *.cpp extension) may comprise a module. Thus, componentization of the graphical program execution engine may include the creation of modules, or *.cpp files, that completely (or almost completely) describe a function.

The following describes one approach for performing this componentization, using functions A, B, and C for illustrative purposes. It is noted that in various embodiments, one or more of the steps may be performed in a different order than shown, or may be omitted. Additional steps may also be performed as desired.

As FIG. 8 shows, each function may be analyzed with respect to its functional dependencies to determine whether to place the function in a separate module or in a module with another function. For example:

In 802, a next function, e.g., function A, may be selected, such as from the callback system of the graphical program execution engine. Then, a determination may be made as to whether function A has dependencies, i.e., calls a function B, as indicated in 804. If function A has no dependencies, i.e., does not call function B, then a module or file may be created for function A, as shown in 808.

If in 804 function A does call function B, then in 806 a determination may be made as to whether function B is also called by another function, e.g., function C. In other words, the method may check to see if any other function has a dependency on function B. If no other function calls function B, then in 807 a module or file may be created containing both function A and function B.

If in 806 it is determined that function B is called by function C, then separate modules or files may be created for function A and function B, respectively. Said another way, if function B may be legitimately included in multiple modules (or files), then function B may be given its own module or file. It should be noted that in various embodiments, dependencies between modules may be stored either in the modules themselves or in some type of module dependency table or its equivalent.

Finally, in 812, a determination may be made as to whether there are additional functions to analyze. If there are no more functions in the callback system, then the method may terminate or exit, as shown. Otherwise, the method may continue, selecting the next function in the callback system to analyze, as shown in 802, and described above.

Thus, if function A calls function B, and function B is only called by function A, then a module or file containing function A's definition may also contain function B's definition. Under this scenario, the dependency checker will know that function A and function B are interrelated and part of the same file. If function A calls function B, and function B is also called by function C, then function A's module or file will not contain function B in its definition file, and so function B's definition may be included in a separate file (or module). And so, by using the method above, the functions of a callback system in a graphical program execution engine may be modularized to allow the dependency checker to find and retrieve only those modules or files that are needed by the application, where the modules or files are organized to minimize the number of unnecessary functions included in the graphical program flatfile.

Figure 9:
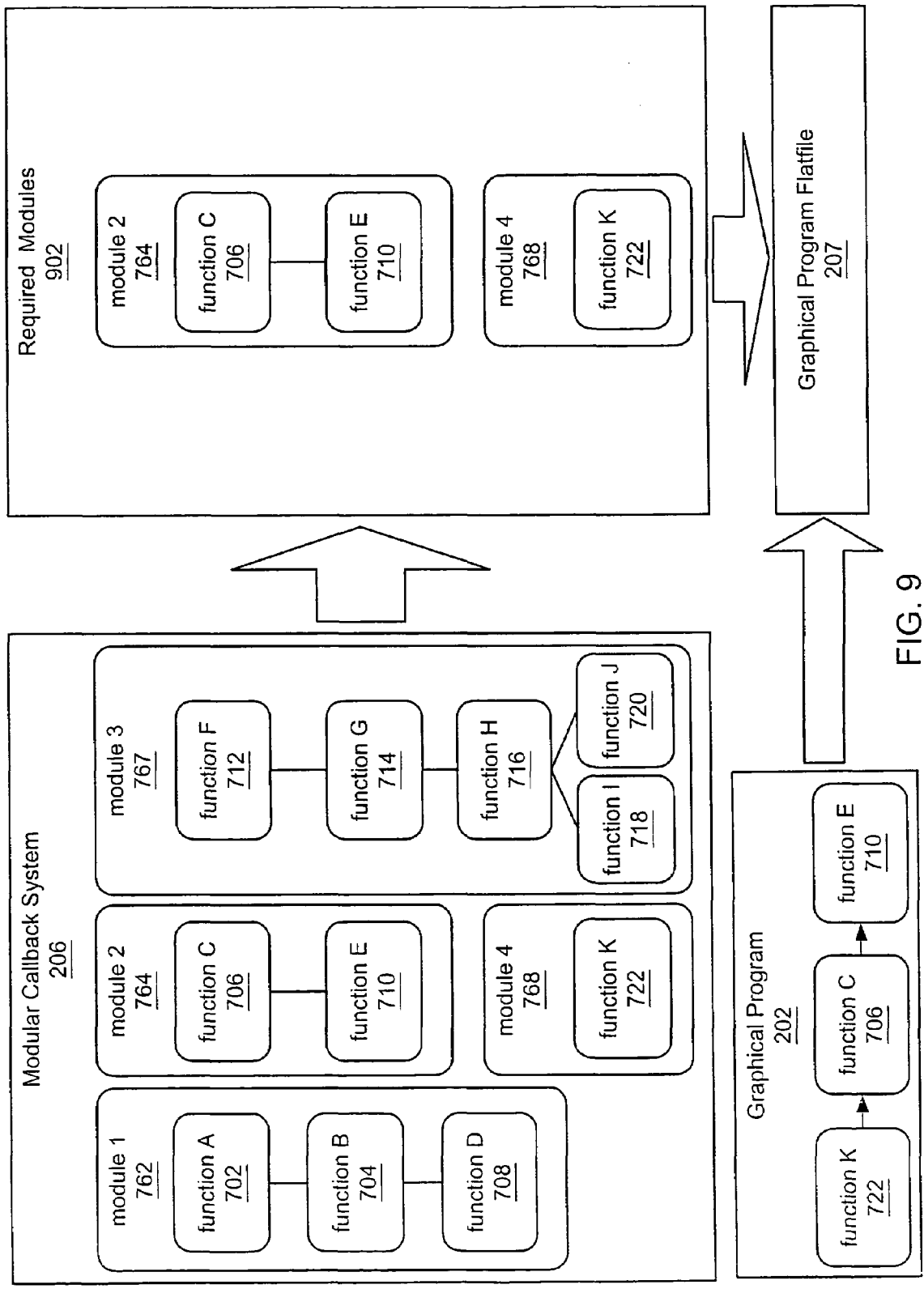
FIG. 9 illustrates a process of generating a flatfile from a program and the modular callback system, according to one embodiment.

FIG. 9—Generation of the Graphical Program Flatfile

FIG. 9 graphically illustrates the process of generating a graphical program flatfile 207 from graphical program 202 and the modular callback system 206. As FIG. 9 shows, a dependency checker program or process may analyze the graphical program 202 with respect to the modular callback system 206 to determine required modules 902. For example, in the embodiment shown, in the (extremely simple) graphical program 202, function K 722 is executed, then function C 706 (which calls function E 710 implicitly) is executed. Finally function E 710 is executed (explicitly). Thus, as is well known in the art, the graphical program not only indicates the functions called, but the sequence of execution, as well.

Figure 10:
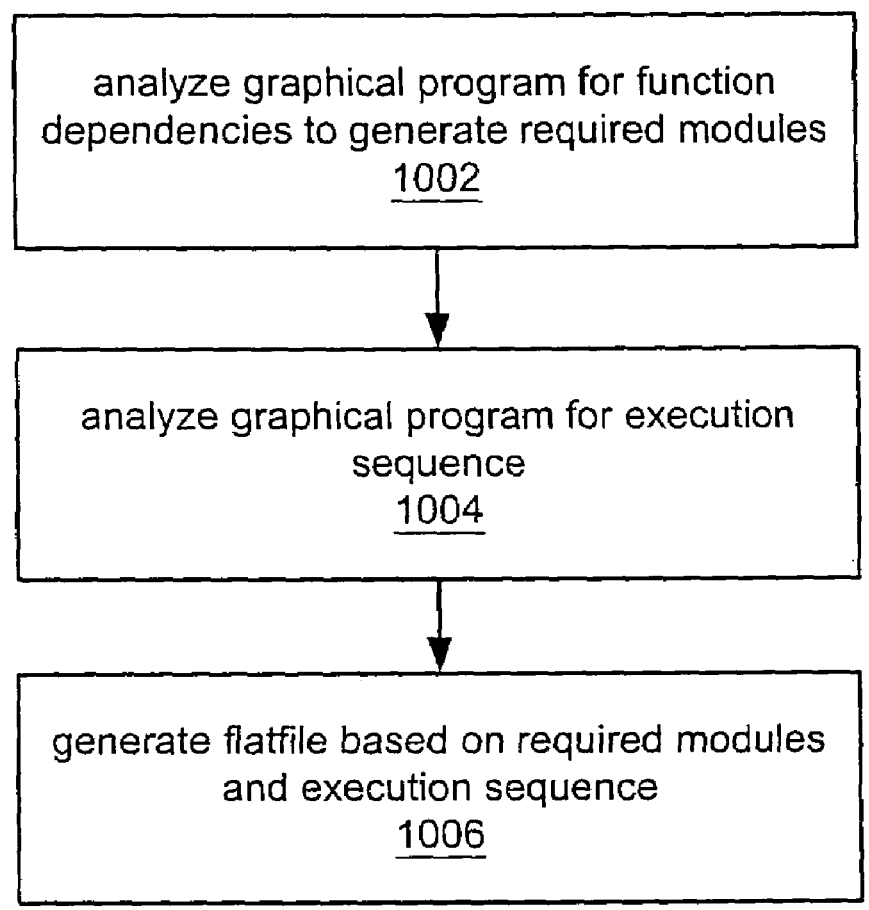
FIG. 10 flowcharts one embodiment of a method for generating the program flatfile.

The dependency checker may thus may determine that module 2 764 and module 4 768 are required by the graphical program. This information may then be used in conjunction with execution sequence information from the graphical program 202 to generate the flatfile, as indicated in FIG. 10.

Further details of the flat file are provided below with reference to FIGS. 10 and 11A-11C.

VI Object Files

In the process of generating the flatfile for an application program, one or more object files may be produced, e.g., via a utility such as VI2OBJ or its equivalent. The reasoning behind this approach is due to the storage limitations of many embedded devices. For example, loading an entire VI to the target device 110 may require more RAM than is available on the device, and execution of VIs directly from flash may not be possible because there is not enough RAM memory to copy these VIs into RAM and execute from there. It should be noted that as used herein, the term "program" may refer to the original source code of a program (e.g., the graphical diagram and underlying code, or text source code, such as C code), to object code generated from the source code, or to executable machine code generated from the source or object code.

However, because the callback system modules (generated from C/C++ code), described above, must be loaded onto the target device 110, it is natural to implement a common mechanism for loading VIs and modules. Thus, a VI2OBJ linker/loader may be developed based on the idea that VIs can be saved, not in their native format, but as object files, such that an ordinary C linker may be used to process them—i.e. to transform them into shared objects that can be loaded at runtime into the target device 110. This approach may make generation of executables from VIs easy and straightforward when space is limited. VI2OBJ or its equivalent is a mechanism to transform a VI (ex: add_int.vi) into an object file (ex: add_int.o).

To describe the mechanism involved in transforming a VI to an object file, the general structure of a VI should be considered. Omitting irrelevant information, the six major components are:

1. Compiled code—executable binary code of a VI;
2. Data space—stores all the data that is required by the VI to run;
3. Data space type map—describes the data stored in the data space;
4. Connector panel—describes the inputs & outputs of a VI;
5. Front panel heap—hosts the controls, indicator & cosmetics etc.; and
6. Block diagram heap—hosts the nodes & wires that make up the block diagram.

Another important piece of information is the linkinfo, which describes connections made from a VI to various entities, e.g., subVIs, external functions etc.

Now, the above listed components may be reshaped into an object file based on the following considerations:

1. The generated object file may be processed by an ordinary C linker (the VI may be linked to other support modules and eventually used to generate the flatfile).
2. It may be desirable to use the original execution mechanism of VIs on the target device 110.
3. The overhead induced by the new loading mechanism should be minimized.
4. Additional processing required after the VI is loaded by target device 110, up to the point where it is ready to run, should be minimized.
5. The object file size should be minimized.

To minimize the object file size the front panel heap and the block diagram heap may be omitted from the VI, because they are not needed on the target device 110 at run time, i.e., they are only used on the host computer side at edit time. As is well known in the art, an object file is substantially a file comprising of blocks of information (e.g., code, data, etc.), symbol information, and relocation information. In one embodiment, the steps taken to create an object file from a VI may include:

1. placing the compiled code resulting from the VI into the section code of the object file, extracting the symbol information attached to the VI code, and adding relocation information for local and external function calls.

2. creating a data section for the object file containing initialized data, e.g., data space type map block of the VI, default data space, connector panel and VI InstrHandle structure (enabling some of the initialization for a VI on the host side), etc. Additionally, symbol information may be added to facilitate retrieval and use of information stored in this section.

3. creating a .bss section for un-initialized data and storing related symbol information there.

4. extracting patch information from the linkinfo block and storing this info in a data section (e.g., named linkdata). This information may include a set of symbol and relocations entries. The data section may be used to store links from the VI to other subVIs or external modules.

5. finally, calls may be generated for InitVI and UninitVI functions (and stored in two special sections: .ctors and .dtors, of the object file). These functions may be responsible for VI initialization and disposal on the target device side.

Performing the steps described above may generate an object file that contains all the information needed by a VI to run, and that also includes symbol and relocation information used to connect this VI with other VIs or modules.

FIG. 10—Method for Generating the Graphical Program Flatfile

FIG. 10 is a high-level flowchart of one embodiment of a method for generating the graphical program flatfile 207, as illustrated in FIG. 9. As mentioned above, in various embodiments, one or more of the steps may be performed in a different order than shown, or may be omitted. Additional steps may also be performed as desired.

As FIG. 10 shows, in 1002, a graphical program 202 may be analyzed with respect to function dependencies to generate a list or collection of required modules. In other words, a dependency checker residing on the host computer system 102 may determine the functions used in the graphical program, then select modules from the modularized callback system 206 which contain those functions to generate required modules 902.

After (or before or during) the required modules 902 are determined, the graphical program 202 may be analyzed to determine an execution sequence or order of the functions called by the program (or by other functions in the program 202). In other words, the program flow for the graphical program 202 may be determined.

Finally, the flatfile 207 may be generated based on the required modules 902 and the execution sequence for the program. In one embodiment, the flatfile 207 may be generated by including the required modules 902 in the flatfile 207 along with sequencing information and/or module dependency information. An exemplary structure and format of the generated flatfile 207 is presented below with reference to FIGS. 11A-11C.

In one embodiment, the flatfile 207 may be generated from an object file and a symbol map of the target executable (the graphical program). As an example, assume that the object file is named add_int.o (for adding two integers) and the flatfile name, will be add_int.flat.

First, a symbol map (named mb.sym) may be generated from the graphical program, e.g., by using a special tool, e.g., a symdump tool. The symbol map contains all the global symbols of the graphical program along with the sections where they belong, and their addresses relative to the beginning of the section. Section names of the graphical program may then be extracted (e.g., from mb.sym), and numbered, e.g., beginning with one. Section names of add_int.o may then be extracted and numbered, e.g., beginning with 100. Thus, symbol lookup may be done at the time of the flatfile creation.

Then, symbols may be extracted from mb.sym and add_int.o. Relocation information may be extracted from add_int.o. Relocation information in an object file may include the address where the relocation is needed and the symbol name for the relocation. In one embodiment, the relocation information in a flatfile may comprise tuples (clusters, structures, etc.) of {[address where the relocation is needed (uInt32)], [the target section (unit16)], [the target address relative to the start of the start section]}. Further information regarding relocation is provided below.

For every relocation in the add_int.o, the symbol name may be searched for in mb.sym and add_int.o, and, if the symbol is not found, then an error message may be generated and the method terminated. If the symbol is found, the relocation may be written to the flatfile, i.e., to add_int.flat.

Finally, each section's content may be written to the flatfile. In one embodiment writes to the flatfile 207 may be made in accordance with the formats for relocation, etc., for a flatfile, described below.

It should be noted that in a preferred embodiment, unlike DLLs (Dynamic Link Libraries), flatfiles are "targeted". In other words, flatfiles are generally built to be loaded by a specified program. Thus, a crash or error may occur if another program tries to load a flatfile that was not built for it. Also, in one embodiment, the version of the symbol map should match the version of the graphical program. This version compliance may be facilitated by using a "build timestamp" in the application and in the mb.sym, so verification of the "version match" is possible.

Relocation

Relocation refers to writing the code section of an application at a certain memory address and preparing the code for execution. Preparation includes modification of the code according to a relocation table such that at execution time the code is able to access the variables and functions that it needs for its task. Examples of relocation are presented below.

Relocating Code

A program, at compile time, is set to run at certain memory addresses, say Xtext for the code section and Xdata for the data section. However, when the program is dynamically load into the target device 110, it is very possible that these addresses are already occupied, or may not even exist on the target device 110. Therefore, the code and data sections of the program may be placed in different memory locations on the target device, say Ytext and Ydata.

For example, if the program contains the following C instruction:

i=0;

and the address of variable i is (Xdata+100) (an offset of 100, for example, with respect to Xdata), then after code compilation, the following assembly line of code may be produced:

mov [Xdata+100], 0 meaning "move the value 0 at address Xdata+100".

Now assuming that the code section is transferred to the target device 110, and Xdata becomes Ydata, the target device address of variable i is now (Ydata+100). The process that corrects the instruction mov [Xd+100], 0 to mov [Yd+100], 0 is called relocation. The relocation process uses the Relocation Table to determine the address in the code section for the instruction (mov [Xd+100], 0).

and how this instruction needs to be changed.

In one embodiment, one or more of the following constraints may apply to the target device:

1. target flash should be large enough to be able to store the flatfile code, constructor, destructor and read-only sections.

2. target RAM should be large enough to store the flatfile data section and also the largest relocation table.

Relocating Data

The following is an example of relocation in the Data Section (.data). Assume that the program includes the following code sequence:

int i;

int*j=&i;

i is an un-initialized variable, so it may be stored in the un-initialized data (.bss) section. j is a variable that will contain the address of variable i, so after being initialized it may be stored in the data section. Because j will eventually have to contain the address of i, a relocation may be necessary in the data section to the address of j.

Figure 11A:
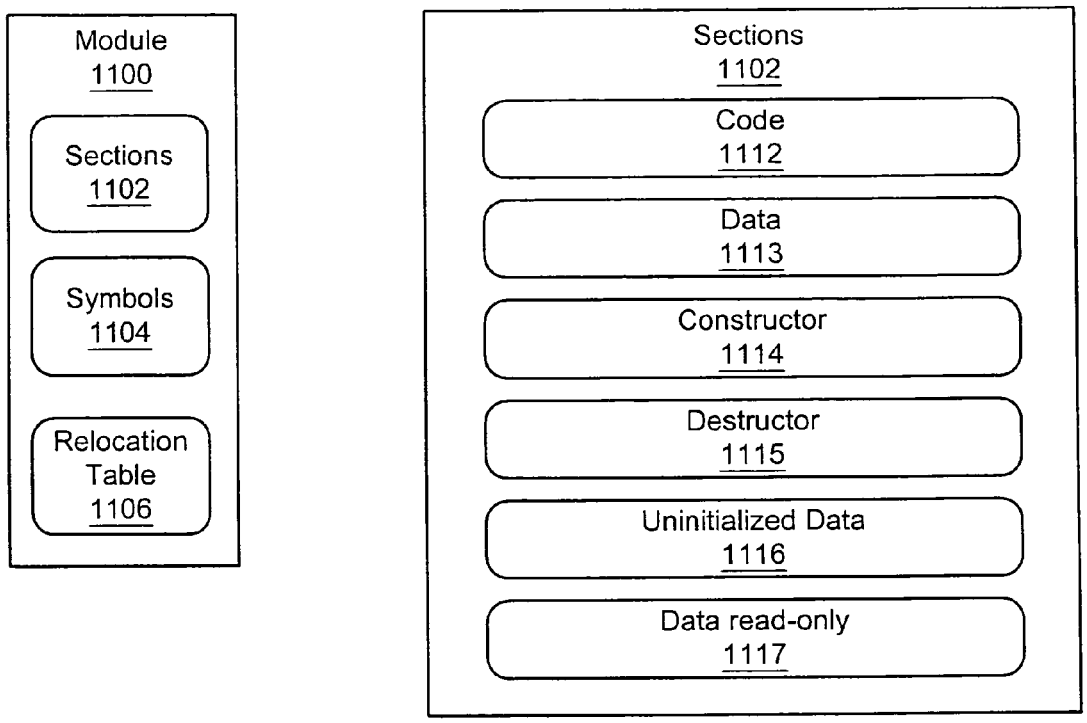
FIGS. 11A-11C illustrate the structure and deployment of the program flatfile, according to one embodiment.
Figure 11B:
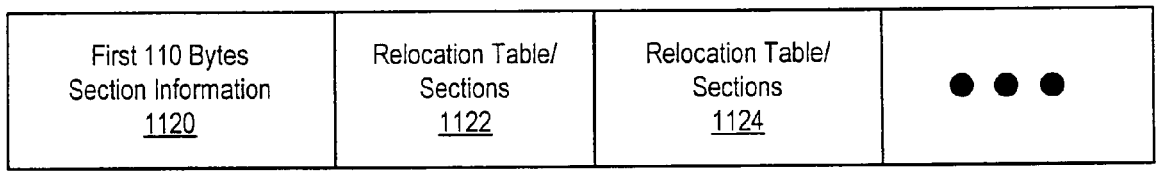
Figure 11C:
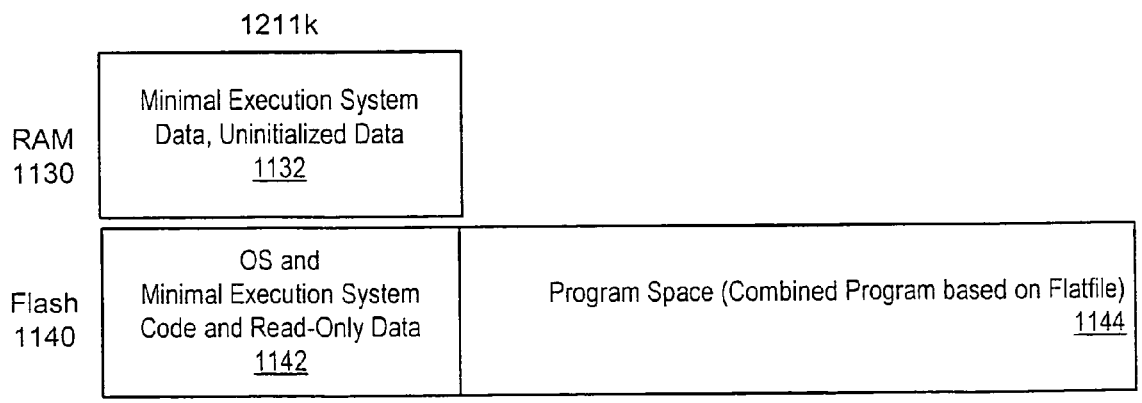

FIGS. 11A-11C—Structure and Deployment of the Graphical Program Flatfile

FIGS. 11A-11C illustrate the structure and deployment of the graphical program flatfile 207, according to one embodiment. FIG. 11A illustrates one embodiment of the contents of the modules used to build the flatfile 207. FIG. 11B illustrates the structure of the flatfile 207, according to one embodiment. Finally, FIG. 11C illustrates the deployment of the minimal graphical program execution system 205 and the constructed combined program 202A.

As FIG. 11A shows, in one embodiment, a module 1100, as referred to above with reference to FIGS. 6 and 7, may include three components: a sections component 1102, a symbols component 1104, and a relocation table 1106. In one embodiment, the module is a piece of C or C++ code contained in one or more C or C++ files. Every module may be compiled into an object file which contains the executable code and the data generated by the compiler for a specific module, along with symbolic and relocation information for that module, and other information, such as debug info, comments, etc.

The sections component 1102 may include six sections which represent various aspects of the module 1100, as shown in FIG. 11A. More specifically, the sections may include a code section 1112 which is the program code for the module, a data section 1113, a constructor 1114 for the module, a destructor 1115 for the module, a un-initialized data section 1116, and a data read-only section 1117 (i.e., for constants). A section may comprise a range of addresses with no gaps; all data in those addresses may be treated the same for some particular purpose. The symbols component 1104 includes the variables and function names for the module. A symbol is a name associated with a given address in a given section. The symbolic and relocation information from the object file of the graphical program can be used to determine the dependency relation between modules.

One characteristic of the object file is that it can be relocated, meaning that with appropriate processing, object file sections can by stored and executed at any memory address. As described in detail above, relocation is the process that makes an object file able to run at a given address. The information (table) that the relocation process uses is referred to as relocation information (or the relocation table) and is preferably included in the flatfile 207. Thus, the relocation table 1106, also referred to as an address table, provides the relative addresses for the symbols (variables and functions) with respect to the program on the host computer 102. This relocation information may be used by the target device to construct the combined program 202A, adding an address offset to the addresses in the relocation table 1106 to generate correct locations for the symbols in the context of the target device 110.

Thus, once the graphical program has been compiled to an object file, the object file may contain sections such as:

SectionA
Relocation information for SectionA
Symbol information for SectionA
Debug information for SectionA SectionB
Relocation information for SectionB
Symbol information for SectionB
Debug information for SectionB SectionC
Relocation information for SectionC
Symbol information for SectionC
Debug information for SectionC etc. in no specific section order.

The information in each module 1100 may be included in the flatfile 207, as shown in FIG. 1B.

As FIG. 11B shows, the flatfile 207 may include an initial segment 1120 (reading left to right) which includes information regarding the module information in the flatfile 207. In one embodiment, this section may be about 100 bytes in size, and may include such information as the number of sections in the flatfile, the size of each section in bytes, and the type of each section, e.g., code 1112, data 1113, etc.

After this initial section information segment 1120, one or more module segments, referred to as flatobjects, may be included, as FIG. 11B shows. In one embodiment, each module segment may include the module information shown in FIG. 11A, i.e., each module segment may include relocation table 1106 and sections 1102 for a respective module 1100.

FIG. 11C illustrates the deployment of the minimal execution system 205 and the combined program 202A on the target device 110. As FIG. 11C shows, the minimal execution system 205 may be divided between RAM 1130 and flash memory 1140 on the target embedded device 110. In the embodiment shown, the RAM 1130 is of size 128k and stores data and un-initialized data for the minimal execution system 205. As FIG. 11C also shows, in this embodiment, 128 k of the flash memory 1142 is used to store the real-time OS (e.g., eCos) and the code and read-only data for the minimal execution system 205. The remainder of the flash memory 1140 may be used to store the combined program 202A which may be constructed based on the flatfile 207. It should be noted that the RAM 1130 may also be used to store data during execution of the combined program 202A.

Thus, the flatfile 207 may include module information for functions of the graphical program 202 and for functions included from the modular callback system. In other words, the functions (with variables) for the graphical program 202 have been combined with the execution system functions required to execute those graphical program functions. This module information also includes relative address information for re-locating the functions in the memory space of the target device 110. The flatfile 207 may be transmitted to the target device 110 where a flatfile loader may execute to receive the flatfile 207 and construct the combined program 202A. Further details of the process of constructing the combined program 202A from the flatfile are provided below with reference to FIG. 12.

Detailed Structure of Flatfile

The following describes one embodiment of flatfile structure or format in more detail. It should be noted that the following format is exemplary and it only intended for illustration purposes, i.e., is not intended to limit the structure or format of the flatfile to any particular design.

```
Flatfile:
    sec_nr (int32) Number of sections;
    sec_desc[sec_nr] - An array of sec_nr section descriptors. See
        the format of sec_desc below;
    sec_content[sec_nr] - An array of sec_nr with section contents.
        See the format of sec_content below;
sec_desc:
    sec_size (uInt32) - the size of the section data;
    sec_type (uInt32) - type of the section. A combination of
        FO_SEC_READONLY, FO_SEC_HAS_CONTENT,
        FO_SEC_IS_CTOR_TABLE,
        FO_SEC_IS_DTOR_TABLE;
    number (uInt32) - a unique number for every section;
sec_content:
    rel_desc - relocations for this section. See bellow for rel_desc
        structure; section_data - the raw data of the section;
rel_desc:
    rel_nr (uInt32) - number of relocation in this relocation descriptor;
    rel_data[rel_nr] - an array of rel_nr relocations data - See bellow
        for the rel_data structure;
rel_data:
    addr (uInt32) - the relocation address, relative to current section start;
    target_sec (uInt16) - the section where the relocation should point;
    target_addr (uInt32) - the address relative to target section address
        where the relocation should point;
    rel_type (uInt16) - the type of the relocation.
```

Figure 12:
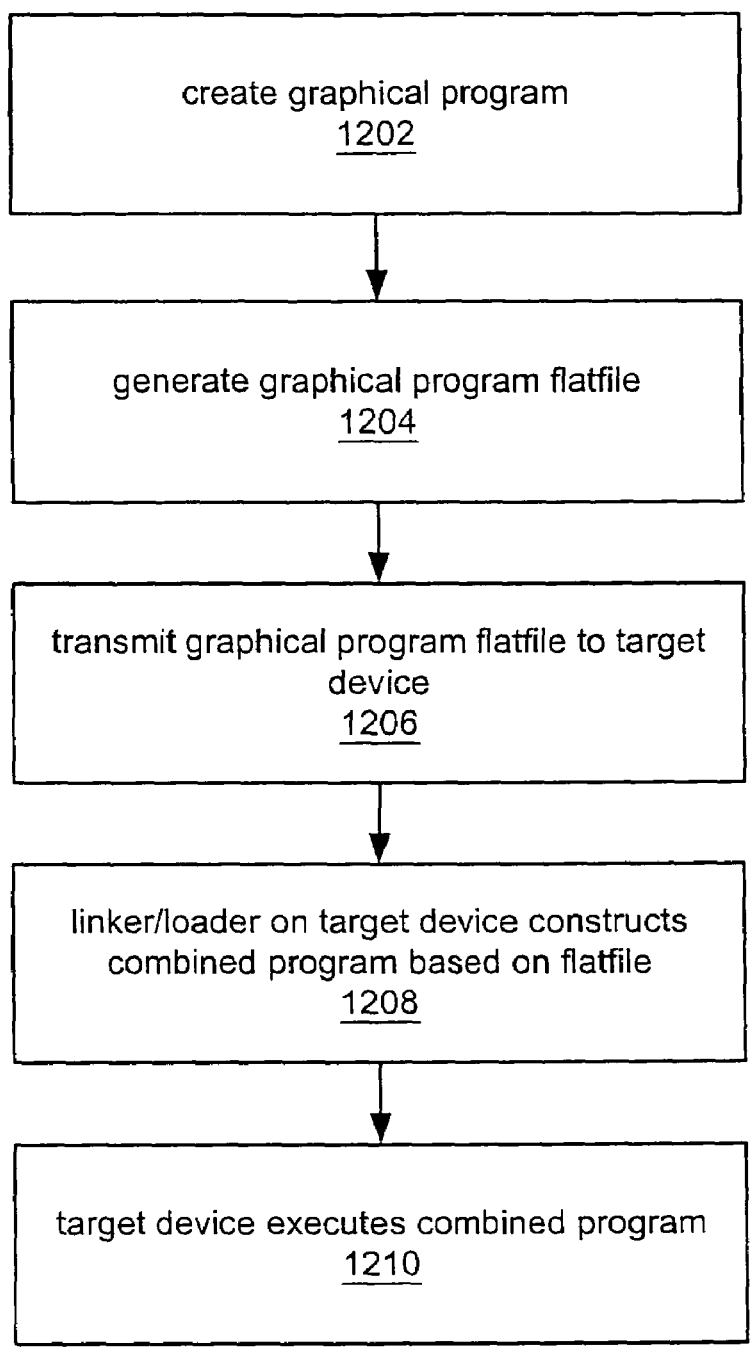
FIG. 12 flowcharts one embodiment of a method for deploying and executing a program on an embedded device.

FIG. 12—Method For Deploying and Executing a Graphical Program

FIG. 12 flowcharts one embodiment of a method for creating, deploying, and executing a graphical program on an embedded device. More specifically, a method is described for creation and deployment of programs on the target device 110. It is noted that in various embodiments, some of the steps may be performed in a different order than shown, or may be omitted. Additional steps may also be performed. As shown, this method may operate as follows.

In one embodiment, the user first may create a program that is operable to execute within the target embedded device, as indicated in 1202. In creating the program, the user may be aware of the one or more sensor devices 120 which will be acquiring data in the system. The user may include code in the program which is operable to execute on the target device, and which operates to provide instructions to one or more of sensor devices 120 to direct sensor devices 120 to acquire data at certain times or based on certain detected events. In one embodiment, the user may create a graphical program on computer system 102. As noted above, a graphical program may comprise graphical code, i.e., two or more interconnected nodes or icons which visually represent operation of the program. In creating the program, the user may place icons within the graphical program representing each of the respective sensor devices 120 that are being used. The user may also include graphical code in the program which operates to provide instructions to the respective sensor device icons, i.e., by connecting other graphical nodes to the sensor device icons in the graphical program. Thus, the graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also optionally include a user interface portion or front panel portion. Where the graphical program includes a user interface portion, the user may assemble the user interface on the display. As one example, the user may use the LabVIEW graphical programming development environment to create the graphical program.

As described below, the block diagram may be intended to execute on the target device 110. The user interface code may remain on the host computer 102 and may execute on the host computer 102 to present the user interface on the host computer 102 during execution of the block diagram on the target device 110. The user may interact with the user interface presented on the host computer 102 to provide input to and/or view output from the block diagram executing on the target device 110.

In an alternate embodiment, the graphical program may be created in step 1202 by the user creating or specifying a prototype, followed by automatic or programmatic creation of the graphical program from the prototype. This functionality is described in U.S. patent application Ser. No. 09/587, 6102 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. For example, in an embodiment where the instrument is an image acquisition device (e.g., a smart camera), the graphical program may implement an image processing function.

Once the program has been completed, then in step 1204, the graphical program flatfile may be generated, as described above with reference to FIG. 10. One embodiment of this is described in detail below in the section Example Process. In one embodiment, where the graphical program includes a block diagram and a user interface, only the block diagram portion may be used in generating the flatfile. The user interface may remain as code that executes on the host computer 102.

Then, in 1206, the flatfile may be transmitted to the target device 110, e.g., over a network (or other transmission means). In other words, the user may cause the computer system to send the flatfile 207 over the network 104 (or other communication medium) to the target device 110.

The target device 110 may thus receive the flatfile 207, and a loader/linker program on the target device 110 may construct the combined program 202A based on the received flatfile 207, as indicated in 1208. Further details of one embodiment of this process are provided below in the Dynamic Linking section and the Example Process section.

Finally, as shown in 1210, the target device 110, e.g., the minimal execution system 205 on the target device 110, may execute the combined program 202A.

In one embodiment, the target device 110 may send output data (e.g., acquired data or execution results) to the host computer 102. The data may be transmitted to the computer 102 over the network 104, e.g., through wired or wireless means. The target device 110 may send the output data through one or more intermediate devices, such as a hub device 108. The host computer system 102 may display the received data in a GUI, and/or may otherwise process the received data to generate a certain result. In one embodiment, the user constructs a GUI or front panel as part of the process of creating the graphical program, and this GUI code is executed on the computer system 102 to present the GUI on the display of the computer system 102.

In one embodiment, in executing the program received from the computer system, the target device 110 may be directed by the program to provide certain commands to respective ones of sensor devices 120 to cause the sensor devices to acquire data and provide this acquired data to the target device. Examples of the types of commands that may be implemented by sensor devices 120 include, but are not limited to, single/multiple point read, writes (e.g., for configuration) start, and stop, among others. In one embodiment, prior to sending the program to the target device 110, the minimal execution system 205 may be deployed to the target device 110. In another embodiment, the target device 110 may already have the execution system 205 installed.

Thus, the target device 110 executes the program received from the computer system 102, e.g., via the execution system 205. In one embodiment, the target device 110 may execute the program upon reception of the program from the host computer 102. In another embodiment, after the program has been transferred to the target device 110, the user may send a command to the target device 110 over the network 104 invoking execution of the program by the target device 110. In an exemplary embodiment, the execution of the program results in some data being acquired or generated. These data may then be sent (e.g., over the network 104 or other communication medium) to the host computer system 102, e.g., for display and/or analysis. In other embodiments, the acquired data may be sent to other systems. For example, in one embodiment, the target device 110 may use web server program 604 to publish the acquired data to a website, where a system with a web browser may then access the data. In another embodiment, the target device may send the data to one or more other systems coupled to the network 104 (e.g., the Internet). Thus, the target device may send the acquired data to any networked devices, as desired.

Dynamic Linking of Flatfile to the Target:

As described above, in a preferred embodiment, the flatfile 207 may comprise a sequence of sections and relocation tables. The sections can be code, data, constructors, etc. When the flatfile is constructed on the host computer, the code in its sections is relative, meaning that the instructions described in this code do not have real target addresses for the variables but rather some generic addresses, e.g., with respect to the beginning of the program.

For example, the program may include an instruction:

Move to variable I at address 10, the value 0 (I=0)

Now, as mentioned above in 1206, the flatfile may be transmitted to the target device, say, for example, in chunks of 4 kbytes. The very first transfer contains the initial 100 bytes 1120 that give information regarding the total number of sections, their type, and size, and the relocation tables that come with them, as described above with reference to FIG. 11B. Based on this information memory on the target device 110 may be reserved to accommodate these sections.

Now, the code:

Move to variable I at address 10, the value 0 (I=0)

arrives at the Target. Based on the relocation table, it may be determined that the real target address of variable I is not 10 but rather 500 offset+10=510 because in the datav section of the target RAM all program variables are addressed with relative to address 500.

So at this time, when the flatfile is moved into the target device 110 the call to Move to variable I at address 510, the value 0 (I=0)

has been corrected. In other words, the offset (500) has been added to the address. In one embodiment, the call may not be executed immediately, but rather may be stored or written in a code section of the flash location 1140.

In one embodiment, after the entire flatfile has been transmitted to the target and processed, the constructed combined program may be executed. In another embodiment, the execution of the constructed combined program may occur as the flatfile is streamed to the target device 110, as described below.

Example Process

The following is a simple example of one embodiment of the above described processes. In this example, the user creates a VI on the host computer 102, named Delay.vi, and wishes to run this VI on the target device 110.

On the host computer 102, the VI is transformed into an object file named Delay.o. The modules required for running the VI are determined by a dependency checker executing on the host computer 102, producing the following list (for example):

uClibc/memmove.o (from directory uClibc take file memmove.o)

cookie/mbCookie.o occur/mbOccur.o uClibc/memcpy.o

So at this point, the application VIs are converted into object files, and the required modules (that are also compiled into object files at this point) from the modular callback system 206 are determined. Then, all the object files pertaining to the application (using an ordinary C linker) are lined into a single object file which becomes the "application object file". In other words, the following object files may be merged together:

Delay.o uClibc/memmove.o cookie/mbCookie.o occur/mbOccur.o uClibc/memcpy.o thereby creating one single "application object file named" exampleVI.o. It is noted that in this example, the "application object file" may now be organized thusly:

All code sections (of type text) with related relocation, symbol and debug information from Delay.o, memmove.o, mbCookie.o, mbOccur.o, and memcpy.o are assembled into one big code section (of type text) with related relocation, symbol and debug information in the resulting exampleVI.o.

All data sections (of type .data) with related relocation, symbol and debug information from Delay.o, memmove.o, mbCookie.o, mbOccur.o, and memcpy.o are assembled together into one big data section (of type data) with related relocation, symbol and debug information in the resulting exampleVI.o All constructor sections (of type .ctors) with related relocation, symbol and debug information from Delay.o, memmove.o, mbCookie.o, mbOccur.o, and memcpy.o are assembled together into one big constructor section (of type .ctors) with related relocation, symbol and debug information in the resulting exampleVI.o.

All code destructor (of type .dtors) with related relocation, symbol and debug information from Delay.o, memmove.o, mbCookie.o, mbOccur.o, and memcpy.o are assembled together into one big destructor section (of type .dtors) with related relocation, symbol and debug information in the resulting exampleVI.o.

All read_only sections (of type .rodata) with related relocation, symbol and debug information from Delay.o, memmove.o, mbCookie.o, mbOccur.o, and memcpy.o are assembled together into one big read_only section (of type .rodata) with related relocation, symbol and debug information in the resulting exampleVI.o.

All un_initialized data sections (of type .bss) with related relocation, symbol and debug information from Delay.o, memmove.o, mbCookie.o, mbOccur.o, and memcpy.o are assembled together into one big un_initialized data section (of type .bss) with related relocation, symbol and debug information in the resulting exampleVI.o.

At this point, exampleVI.o contains:
  Code section
  Relocation info for Code section
  Symbol info for Code section
  Debug info for Code section
  Data section
  Relocation info for Data section
  Symbol info for Data section
  Debug info for Data section
  Constructor section
  Relocation info for Constructor section
  Symbol info for Constructor section
  Debug info for Constructor section
  Destructor section
  Relocation info for Destructor section
  Symbol info for Destructor section
  Debug info for Destructor section
  Read_Only section
  Relocation info for Read_Only section
  Symbol info for Read_Only section
  Debug info for Read_Only section
  (in no specific order).

However, a typical object file has a very complicated internal structure and thus may not be suitable for sequential processing (on the target device 110). Therefore, in order to be able to load, dynamically link, and sequentially process an object file on the target device 110, the object file may be processed into a different format called the flatfile, described above in detail.

The flatfile is an object file that has a much simpler structure than a regular object file, and therefore it may be processed "on the fly" or sequentially on the target device 110. In one embodiment, a utility, referred to as obj2flat, that transforms an object file into a flatfile, may be developed and used. Therefore, by running the obj2flat utility on exampleVI.o a single flatfile file named exampleVI.flat may be generated.

In one embodiment, the exampleVI.flat file may include:
  Section table
  Relocation Table for Code Section
  Code section
  Relocation Table for Data Section
  Data section
  Relocation Table for Constructor Section
  Constructor section
  Relocation Table for Destructor Section
  Destructor section
  Relocation Table for Un-initialized Data Section
  Un-initialized Data section
  Relocation Table for Read_Only Section
  Read_Only section Note1: for flatfiles the order of information is very important.

Note2: in converting exampleVI.o to exampleVI.flat, debug information may be omitted, while the symbol information may be used to create the relocation tables.

The section table gives information for every section regarding the number of sections, the size of each section in bytes, and the type of each section, as described above. The section table may be required to pre-allocate the memory for the sections. The idea is that in the relocation process, all section addresses must be known, and so allocation of memory for sections is preferably the first step performed on the target device 110.

Once the flatfile has been generated, exampleVI.flat may be transferred to the target device. In one embodiment, the target device has a network buffer in RAM that is 4K wide (although in other embodiment, the network buffer may be set to any size desired). Based on the size of this buffer, transfers of information from exampleVI.flat to target device RAM may be made in chunks of 4K.

The very first 4K piece of exampleVI.flat arrives via the network into RAM on the target device 110. This 4K of data contains the Section Table, Relocation Table for the Code Section, and some Code Section. The dynamic linker (or loader) that resides in Flash memory of the target device 110 may be a state machine with two run modes: read information, and process information.

Once the very first 4K transfer arrives in target device RAM, the dynamic linker enters read mode and starts reading the Section Table. When the Section Table is completely read, the dynamic linker enters processing mode and stores the Section Table in another location in target RAM, then executes the Flash memory allocations for the sections described in the Section Table. After finishing the allocations, the dynamic linker enters read mode, and reads the Relocation Table for Code Section. When the Relocation Table for Code Section is completely read, the dynamic linker enters processing mode and stores the Relocation Table for Code Section into target RAM at a different location than the 4K network buffer and the Section Table locations. Then it uses the information from the Relocation Table for Code Section to process the content of the Code Section that is already in the target RAM. When the entire portion of the Code Section currently in RAM has been processed, a new 4K transfer from exampleVI.flat into the network buffer takes place, overwriting the previous 4K information. Note that at this time, the Section Table and Relocation Table for Code Section have been saved into other target RAM locations, so the dynamic linker can proceed with processing of the Code Section by using information from the Relocation Table for Code Section. After the Code Section is completely relocated, the Relocation Table for Code Section may not be not needed anymore.

Next, the Relocation Table for Data Section is read into the 4K network buffer. When the Relocation Table for Data Section Code is completely read, the dynamic linker enters processing mode and stores the Relocation Table for Data Section into target RAM, overwriting the Relocation Table for Code Section. Then the dynamic linker uses the information from the Relocation Table for Data Section to process the content of the Data Section that is already in target RAM.

When the entire portion of Data Section in RAM has been processed, a new 4K transfer from exampleVI.flat into the network buffer takes place, thereby overwriting the previous 4K information. Note that at this time, the Relocation Table for Data Section has been saved into target RAM, so the dynamic linker can proceed with processing of the Data Section by using information from the Relocation Table for Data Section.

These 4K transfers and dynamic linker read/process cycles may continue until the entire exampleVI.flat file has been transferred to the target device 110 and the combined program 202A has been constructed (in the flash program space 1144). After the entire exampleVI.flat file is completely transferred to the target device, the Section Table will not be not needed anymore, and so may be deleted, and the constructed combined program 202A may be run.

Thus, in summary, in one embodiment of the invention, the program that is created on the computer system 102 may require use of program execution system 205 to execute the program. For example, in one embodiment, the program is a graphical program and requires graphical program execution system 205 to execute the program. Due to the small footprint of target device 110, in one embodiment, the program execution system is configured in such a way so as to only transmit the minimum amount of a program execution system (i.e., a portion of the modular callback system 206) actually required by the program that is being executed. Thus, in one embodiment, the program execution system is partitioned into a (minimal) base execution system, and a plurality of components for presenting different functionality that can be performed by a program. The base portion of the program execution system is only capable of executing the very simplest commands. This minimal engine may comprise the smallest set of commands which allows the other components to be executed.

In one embodiment, when the program is developed by the user, a software program executing on the computer may operate to analyze the program to determine the functionality contained in the program. Once the functionality of the program has been identified, the program uses the functionality to determine which of the respective components of the program execution system are actually required by the program. In one embodiment, the method determines the functionality of the program, and uses the functionality to index into a data structure or look-up table to determine which program execution system components will be required to execute this program. When the program is then transmitted or deployed to target device 110, the computer system may operate to only provide the program execution system base portion and the respective components that are actually required to execute the program. Thus, the smaller amount of execution system code may be transmitted to the target device. This allows a smaller footprint for one or more of the target devices and/or the sensor devices. In other words, target device 110 may include a smaller processor and/or a smaller memory medium since a full program execution system is not required to be transmitted.

In one embodiment, after the software program analyzes the program to determine the functionality contained in the program, an execution system analysis program may determine which execution system components are required for execution of the program. A deployment program may then assemble the required components of the execution system and the program, for example, by interspersing the required execution system components and the program together according to the order of execution of the program. These interspersed program execution system components and program may then be assembled into a file (i.e., the flatfile 207), and respective portions of the file transmitted to the target device 110 for execution.

In one embodiment, the flatfile 207 may be received by the target device 110 and used to construct a combined program 202A including executable code from the program and executable code from the required execution system. This combined program 202A may then be executed by the embedded device 110. The combined program may also be stored in non-volatile memory of the embedded device for subsequent execution.

Streaming Execution

In one embodiment, successive portions of the file may be streamed to the target device 110 and/or sensor device 120 for dynamic execution. In other words, the target device may execute the program as it is streamed to the device. For example, the sensor device 120 may receive a first portion of the file comprising a first portion of a program to be executed at a first portion of the execution system components that are used for executing this first portion of the program. After this first portion of the program has been executed along with the first portion of the execution system components, the first portion of the program may be flushed or removed from the memory of the sensor device. In a similar manner, the execution system components that are no longer required may be also removed from the memory. However, execution system components that may be required by other portions of the program to be executed may be retained in the memory for execution. As discussed above, in one embodiment, the deployment program determines which execution system components may be required for a plurality of different portions of the program, and includes a variable or data structure or other indication with the execution system component to indicate that this component should not be flushed immediately after it has been executed, or others should be retained by target device 110 for execution with another part of the program.

After the first portion of each of the program execution components and the program has been executed, computer system 102 and/or target device 110 may then provide a second portion of the program interspersed with the second portion of the execution system components. The second portion of the file may be provided by the computer system to target device 110. Operation then proceeds as above. Thus, for example, computer system 102 may operate to provide respective portions of the deployment file to target device 110 for execution on an as needed basis, based on the memory availability or memory capacity of target device 110. Target device 110 may receive the program that it is supposed to execute along with the execution system components used by that portion of the program, execute the program under direction of the execution system components, and then receive further portions of the deployment file, and so forth. Thus, computer system 102 may essentially provide a stream of the program and its corresponding execution system components to the target device according to the order of execution of the program.

In an example application of the present system, the computer system 102, the target device 110, and/or the hub device 108, may operate to execute a radio server program which is operable to discover remote or wireless data acquisition devices that enter into and exit from the wireless communication space that is within the range of the target device. Thus, periodically, the radio server executing on the target device may send out a wireless communication signal to query the presence of respective data acquisition devices 120 that are within the wireless communication range of the computer system 102, target device 110, or hub 108. Any present data acquisition devices may respond to the queries to indicate its respective presence. The queries may be performed periodically, e.g., once permitted, once per hour, once per day, or at greater or lesser time frame granularities. For further information regarding wireless execution of the graphical program, please see U.S. patent application Ser. No. 10/283,758, titled "Wireless Deployment/Distributed Execution of Graphical Programs to Smart Sensors", filed Oct. 10, 2002, which was incorporated by reference above.

In another embodiment of the present invention, the target device 110 may include a programmable hardware element, such as an FPGA, in addition to, or instead of, a processor. For example, in an embodiment where the target device includes both a processor/memory and an FPGA, the graphical program may be compiled to a hardware configuration file on the host computer system 102, where the hardware configuration file is targeted at the FPGA on the target device 110. The host computer may transmit the hardware configuration file to the target device 110, where it may be stored, e.g., in a memory medium of the target device. The processor on the target device may then deploy the hardware configuration file onto the FPGA, after which the configured FPGA may execute to perform the desired function or operation.

In another embodiment, the target device may include two (or more) FPGAs. The host may stream the compiled hardware configuration file to the target device in portions which are each suitable for deployment and execution by respective ones of the FPGAs. Execution of the program may proceed in "ping-pong" fashion among the two or more FPGAs. For example, once a first portion of the hardware configuration file is received and deployed on a first FPGA, the configured first FPGA may execute, thereby performing a function encoded in the first portion of the hardware configuration file. While the first FPGA is executing the first portion of the hardware configuration file, a second portion of the hardware configuration file may be received and stored in the memory medium of the target device. The processor may then deploy this second portion of the hardware configuration program to a second FPGA on the target device 110. Once the second portion is deployed, the second FPGA may begin execution. In one embodiment, once the second portion is deployed to the second FPGA and the second FPGA begins execution, execution of the first FPGA may be halted, and a third portion of the hardware configuration program may be received, stored in memory, and deployed onto the first FPGA (now inactive). Thus, the FPGAs may be dynamically configured in an alternating manner. Of course, this approach may be extended to more than two FPGAs, where more sophisticated techniques may be applied to determine which FPGA to configure with each successive portion of the hardware configuration program, e.g., round robin, longest inactive, size-based, etc.

Deployment and Execution of a Graphical Program on an Embedded Device from a PDA Some applications may require or benefit from embedded systems that operate in conjunction with mobile computing devices, such as PDAs (Personal Digital Assistants), tablet computers, and the like, e.g., via wired or wireless means, for increased mobility, reduced power requirements, and so forth. Example applications include defense-related sensor networks, e.g., for battlefield surveillance, treaty monitoring, transportation monitoring, etc.; inventory control, e.g., tracking product location and condition; and product quality monitoring, e.g., temperature, humidity monitoring of meat, produce, dairy products, impact, vibration, and temperature monitoring of consumer electronic devices, and failure analysis and diagnostic information, among others.

The following describes various embodiments of a system and method for deployment and execution of a program, e.g., a graphical program, on an embedded device from a PDA. As used herein, the term "PDA" refers to a handheld device with computational and communication capabilities that may be easily carried and used in a mobile manner, i.e., without the need of a desk or other dedicated workspace. Example PDAs include Palm Computing's Palm Pilot, Sharp Electronics Zaurus, Compaq Computer's iPaq, Handspring's Visor, and Hewlett-Packard's Jornada, among others. It should be noted that although the embodiments are described with respect to PDAs, any other type of mobile computer may be used.

In one embodiment, the present invention may comprise a complete sensor/intelligence/communication system integrated into a small form factor, e.g., 5 cm×3 cm×3 cm, package, requiring substantial (evolutionary and revolutionary) advances in miniaturization, integration of hardware and software, and power (energy use) management. Note that embodiments of the invention are not limited to any particular sensor, i.e., any type of sensor or sensors may be used. Exemplary sensors contemplated for use include any micro-electro-mechanical system (MEMS) sensors that combine sensing elements with electronics and/or mechanical elements on a silicon chip, due to their reduced size and/or power requirements. Note that in various embodiments, the sensors may be on-board, or may be coupled to the embedded device via on-board terminals.

Compact Battery-Powered Sensor Interface

In a preferred embodiment, the embedded device is a compact sensor interface (CSI), which may operate in conjunction with a PDA. For example, in one embodiment, the CSI is implemented on a small processor card, e.g., 5 cm×3 cm, 3 cm×3 cm, or other small form factor, and operates on low to medium voltage battery power, e.g., 3.3V. Although the embodiments described herein are battery-powered, it is noted that other power sources for the CSI are also contemplated, including, for example, standard "wall-outlet" AC power, solar cells, wireless transmitted power, and fuel cells, among others. In other words, any kind of power source may be used.

The CSI may be programmed from a host PDA, for example, via serial port (e.g., RS-232) and/or an IR (infrared) port (e.g., IrDA). The CSI may include a real time operating system, e.g., eCos, and a minimal graphical program execution system 205, as described above. In a preferred embodiment, the minimal graphical program execution system 205 comprises a componentized or modularized graphical program execution system, for example, based on National Instruments' LabVIEW RT, as also described above. As will be described in more detail below, the host PDA may be operable to deploy a graphical program, e.g., a VI, onto the CSI, which may then execute the graphical program (using the minimal graphical program execution system 205) to perform the specified functionality, such as data acquisition, control, etc.

The CSI may include additional functionality not included in the embodiments described above. For example, in one embodiment, once programmed, the CSI may be operable to execute the graphical program independently from the host PDA. In another embodiment, the CSI may support wireless data communication with the host PDA, e.g., via serial communication over IR (infrared), 802.11, 802.15.4, Bluetooth, and/or front panel protocol TCP/IP via wired or wireless, e.g., IR, means, among other communication protocols.

In one embodiment, the CSI may include boot code that executes a boot-up sequence upon start-up. For example, the CSI may boot up as an instrument, i.e. if a graphical program is downloaded or deployed on the device, and the user then turns the device off/on again, the boot-up sequence on the device may include starting the downloaded graphical program, e.g., at the end of the sequence.

FIGS. 13A-15—Hardware

FIGS. 13A-15 illustrate exemplary hardware devices implementing the present invention, according to one embodiment. It should be noted, however, that the embodiment shown is but one example implementation, and is not intended to limit the invention to any particular set of components, functionality, or form. It should also be noted that although the following embodiments are implemented using National Instruments' LabVIEW, other graphical program development environments and execution engines are also contemplated.

Figure 13A:
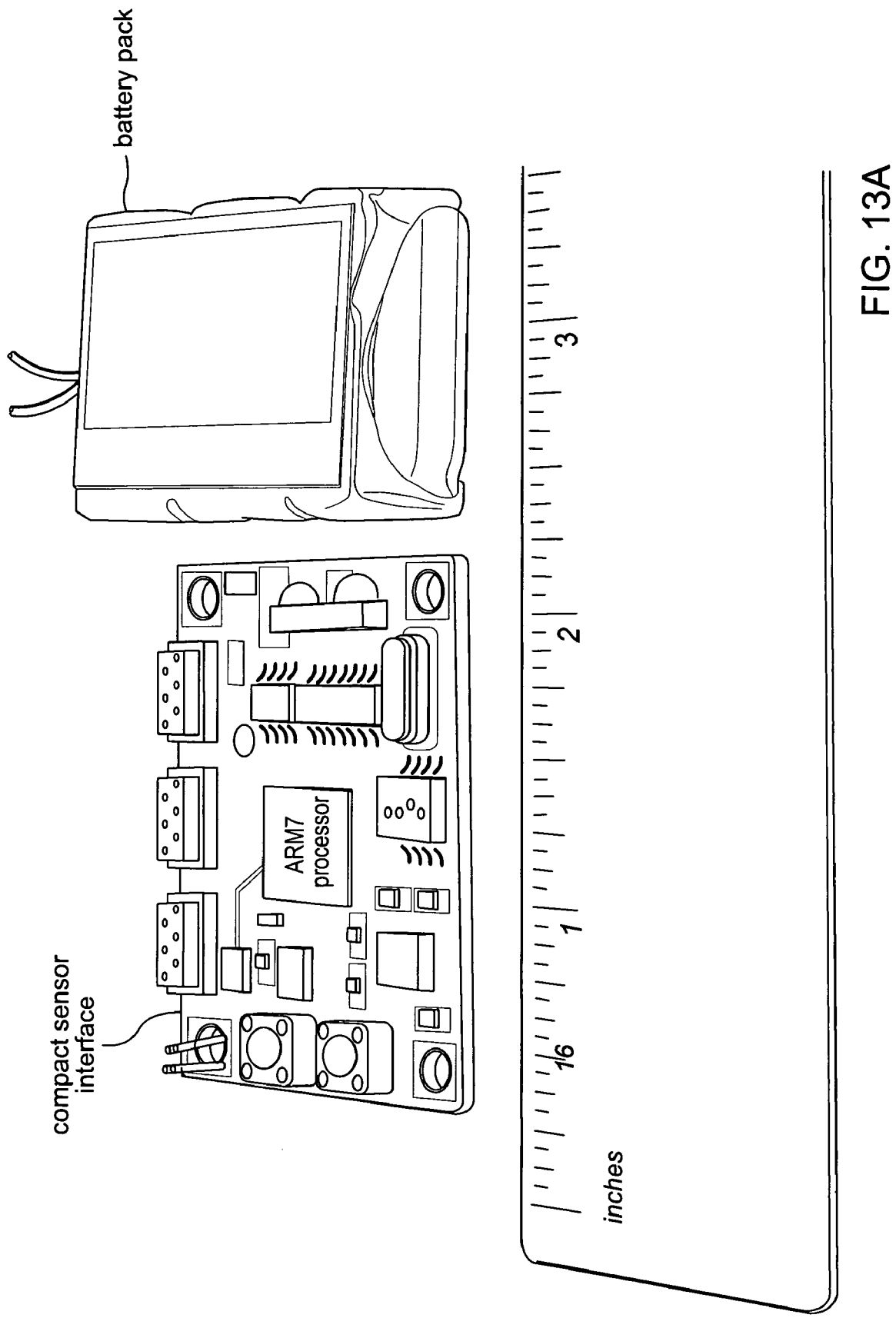
FIGS. 13A-15 illustrate hardware that may be suitable for implementing various embodiments of the present invention.
Figure 13B:
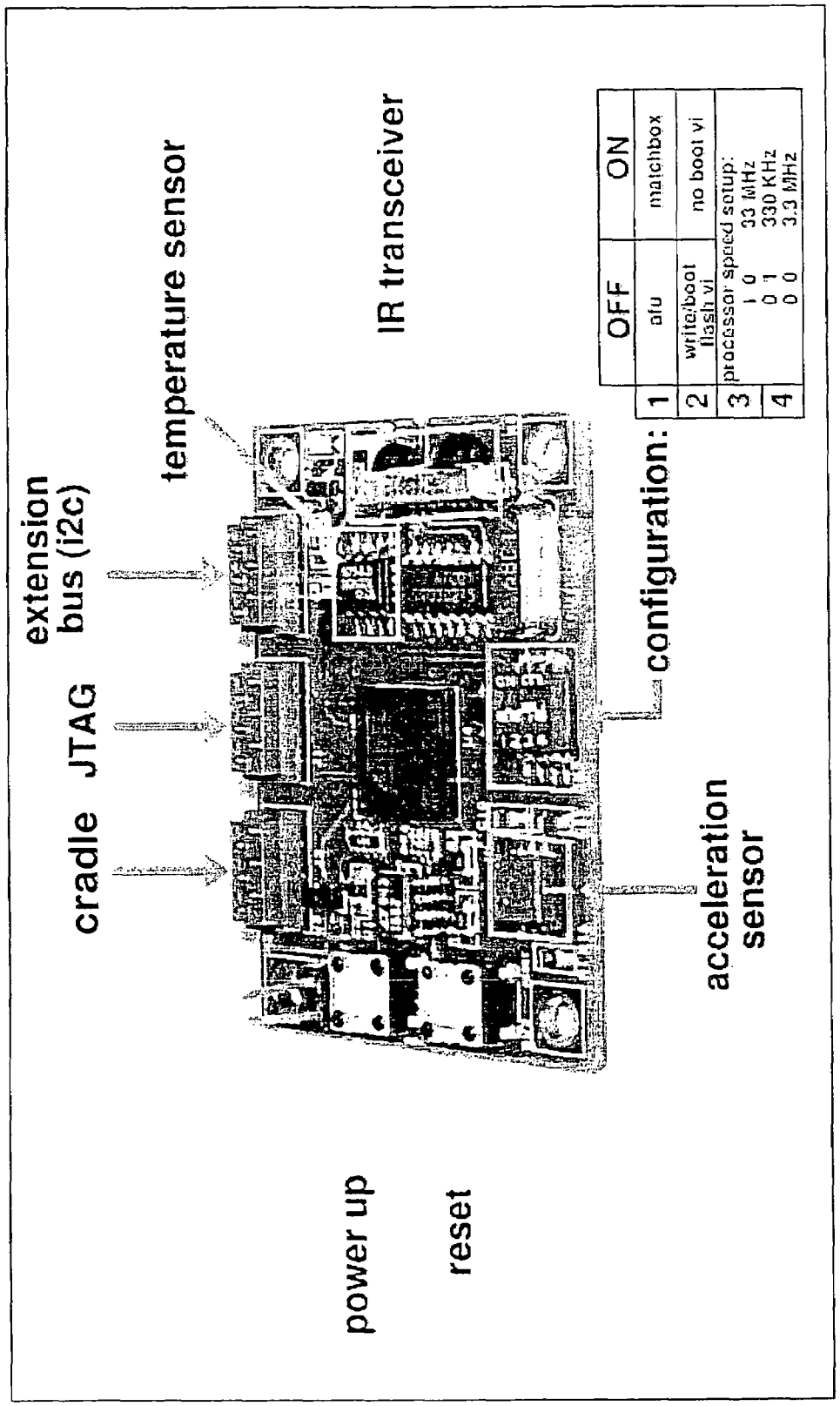

FIGS. 13A and 13B—Processor Card

FIGS. 13A and 13B illustrate an embodiment of the CSI implemented using an AT91FR40162 ARM7 processor from Atmel. This processor includes 2MB Flash and 256 KB of RAM, and consumes 63 mW at 66 MHz. As FIG. 13A shows, the ARM7 implementation of the CSI is small, measuring approximately 5 cm×3 cm (roughly 2 in×1.2 in). As also shown in FIG. 13A, this embodiment uses a set of off-the-shelf cellular telephone batteries (600 mA at 3.6V) to power the device. It should be noted that the dimensions given above are exemplary only, and are not intended to limit the form factor to any particular dimensions. For example, in various embodiments, the embedded device may be between approximately 3 cm×3 cm and approximately 6 cm×6 cm in size.

FIG. 13B illustrates some of the primary components of the ARM7 implementation of the CSI. As FIG. 13B shows, in this embodiment, the card or board includes power-up and reset buttons, two on-board sensors (a temperature sensor and an acceleration sensor), configuration micro-switches (see legend for switch codes), and an infrared transceiver. As FIG. 13B also shows, in this embodiment, the CGSI also includes an extension bus, a JTAG (Joint Test Action Group) port, and a cradle port.

The extension bus may be used for connections with external hardware, and in one embodiment may comprise digital lines that can be programmed from the CPU. As indicated, the extension bus may be an $I^2C$ (Inter-IC) bus used to connect (the CPU in this case) to different components that support this capability, as is well known in the art.

The JTAG port may be used to perform extensive debugging and diagnostics on the system through a small number of dedicated test pins using boundary scanning techniques, as is also well known in the art, where, for example, signals are scanned into and out of I/O cells of a device serially to control its inputs and test the outputs under various conditions, as specified in IEEE 1149.1. In one embodiment, the JTAG port may be used to write into the ARM CPU, e.g., to download the minimal execution engine into the CPU.

The cradle port may serve a number of functions, as described below with reference to FIG. 14.

FIG. 14—Cradle

Figure 14:
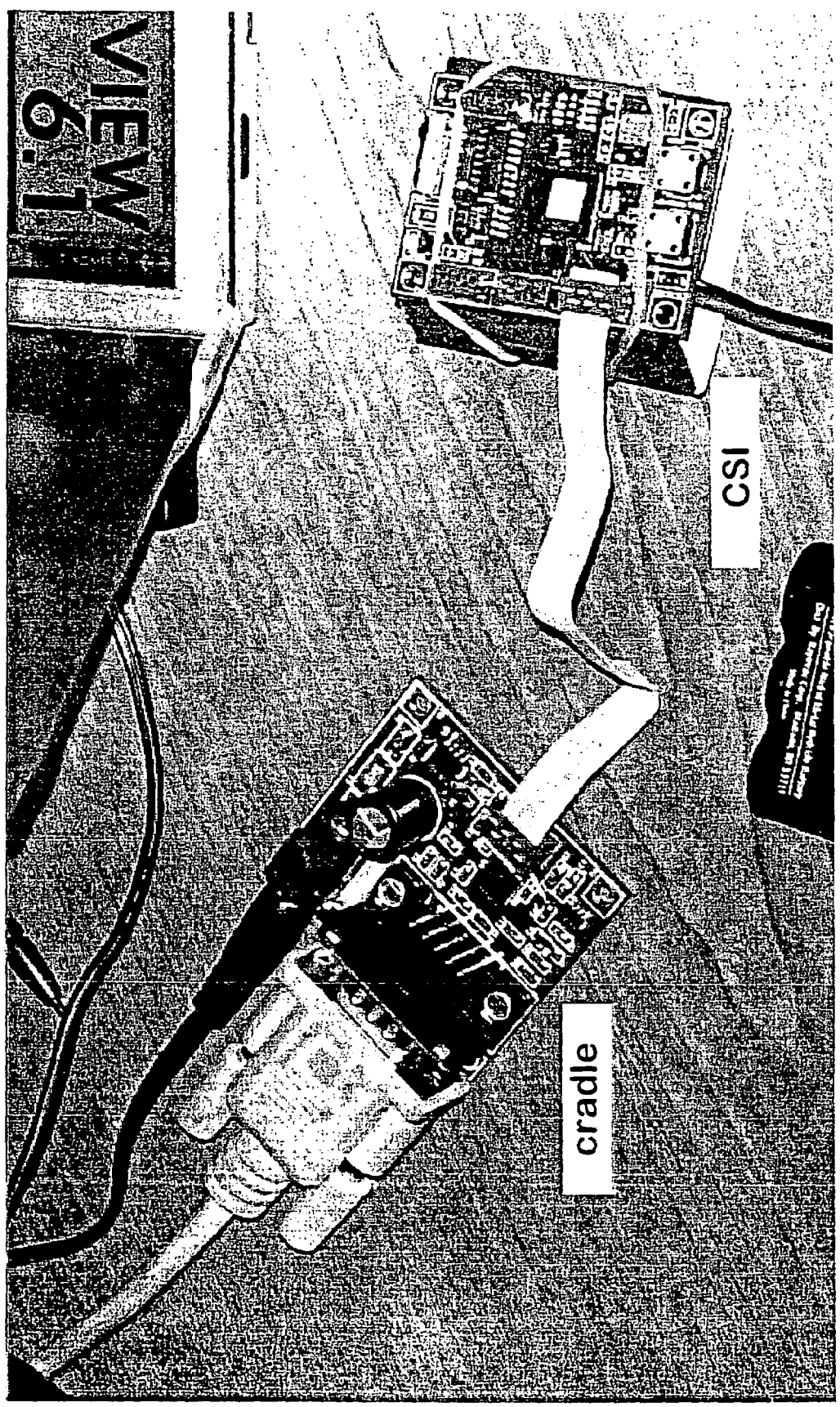

FIG. 14 illustrates one embodiment of a cradle for use with the CSI via the cradle port shown in FIG. 13B. In the embodiment shown, the cradle is a small board that has two functions: 1) to connect the CSI to a serial interface of the PDA, and 2) to recharge the CSI battery. As FIG. 14 shows, the cradle has a female DB9 connector and a power jack. The DB9 connector hosts a RS-232 cable from the PDA, while the power jack hosts a power connector of a power supply (7VDC, 500 mA). The cradle has a female (red) connector that hosts a ribbon cable that connects the cradle to the CSI. The cable has 6 lines: 4 serial lines (RX0, TX0, RX1, TX1), and 2 power lines (V, GND).

As shown in FIG. 14, the serial lines may come straight from the DB9 connector and connect the CSI to the PDA. The power lines may be routed to the CSI rechargeable battery, and used to re-charge the battery. The cradle has two LED's to indicate power ON/OFF states.

Thus, in one embodiment, the CSI (battery) may be operable to be recharged, e.g., via the cradle port described above. For example, in one embodiment, the cradle (also referred to as a docking station) may recharge the battery at roughly 100 mA/hour. In one embodiment, the CSI/battery may be recharged in the following manner:

1) Set Switch1=OFF on the CSI,
2) Connect CSI to cradle/docking station,
3) Connect power to cradle/docking station,
4) Confirm LED is ON (not blinking), and
5) Leave the CSI in recharge mode for about 6 hours.

Power Consumption

The AT91FR40162 ARM7 processor from Atmel has three operational frequencies, 330 KHz, 3.3 MHz, and 33 MHz. Power consumption on the CSI was measured for the two higher frequencies (with no power management). The processor running from flash memory at 33 MHz uses 100 mA. The processor running from flash memory at 3.3 MHz uses 50 mA. Thus, using the 600 mA at 3.6V batteries shown in FIG. 13A, the CSI may operate for approximately 6 hours, at 33 MHz. It should be noted that this performance is achieved without power management, and may be substantially improved for embodiments that include power management functionality.

Figure 15:
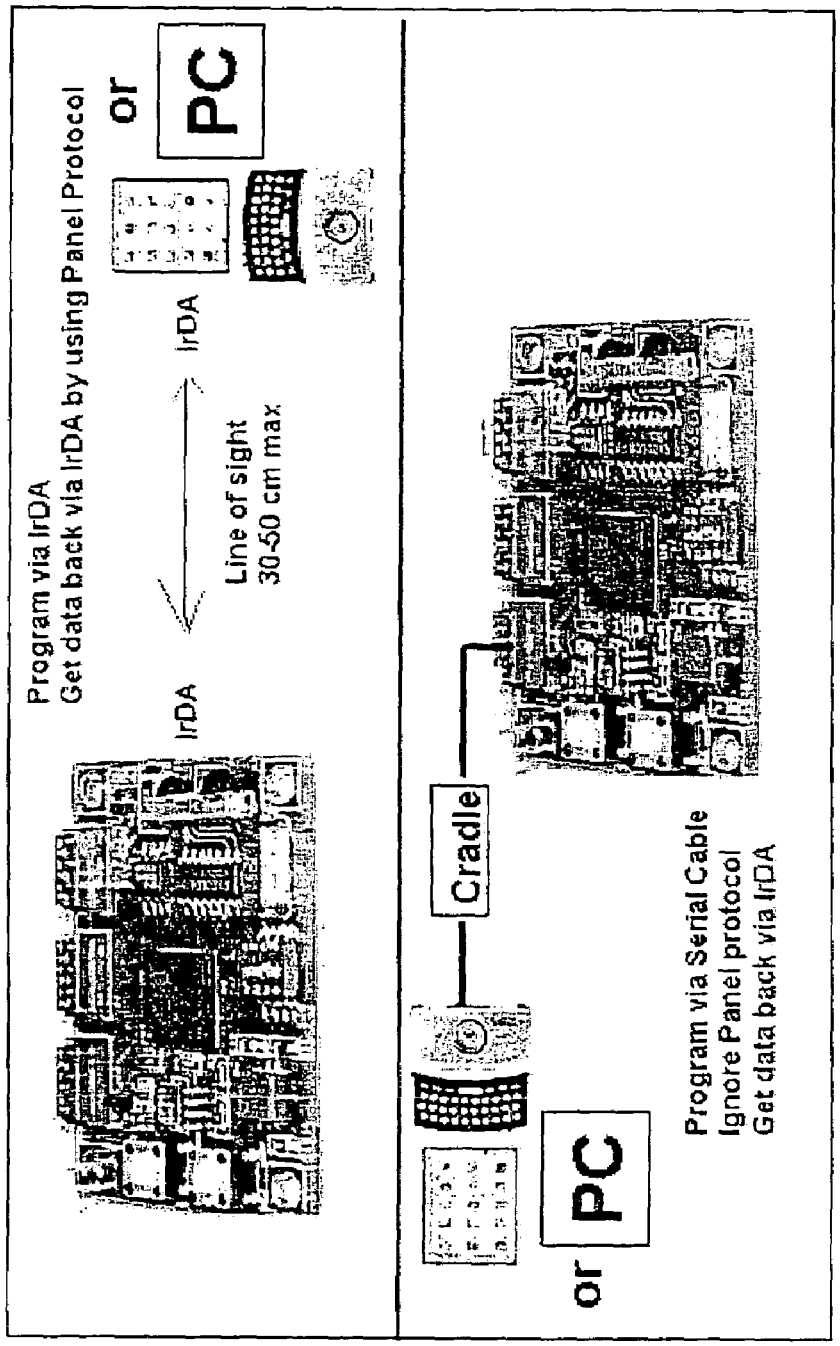

FIG. 15—Deploying a Graphical Program onto the CSI

Turning now to FIG. 15, exemplary embodiments of the CSI are shown coupled to the host PDA for programming the CSI. In the embodiments shown, communication between the host PDA and the CSI is implemented using Serial Link IP (SLIP). The SLIP protocol defines a simple mechanism for framing data-grams for transmission across serial lines. SLIP sends the data-gram across the serial line as a series of bytes, and uses special characters to mark when a series of bytes should be grouped together as a data-gram. In this embodiment, the maximum transfer rate is 115 Kbits/sec. In various embodiments, the physical communication bus may be implemented as either SLIP over serial cable, or SLIP over IR, although other implementations are also contemplated.

As noted above, in one embodiment, the CSI may operate using an (eCos+minimal execution engine) operating system (OS). In one embodiment, the minimal execution engine is a reduced modular version of LabVIEW RT that contains the execution system plus a subset of the front panel protocol plus a module specialized in loading flatfiles 207, as described above. Flatfiles 207 are files generated on the host PDA that are sent to the target device, i.e., the CSI, and allow on-the-fly processing at reception time on the target device. In one embodiment, establishing a connection and running a graphical program on the CSI is substantially the same as the approach used by LabVIEW RT. In the embodiments shown, the CSI has a fixed IP address "192.168.0.4".

As FIG. 15 indicates, the host PDA may be connected to the CSI via IrDA or Serial cable. In an embodiment where the graphical program to be deployed to the CSI comprises a LabVIEW graphical program, LabVIEW may be opened on the host PDA, and the execution target specified, e.g., to be "192.168.0.4". LabVIEW includes host functionality, referred to as LabVIEW Host, which allows the PDA to download the graphical program to the specified IP address, and at connection time, LabVIEW Host detects the type of target device as CSI (i.e., a minimal graphical program execution engine platform).

In a preferred embodiment, the graphical program may be downloaded from the host PDA to the CSI in two ways:

1) SLIP over serial cable: The CSI appears as a regular IP target to LabVIEW Host. LabVIEW Host connects to the CSI by specifying the CSI's IP address, e.g., by a user selecting the CSI's IP address from a target selection dialog. The TCP/IP connection relies on SLIP over serial cable for data transmission, which implies that the host PDA includes a SLIP interface attached to the serial UART0 that drives the IR transceiver. The configuration may take place outside and without the knowledge of LabVIEW. For example, in one embodiment, commands to set up SLIP on the host PDA (in this case, a Sharp Electronics Zaurus SL-5500) may include:

slattach -p slip -s 115200/dev/ttyS0 &
ifconfig sl0 192.168.0.3 pointopoint 192.168.0.4 up 2) SLIP over IR: The CSI appears as a regular IP target to LabVIEW Host. LabVIEW Host connects to the CSI by specifying the CSI's IP address, e.g., by a user selecting the CSI's IP address from a target selection dialog. The TCP/IP connection relies on SLIP over infrared for data transmission, hence during downloading and talking to the CSI the host PDA IR transceiver must be oriented towards the CSI's transceiver. This implies that the host PDA includes a SLIP interface attached to the serial UART that drives the IR transceiver. The configuration may take place outside and without the knowledge of LabVIEW. For example, in one embodiment, commands to set up SLIP on the host PDA may include:

slattach -p slip -s 115200/dev/ttyS2 &
ifconfig sl0 192.168.0.3 pointopoint 192.168.0.4 up These commands tell the kernel that the serial port /dev/ttyS2 should be treated as a SLIP interface, and set the IP address on that interface specifying the IP address of the peer as well. Note that SLIP is a point-to-point protocol, unlike Ethernet or other broadcast media. The same commands configure the host PDA to use serial wire to talk to the CSI. The main drawbacks of using IR is its limited range and bandwidth. The main advantage is a completely a wireless setup. Other embodiments where the medium may be fully taken advantage of may use a protocol designed for a wireless medium such as IrDA or Bluetooth, among others. Note that TCP/IP is not an optimal solution in this approach because of its point-to-point nature and its assumption of a full-duplex medium.

In one embodiment, the serial cable that connects the PDA with the cradle requires a male DB9 connector, and thus, if the serial cable has a female DB9 connector, the following lines should be connected: 5-5, 2-3, and 3-2.

In one embodiment, to set up SLIP on the host PDA, a "slsetup.sh" script may be run to set the connection automatically. An alternative to using "slattach" is to connect serial lines 4,7,8 (DTR, RTS, CTS) together, and simply use the original slattach program from Linux.

Communication with the CSI During Application Execution

In one embodiment, communication between the host PDA and CSI may be implemented in two modes:

1) Via LabVIEW FPP (front panel protocol) which runs over TCP/IP just as in 'classical' setups: LabVIEW RT or the minimal graphical program execution engine over Ethernet, except that in this scenario the TCP/IP connection relies on SLIP over infrared or serial. The host PDA may display data received from the CSI and the user may control the CSI using the controls on the front panel. Note that LabVIEW FPP works over the serial cable and IrDA.

2) Via a custom protocol, and using the Infra-Red wireless connection between the host PDA and the CSI.

Performing a Measurement with the CSI

In a preferred embodiment, the CSI is a processor card (e.g., a LabVIEW processor card) that can be programmed to do measurement, and data transmission. In one embodiment, card may be made as small as possible, omitting I/O features from the processor card design. Referring back to the embodiment of FIGS. 13A and 13B, an acceleration sensor (ADXL202, from Analog Devices) may be included on the processor card to perform measurements. The ADXL202 is a 2-axis acceleration sensor that can measure both static and dynamic acceleration with a resolution of 0.4 mg and with an adjustable bandwidth that is set at 100 Hz on the current CSI. The ADXL202 has an output of type "duty cycle" with adjustable period. A counter on the ARM may be used to read the ADXL202.

In that same embodiment, the CSI board also includes temperature sensor (TCN75) that can be read over the $I^2C$ bus. This sensor has a precision of 0.5 degrees C. in the range [−55 C; +125 C]. The data read from this sensor may be in 2's complement format.

Thus, by using on-board sensors, the CSI may be operable to perform various measurements, although in other embodiments, the sensors may be off-board, and coupled to the board via terminals, as noted above. Once the data have been collected from the sensors, the CSI may send the data to the host PDA, or may process the data on-board, e.g., in accordance with the functionality provided by the deployed graphical program, optionally sending results to the PDA.

Booting the CSI with a Graphical Program

In one embodiment, the CSI may be operable to be booted up in different modes. For example, depending upon a boot sequence and jumper settings, the CSI may boot up and wait for a graphical program to be deployed, or may boot up and execute a graphical program that was previously deployed on the device. Details of the boot sequence and its execution are provided below.

FIG. 16—CSI Flash Memory Map

In a preferred embodiment, the CSI includes flash memory for storing program instructions implementing the CSI programmable functionality. FIG. 16 illustrates one embodiment of a flash memory map for the CSI. In the embodiment shown, the terms "matchbox" and "VI" refer to the minimal graphical program execution engine and the deployed graphical program, respectively.

As FIG. 16 shows, the flash memory includes respective sections for a boot loader (labeled "afu"), execution engine symbols (labeled "matchbox symbols"), the execution engine itself (labeled "matchbox"), executing graphical programs (labeled "running VIs"), and the stored flatfile (labeled "stored flat object").

In one embodiment, the boot-up sequence for the CSI may be performed as follows:

1. The ARM processor starts running at flash address0, where address0 is the start address of the AFU (ARM File Up-loader). The AFU is a boot loader used for writing the minimal execution engine and minimal execution engine symbols to flash memory via serial link. AFU itself may be downloaded (previously) to flash using the JTAG port.

2. The AFU reads Switch1. If Switch1=OFF, the AFU continues execution by waiting for serial commands (One example of serial command is: write binary files to flash memory). If Switch1=ON, the AFU jumps to the minimal execution engine flash memory location, eCos and the minimal execution engine start execution.

3. The minimal execution engine starts by reading Switch2. If Switch2=OFF, the minimal execution engine reads the flatfile from flash and starts execution (e.g., performs relocations, placing read-only code in "running Vis" area, placing read-write sections in RAM, running init functions, etc.). If Switch2=ON, the minimal execution engine ignores the flatfile from flash memory and continues execution by running the graphical program (VI) that has been downloaded, or by waiting for a new download.

Download Behavior

At download time, the minimal execution engine may read Switch2 position. If Switch2=OFF, the flatfile may be transferred from the host PDA to the CSI and stored in a CSI flash storage area. In one embodiment, location dimensions that are reserved in CSI flash memory for VI-download and VI-storage may be modified. The mechanism used by the embodiment described above is very simple but is not optimized for low memory usage. Other embodiments may includes more sophisticated approaches that are optimized to minimize memory requirements.

The LabVIEW Realtime Environment

Typically, OS-incapable devices do not have enough processing and memory capabilities to support an OS. For example, embedded devices with less than 2MB of flash, such as the ARM7, 8051, PIC, etc, are incapable of supporting an OS. These devices generally have a boot-loader or some type of serial debugger monitor, e.g., like the AFU, that allows the developer to talk to the device from a host computer (the host PDA). These types of device typically consume less power, are less expensive to build in terms of components ($25-$75 BOM (Bill of Materials) cost), are smaller in size, have reduced processing power, and have performance typical of "smart sensor" devices. Most of these devices will not run Linux or WinCE, and so an appropriate OS is preferably more modular than those OSs, e.g., an OS that may be compiled together with the application program. As noted above, eCos is a good example of an OS suited for OS-incapable target devices, in that eCos is a library that compiles at runtime together with the application.

Thus, for OS-incapable devices, embedded systems may require various components that are optimized or modularized to operate under restrictive resource limitations. For example, in an embodiment that uses National Instruments' LabVIEW, an exemplary LabVIEW-based embedded system may comprise components on both the host PDA and a CSI device:

Host PDA: LabVIEW modules created on the host side that provide functionality required by applications downloaded onto the CSI device, and CSI device: a real time engine based on LabVIEW RT, i.e., a smaller footprint version of LabVIEW RT referred to as the minimal execution engine.

As mentioned above, in the minimal execution engine paradigm, LabVIEW Host software is modular. The compiled, linked and compressed LabVIEW code that is downloaded to the CSI device embeds LabVIEW modules providing functionality required by the application.

The real time engine, i.e., the minimal execution engine/eCos, has been described above with respect to embodiments using the ARM7 from Atmel. It should be noted that similar minimal execution engines/eCos may be created for other ARM chips, and/or for chips from other manufacturers. Generally, the user may want to build and download a minimal execution engine/eCos based on the ARM processor (or other processor) and eCos components the user chooses. Therefore, in one embodiment, a minimal execution engine/eCos driver may either need to be given to the customer in source code format, or the eCos part may be separated from the minimal execution engine, and a binary minimal execution engine that is valid for any ARM processor be provided to the user. This minimal execution engine is preferably compiled together with eCos components on the host side before it gets downloaded on the CSI device.

Operation of the CSI Device

The following describes operation of the CSI device, according to one embodiment. Is should be noted that the following description is intended to be exemplary only, and is not intended to limit the CSI device to any particular form or function. Note also that in the following description, the term "VI" refers to a graphical program. As described above with reference to FIG. 13B, the CSI hardware has the following attributes:

Processor: AT91FR40162 ARM7—Atmel.
Memory: 2MB Flash, 256 KB of RAM.
Speed: configurable: 33.3 MHz, 3.3 MHz, 330 KHz.
Connectivity: serial port, infrared interface, I2C bus.
Sensors on board: TCN75 temperature sensor, ADXL202 acceleration sensor.

CSI JUMPER Configuration:

The Configuration section on the CSI contains 4 binary switches that determine Board functionality as follows:

Switch 1:
OFF—the CSI runs AFU (Arm File Uploader) at boot-up. This allows flash (re)programming, and is used to download the minimal execution engine onto the CSI.
ON—the CSI runs the minimal execution engine at boot-up.

Switch 2:
OFF—at boot-up, the minimal execution engine will LOAD the VI that has been saved in flash, and will START running this VI. At VI download time, the VI will also be SAVED in CSI flash. If the CSI is to boot-up with a previously loaded VI, Switch2 should be set in the OFF position.
ON—at boot-up, the minimal execution engine will NOT load any VI from flash, and it will NOT save Any VI in flash. If the VI that was already saved in CSI flash is not valid anymore and is to be replace with another VI, then the CSI should be started with Switch2 in the ON position. Then, after connection with the LabVIEW Host has been established, Switch2 should be changed to the OFF position without resetting the CSI. This allows the current VI to be saved in the CSI flash memory.

Switches 3 and 4 modify processor FREQUENCY. For example, IR communication may be configured for 33 MHz processor frequency by setting switch 3 and switch 4 to 1 and 0 respectively.

In one embodiment, the CSI includes an LED that provides the following functionality/states:

LED: ON continuously when the CSI runs AFU (Arm File Uploader) at boot-up.
LED: ON/OFF when the CSI starts with minimal execution engine (Switch1=ON). LED will be ON during erase/write flash operations and while loading VI from flash memory.

LED: fast blinking if the CSI boots-up from flash (Switch2=ON) without running any VI.

LED: slow blinking if the CSI is running a VI that requires high processing power.

Detailed Walk-Through

The following provides a detailed walk-through for operation of an embedded system including a host PDA (e.g., a Sharp Zaurus), one or more CSIs, one or more cradles, and a serial cable. Note that this embodiment uses LabVIEW.

Loading a VI on CSI Using the Serial Cable:

1. Set Switch1=ON (the CSI will run the minimal execution engine at boot-up).
2. Set Switch2=ON (the CSI will not try to load a VI from flash).
3. Connect the CSI to the cradle.
4. Power-up the docking station, and connect the Serial cable between the cradle and the PDA. The LED should be blinking fast.
5. Run X11 on the PDA.
6. Run LabVIEW
7. Go to "Select Target Platform" (under LabVIEW) choose "RT Engine on Network", and type the IP address of the CSI=192.168.0.4 or choose "Network: 192.168.0.4" if this selection already exists.
8. Open the VI, e.g., CSI.vi on the PDA.

NOTE: If the user starts the operation with Switch2=OFF, i.e. if the user wants to load a VI from CSI flash, then after connection between the PDA and the CSI is established, LabVIEW may open the panel of the running VI (on the CSI). The VI may be closed, and another VI downloaded. Switch2 should be set to ON only if the VI from CSI flash is o NOT to start.

Loading a VI on CSI Using the IR Connection:

1. Set Switch1=ON (the CSI will run the minimal execution engine at boot-up).
2. Set Switch2=ON (the CSI will not try to load a VI from flash memory).
3. Connect the CSI to the cradle.
4. Power-up the cradle and connect the serial cable between the cradle and the PDA. The LED should be blinking fast.
5. Run X11 on the PDA.
6. Run LabVIEW-IR to download via IR.
7. Go to "Select Target Platform" (under LabVIEW-IR), choose "RT Engine on Network", and type the IP address of the CSI=192.168.0.4 or choose "Network: 192.168.0.4" if this selection already exists.
8. Open the VI, e.g., CSI_IR.vi on the PDA.

In each of these walk-throughs, step 8 specifies opening a respective front panel or VI on the PDA. Note that this VI is opened on the PDA. As will be described below, once the VI is run, the VI is automatically deployed onto the CSI device, and executes on the CSI device, where the PDA then displays the front panel of the VI via the Front Panel Protocol, as mentioned above. An example of this front panel is described below with reference to FIGS. 17. The walk-throughs continue after the description of FIG. 17.

Figure 17:
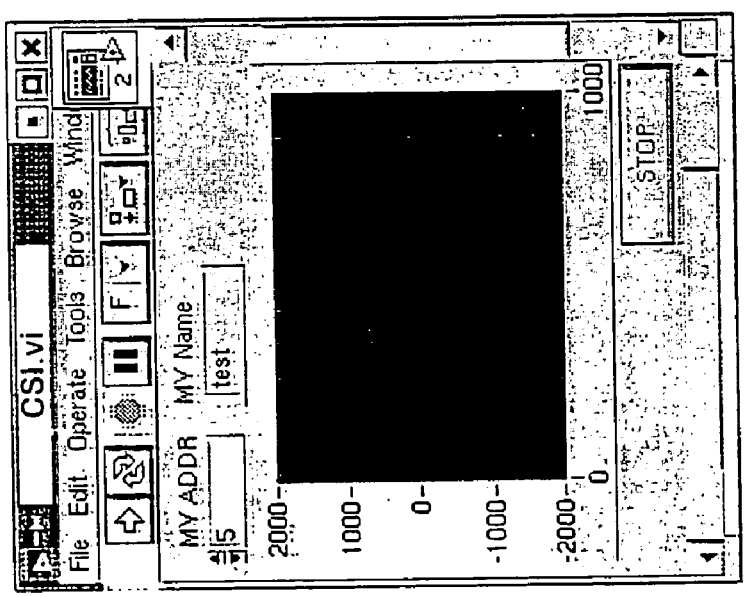

FIGS. 17—Example Front Panel

FIGS. 17 illustrate an exemplary front panel (VI) used in the operation of the CGSI, according to one embodiment. More specifically, FIG. 17 illustrates a front panel for configuring and/or activating the CSI using a serial cable, as mentioned in step 8 of the first walk-through above. A similar front panel may be used for opening or activating the CSI using IR (see step 8 of the second walk-through), in that the VIs differ only in the internal communication functionality specified.

As shown in FIG. 17, a local device name and address (integer 1 to 5) may be set using this front panel. The specified address may be used on the PDA to select the data array that represents downloaded measurements from the CSI that has that particular address. Note that this name and address are only local labels for the device used to organize or label data from the device, i.e., this address is not to be confused with the specified IP address mentioned above. Note also that if the user wishes to save the information set on the panel together with the VI when it is saved in CSI flash memory, "Make Current Value Default" should be set on these controls.

Walk-through (Continued):

9. Once the VI of step 8 (of either walk-through above) is opened, the (local) device name and/or address may set using the displayed front panel (see FIG. 17).
10. If the user wishes this VI to be saved in CSI flash, e.g., for later execution at boot-up, Switch2 should be set to OFF now.
11. Run the VI.
12. The VI downloads onto the CSI, and executes. Data from the acceleration sensor may now be viewed on the panel graph (displayed on the PDA).
13. It may take 1-2 seconds until the download bar appears. If the CSI gets blocked during download, set Switch2=ON, reset the CSI board, and repeat the connect and download procedure.
14. If the download operation is successful,
 a) the CSI.vi (or CSI_IR.vi) diagram is running on the CSI,
 b) the CSI.vi (or CSI_IR.vi) panel is seen on the PDA via Front Panel Protocol method via Serial cable or IR.

Note that in one embodiment, CSI.vi contains an infra-red (IR) communication section that manages communication between the PDA and the CSI. Data may be read from the acceleration sensor on the CSI at a scan rate of 10 samples/sec. These data points may be stored in a circular buffer 32 Kbytes wide in CSI RAM. The data may be transferred via IR to the PDA at PDA request.

15. Now that the application is running successfully, the CSI may be disconnected from the cradle or from the IR connection, and placed somewhere else for independent (from the host PDA) measurements. For example, the user may choose "Switch Execution Target" to "LabVIEW for Linux" or, alternatively, choose File Menu, Exit without closing the LabVIEW RT Engine, thus stopping LabVIEW.
16. Disconnect the CSI from the cradle, place the CSI elsewhere with power attached. Since the VI was never stopped, it will continue to run. Alternatively, if the VI were stopped and started again, assume that it was previously saved in CSI flash memory and Switch2 set to OFF.

Figure 18:
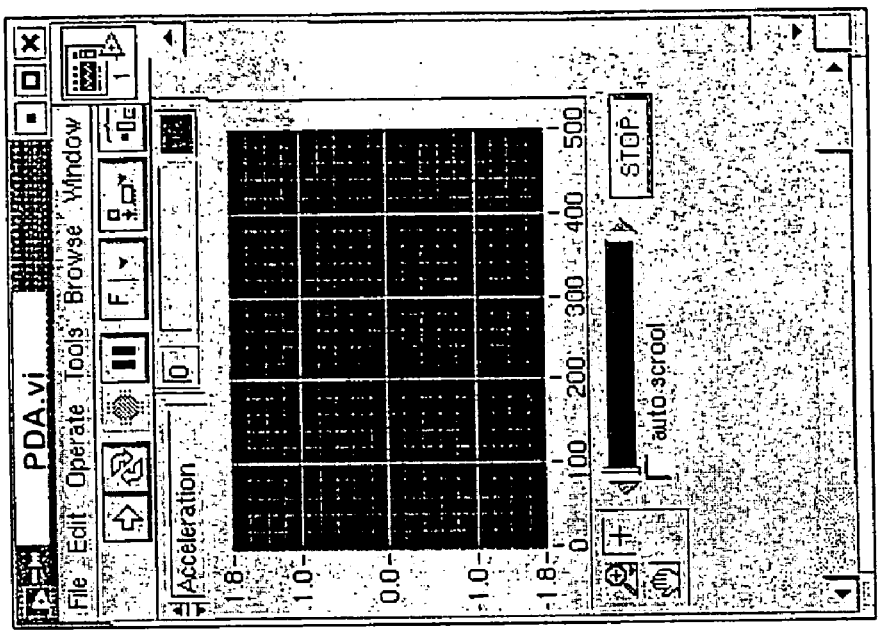
FIGS. 17 and 18 illustrates front panel displays for displaying data from the CSI, according to one embodiment.

FIG. 18—PDA.vi: Monitoring CSIs While Roaming

Once the PDA has been disconnected from the (running) CSI, it may be desirable to reestablish communication with the device to monitor the output, and so a monitoring VI on the PDA is needed that is capable of reading data from the running CSI via wireless (IF). Thus, a monitoring VI named PDA.vi may be provided, as described below.

FIG. 18 illustrates one embodiment of a front panel of a VI that executes on the PDA and operates to perform a discovery process, thereby locating a CSI proximate to the PDA. Once the CSI is discovered, the VI may establish communication with the CSI via IR link, and receive and display data from the CSI. In other embodiments, the user may interact with the CSI via the VI. Note that this discovery process may actually be a mutual discovery process, in that the CSI device may also perform a discovery process to detect and establish communication with the PDA.

The following is a walk-through of operation of the system to perform this type of roaming monitoring, according to one embodiment.

1. Open the monitoring VI, e.g., PDA.vi. PDA.vi communicates with one or several CSIs by using a protocol for infra-red (IF) communications. This protocol is very similar to the first two layers of the IrDA SIR. At the lowest level there is a data manager that is included in LabVIEW (e.g., LabVIEW for the PDA) that sends/receives IR packets, and verifies the CRC16 control sum for error detection. The next level of communication is implemented in PDA.vi, and communicates with the LabVIEW manager via "call function library" type calls.

2. Run PDA.vi. Bring the PDA PDA close enough to a CSI, i.e. in the IR range of a CSI (1-1.5 m open sight). Detection between the CSI and the PDA is PnP, and so may take place transparently via the IR ports of the two devices. Therefore, at this point the PDA knows the address and name of the CSI device. Now, using the PDA.vi panel, the user may choose to monitor acceleration or temperature.

Monitoring Acceleration

In one embodiment, PDA.vi stores 8192 pairs of points of type (x, y) for each CSI that it monitors, where X=index of point in array 100 msec apart, and Y=acceleration in g (gravitational value). Therefore, every time the user chooses to monitor acceleration, and the PDA is pointed towards a CSI that is in the IR range of the PDA and is measuring acceleration, 8192 pairs of (x; y) points may be displayed on the panel graph.

In one embodiment, the PDA reads a maximum of 240 points at a time from the CSI buffer. The PDA may continuously send data request messages to the CSI, so if the CSI buffer is empty, e.g., due to the measurement time being longer than transmission time, the CSI may simply return as many points as it has available.

Monitoring Temperature

In this case the graph will show one temperature value at a time. Every time the user chooses to monitor temperature, and the PDA is pointed towards a CSI that is in the IR range of the PDA and is measuring temperature, temperature values may be received and displayed one point at a time on the panel graph.

Note that in the embodiment shown, the PDA.vi panel also displays the address and name of the monitored CSI. Additionally, in the embodiment shown, there is also an auto-scroll function on the panel for historical values viewing.

This roaming monitor functionality of the system has applications in many fields, including, for example, product quality monitoring on a manufacturing plant floor, where a user may "roam" an assembly line or inventory, monitoring the status of equipment or products via CSI/sensors, where each device reports or sends data regarding the equipment or product when the user is proximate. In some embodiments, the CSI devices may implement power management functionality such that the device may go into sleep mode, then "wake up" when the user approaches the device.

LabVIEW CSI IR Protocol

As described above, some embodiments of the present invention involve communication between the PDA and the CSI over an IR link. Such communication generally requires a communication protocol to reliably send and receive data between the two devices. One such protocol is described below.

Overview

The following describes one embodiment of a protocol for IR communications between the PDA and the CSI. The primary aim of the protocol is to be as small, simple, and effective as possible. In this embodiment, the protocol stack has 3 layers:

1. Physical Layer (PHY)—the IR transceiver is connected to a serial interface. The transmission is compatible with SIR encoding and allows infrared data transmission up to and including 115.2 kbits/s. This layer is preferably implemented by hardware and OS (ecos/linux) which provides functions for read/write serial data.

2. Link Access Protocol (LAP)—implements functions like packet formatting, CRC (Cyclic Redundancy Check) checksum generation/check, BOF (Beginning of Frame) detection etc. This layer is preferably implemented as managers compiled in LabVIEW and the minimal execution engine.

3. Link Management Protocol (LMP)—implements functions like pnp device discovery, request/reply channel data etc. This layer is preferably implemented in VIs from LabVIEW.

Figure 19:
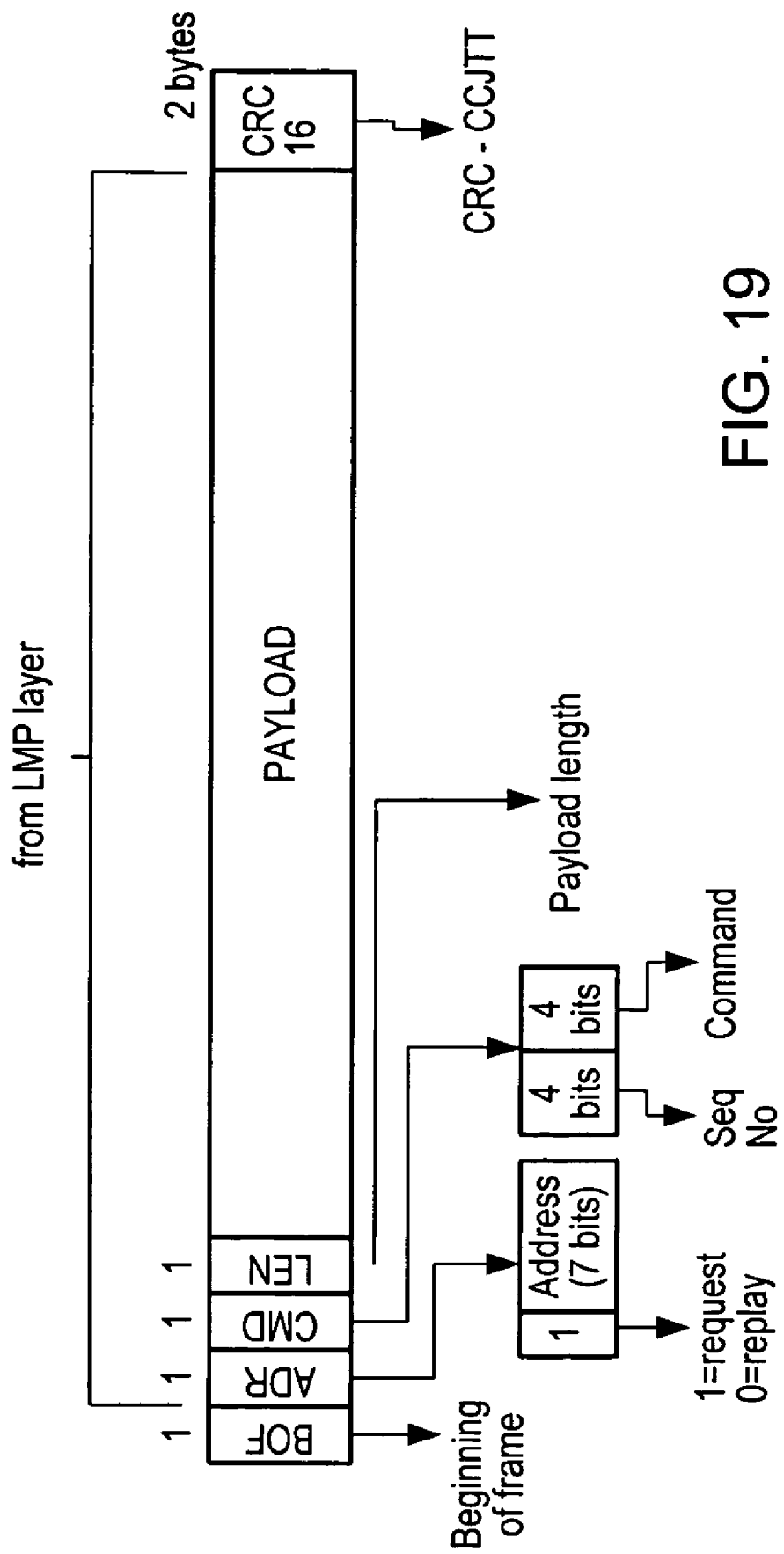
FIG. 19 illustrates an IR Link frame, according to one embodiment.

FIG. 19—IR Link Frame

FIG. 19 illustrates one embodiment of a frame sent on the IR link. In this embodiment, the frame includes fields for BOF, ADR (address), CMD (command), LEN (length), Payload (contents), and CRC (for checksum), such fields being well known in the art of packet/frame communications. Further details are provided below.

Link Access Protocol (LAP) Layer and LAP Frame

In one embodiment, the LAP layer may add two fields to an LMP (Link Management Protocol) frame:

BOF—a special character (0xAA) used to mark the beginning of a LAP frame, and

CRC—cyclic redundancy check (2 bytes).

Service Access Points (SAP)

The LAP layer may communicate with PHY layer through non-blocking OS read/write calls to a serial device to which the IR transceiver is attached. The communication with the LMP layer may be implemented using 2 queues (mutex protected) one for packets to send and one for received packets.

LAP Wrapper

In one embodiment, the LAP layer implements a wrapper which defines a character transparency mode that transforms information bytes that would otherwise be interpreted as flags or other control characters into non-flag/control characters prior to transmission. For example, special control characters used by this layer may include:

BOF—Beginning of Frame (0xAA), and

ESC—Escape Char (0x55).

The contents of a frame may be substantially unrestricted, which can be problematic, since a BOF byte (0xAA) that appears to be a control character may occur. An Escape byte (ESC) is defined as binary 01010101 (0x55). In one embodiment, prior to transmitting a frame the LAP layer may examine each byte in a frame read from LMP layer. For each byte it encounters with the same value as a BOF or ESC byte, the LAP layer may insert an escape (ESC) byte preceding the byte, and complement bit 5 of the byte (i.e. XOR the byte with 0x10).

Sending Algorithm

In one embodiment, the frame may be sent to a receiving station in accordance with the following algorithm:

```
Calculate checksum CRC (described below) over LMP frame data;
For each byte in LMP frame data and CRC {
    If byte is BOF or ESC {
        Insert ESC;
        Insert byte XOR 0x10;
    }
}
```

In one embodiment, prior to the frame checksum computation, the receiving station may examine the entire frame. For each ESC byte encountered the receiving station may discard the ESC byte, and complement bit 5 of the byte following ESC.

In the embodiment shown in FIG. 19, following the PAYLOAD field (or LEN field if no PAYLOAD is present) is the cyclic redundancy check field (CRC). The purpose of this field is to check the received frame for errors that may have been introduced during frame transmission, as is well known in the art. This field contains a 16 bit CRC-CCITT cyclic redundancy check. The CRC is computed from the ADR, CMD, LEN and PAYLOAD fields.

CRC Generation:

The following describes one embodiment of cyclic redundancy check operations.

All bits of an LMP frame are preferably protected by the CRC. The CRC is calculated on bits as they are sent. The CRC is initialized to all ones, which allows detection of any missed or inserted zero bits at the beginning of a block (missed or inserted ones are still detected.) The one's complement of the CRC is transmitted rather than the CRC itself, facilitating detection of slippage-type errors. The CRC is sent LSB (least significant bit) first. In one embodiment, the following polynomial may be used:

$$X16+X12+X5+1.$$

To check an incoming data block, there are two options: calculate the CRC on all the protected bits and the CRC itself and then compare it to a known constant (0xF0B8); or calculate the CRC on all the protected bits only, omitting the CRC bits, and compare the calculated value to the received value.

Figure 20:
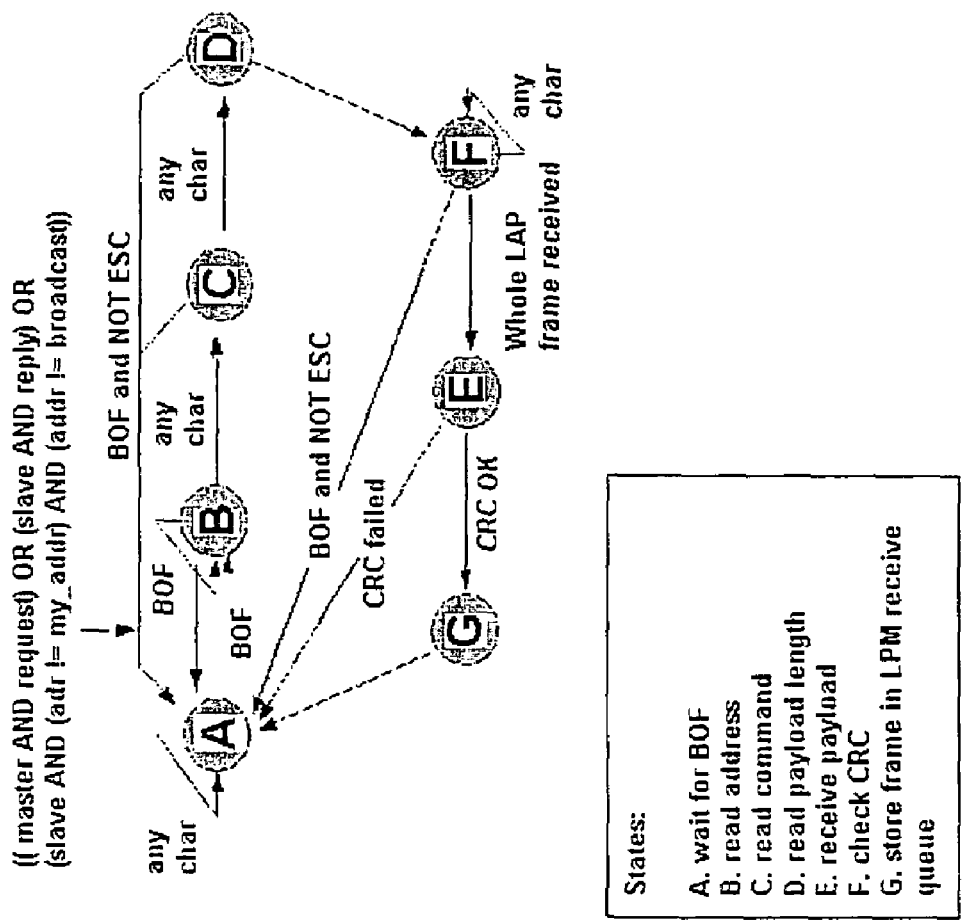
FIG. 20 illustrates a state machine for receiving frames, according to one embodiment.

FIG. 20—State Machine for Receiving Frames

FIG. 20 illustrates one embodiment of a state machine for receiving frames. As FIG. 20 shows, the state machine includes states and transitions between those states specifying behavior of the system/protocol with respect to the receipt of any character and the set of special or control characters, e.g., BOF and ESC comprised in a frame. More specifically, as indicated in the legend, the state machine includes the following states:

A—wait for BOF;
B—read address;
C—read command;
D—read payload length;
E—receive payload;
F—check CRC; and
G—store frame in LPM receive queue.

Thus, each received frame may be checked for correctness and completeness to ensure accurate communications between the sending and receiving stations.

Link Management Protocol Layer

In one embodiment, the link management protocol layer is implemented with LabVIEW VIs and communicates with the LAP layer through external functions which put frames in the LAP send queue and get frames from the LAP receive queue.

LMP Frame

As indicated in the frame representation from above (FIG. 19), the LMP layer uses the following fields:
ADR—request/reply flag+address (7 bits);
CMD—packet sequence number (4 bits)+command (4 bits);
LEN—packet payload length (8 bits);
PAYLOAD—user data.

LMP Commands

In one embodiment, the LMP commands used by the LMP layer include one or more of:

DISCOVERY (0x1)—a pnp discovery command sent by the master (PDA) every second. The command contains (in its payload field) the number of discovery slots and the current discovery slot. For example, the number of discovery slots may be set to 4, indicating that the master can communicate with up to 4 slave devices. When an unconnected slave (CSI) receives this frame it may generate a random number from 1 to the number of discovery slots, and wait for a corresponding discovery frame to arrive. When the current discovery frame slot number matches the generated number the slave may reply with its own address as a payload;

CONNECT (0x2)—this command is sent by the master to change the slave state to "connected". The slave replies with its name as the packet payload. If no command is received by the slave in a specified timeout period (e.g., 2 seconds), the slave may revert to an unconnected state;

READ (0x3)—a read command issued by the master. The command's payload field contains the requested channel and the requested maximum size. The slave replies with data if available, or with an empty packet if no data are available for that channel;

WRITE (0x4)—write command;
CONFIG (0x5)—configuration command; and
ERROR (0xF)—error reply packet from slave.

IrDA Communication in LabVIEW

IrDA™ (Infrared Data Association) is an industry standard for infrared wireless communication. Most laptops and substantially all PDAs sold today are equipped with an IrDA compliant infrared transceiver, enabling communication with devices such as printers, modems, fax, LAN, other laptops, other PDAs, and other devices that have IrDA compliant transceivers. Data transfer speeds typically range from 2400 bps-4 Mbps.

Although IrDA is used in a preferred embodiment of the present invention, it should be noted that other wireless communication protocols and technologies are also contemplated for use, including, for example, Bluetooth, IEEE 802.11 and 802.15.4 (WPAN), among others.

The following describes one embodiment of a method for IrDA communication in LabVIEW between a CSI device and a host PDA. In one embodiment, the IrDA library contains the following VIs:

Master VIs

IRInit.vi—this VI initializes the host PDA as a master.

IRSeek.vi—this VI is used on the host PDA to broadcast a slave discovery message (7F). IrDA discovery is of type PnP. A discovery command may be sent by the master (PDA) every second. The discovery broadcast command is sent to each slot, where each slot corresponds to a respective slave device (CSI). For an implementation where the number of discovery slots is set to 4, a maximum of 4 slave devices may be discovered, unless the number of slots (constant) is changed (e.g., manually) in the VI. When an unconnected slave (CSI) is in the IrDA transmitter physical range, it receives a discovery frame, and as a result generates a random number between 1 and 4. It then waits for the corresponding (number) discovery frame to arrive. When the current discovery frame slot number matches the generated number, the slave understands that it has been discovered, and replies (to the host PDA) with its own address as a payload, as described above.

IRCrtDev.vi—when a slave understands that it has been discovered, it replies to the master with its own address and name. This VI gets the address, name, and status of the current in-range slave device.

IRConnect.vi—this VI is sent by the master to change an in-range slave device status from unconnected to connected. The slave replies with its name as the packet payload. If, after the IRConnect command, the slave device does not receive any other command for a specified period, e.g., 2 seconds, then the slave device falls back to an unconnected state.

IRWrite.vi—this VI sends a packet from the master to the current slave device that contains information regarding the address and name of the slave, and a specified command intended for the slave.

IRRead.vi—this VI reads a packet from the current slave device.

Slave VIs

Ir_read.vi—this VI reads a packet from the master, where the packet contains information regarding the address and name of the slave, and the specified command information.

Ir_send.vi—this VI sends a packet from the current slave device to the master, where the packet contains information regarding the address and name of the slave, and the requested information.

Typically, a simple IrDA communication system may contain the following sequence of VIs:

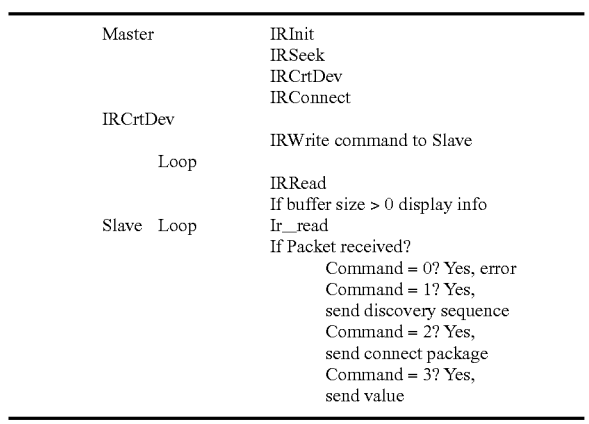

Thus, the IrDA protocol may provide means for communications between the host PDA (master) and the CSI (slave) over an IR link.

Figure 21:
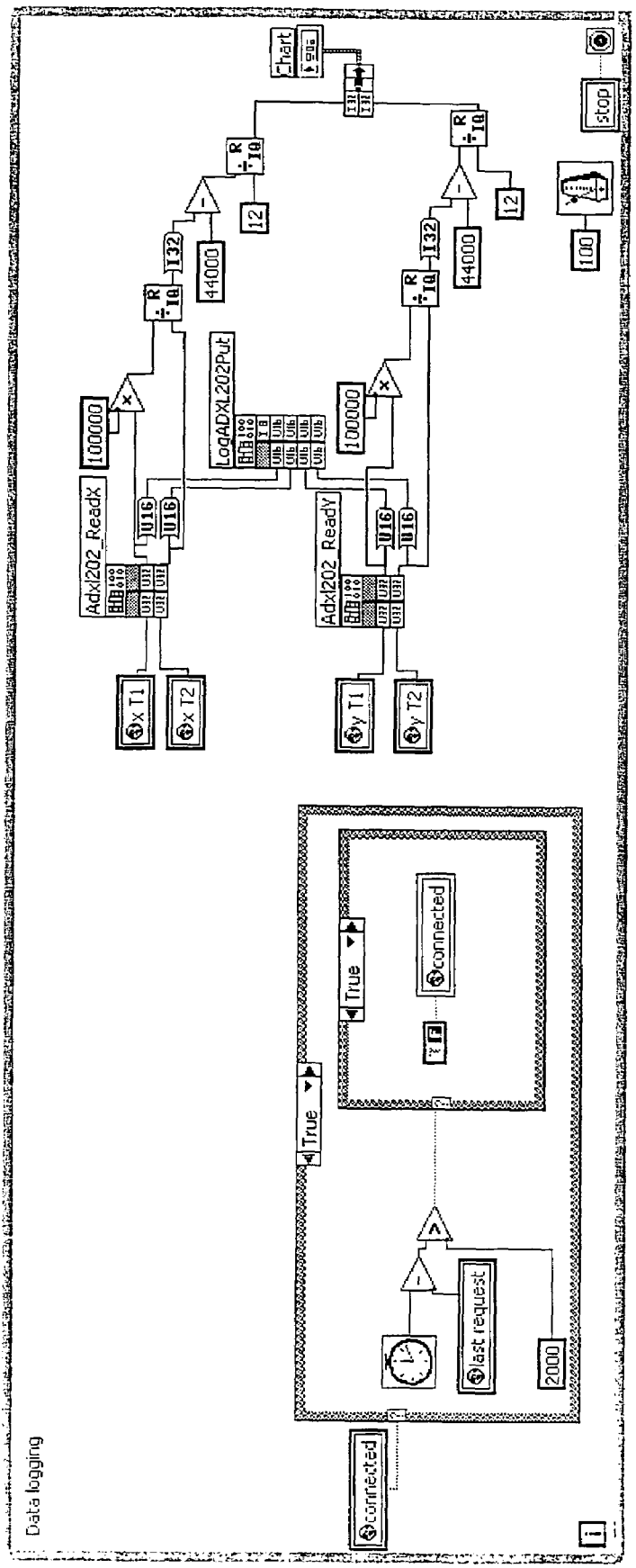
FIGS. 21-23B illustrate various graphical programs implementing portions of the present invention, according to one embodiment.
Figure 22A:
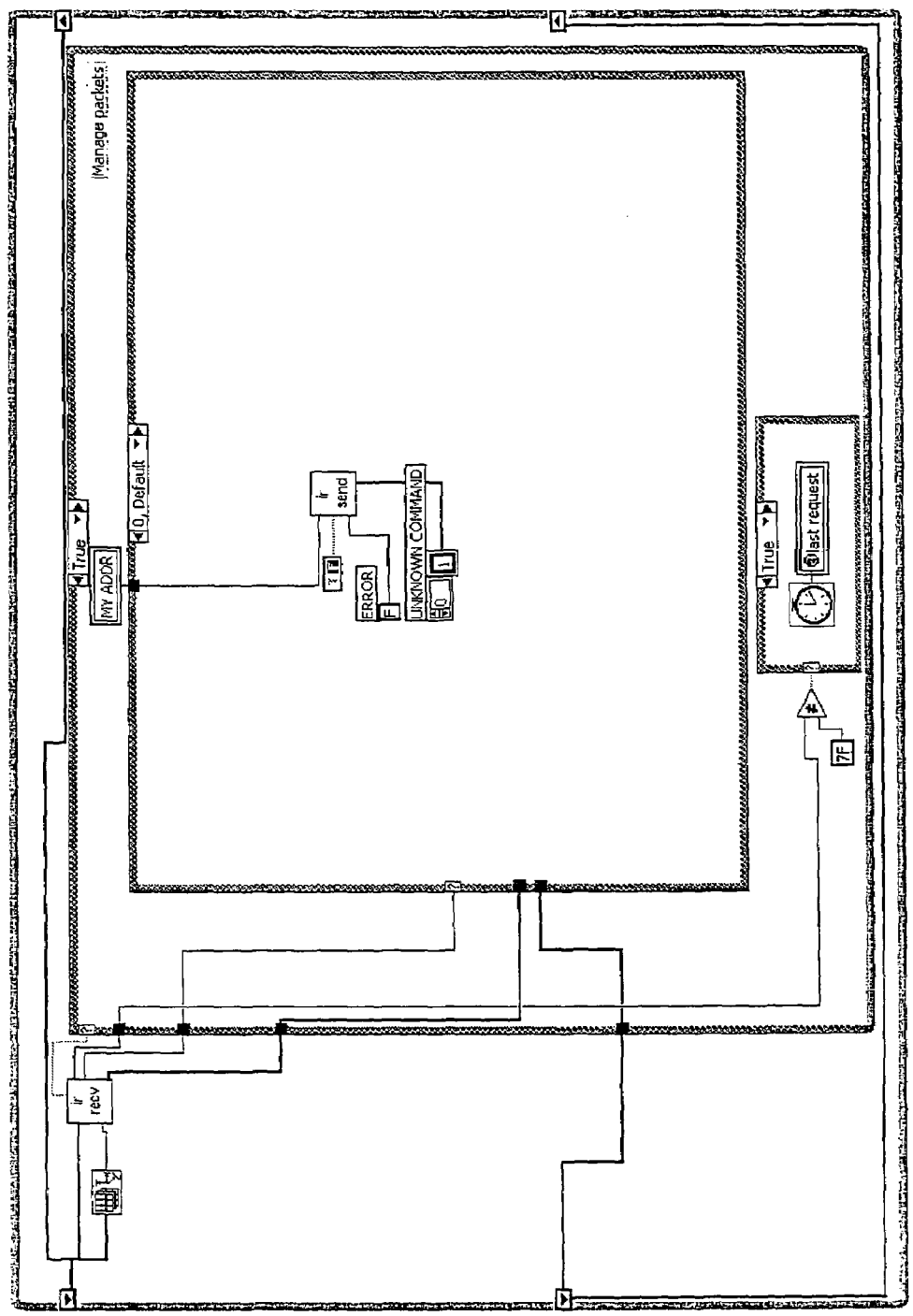
Figure 22B:
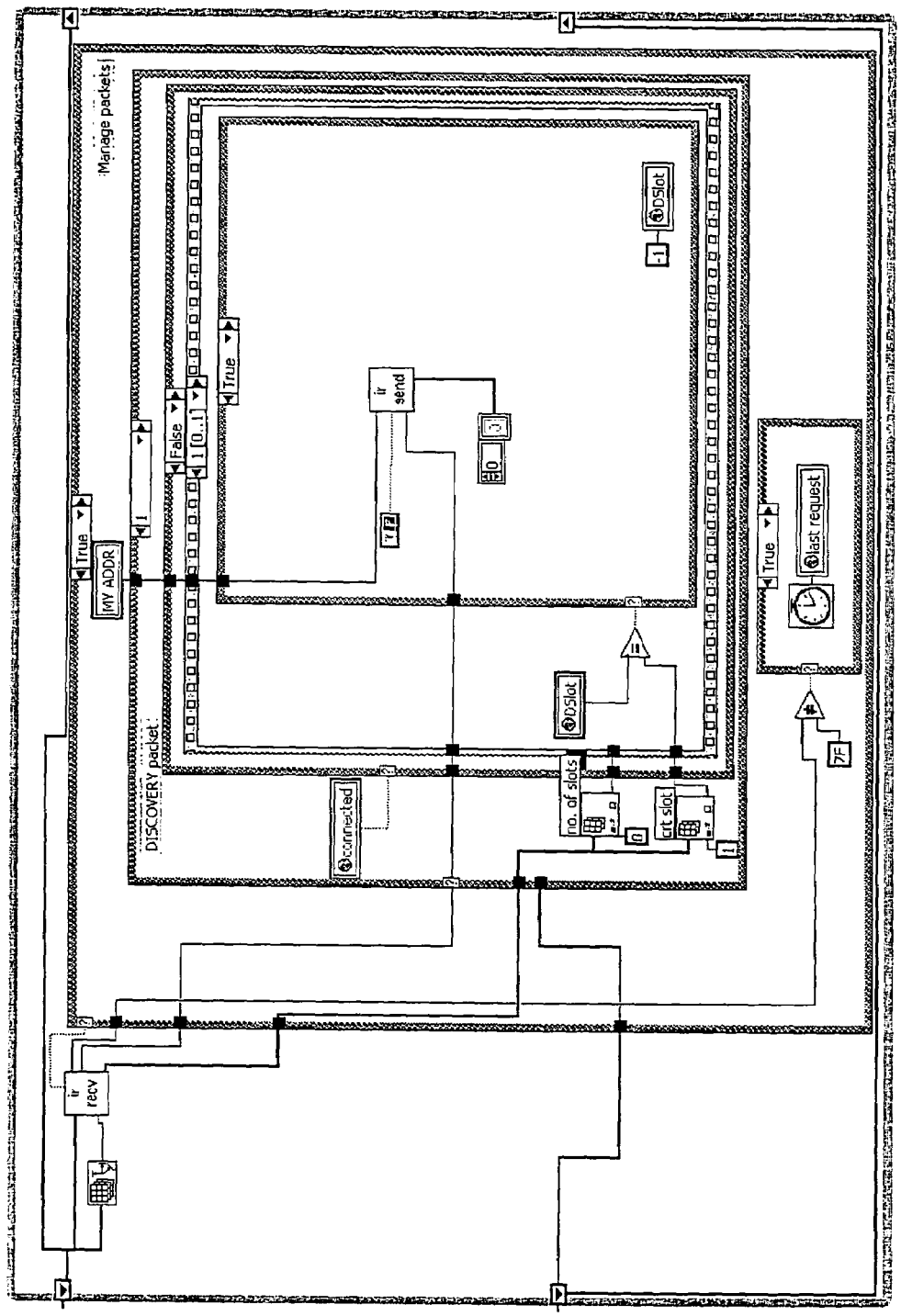
Figure 22C:
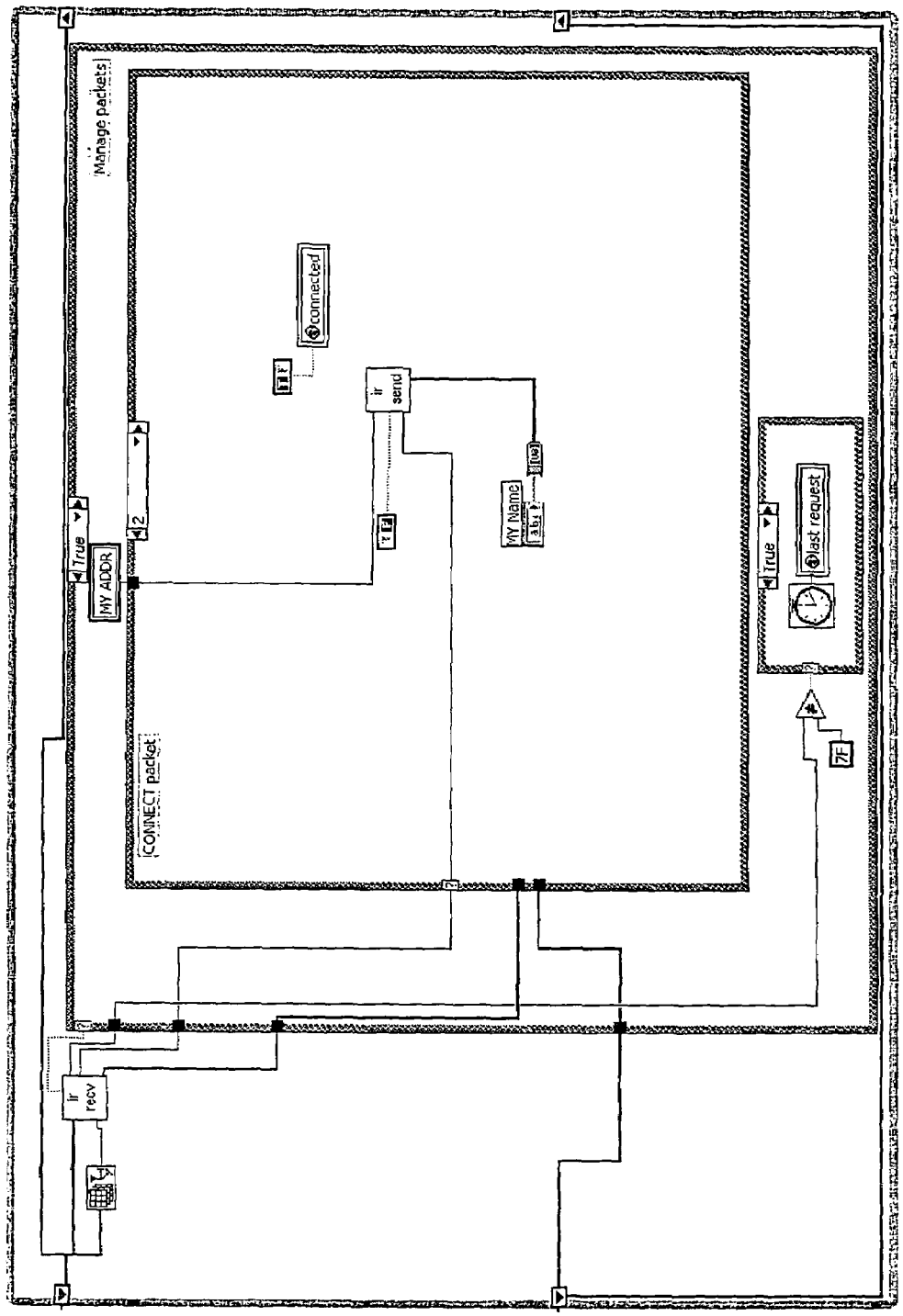
Figure 22D:
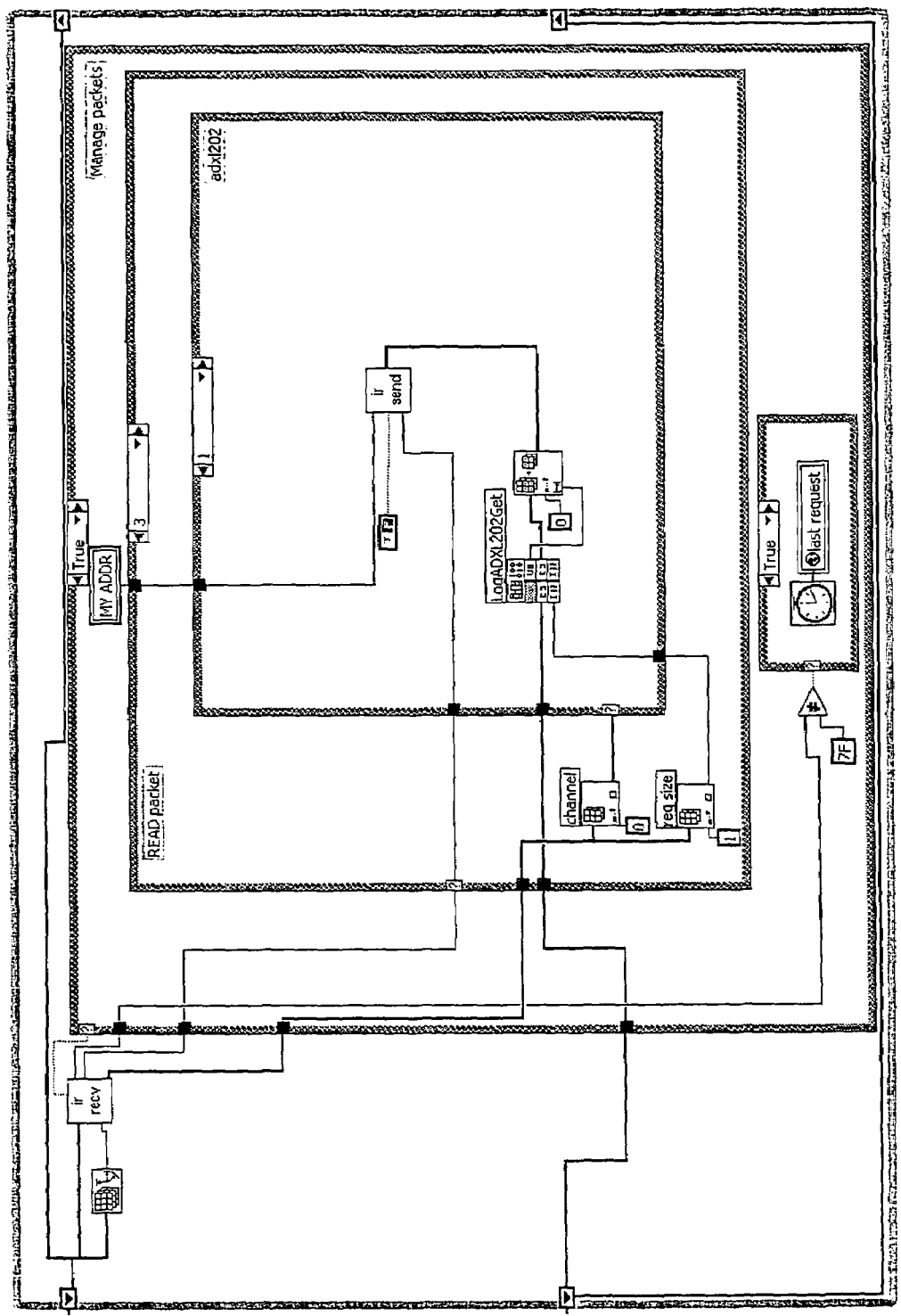
Figure 22E:
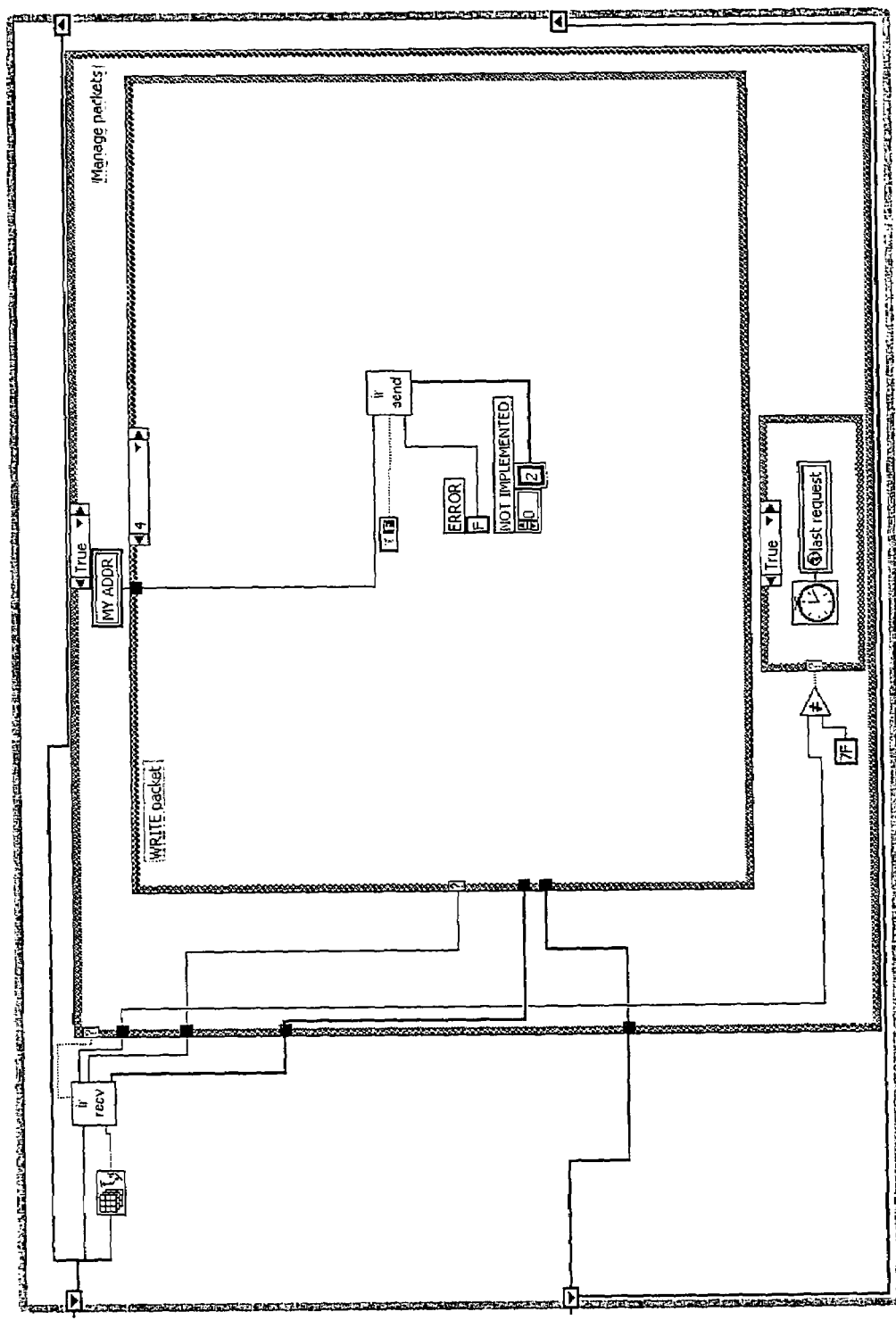

FIGS. 21-22E—Example Graphical Programs (VIs)

FIGS. 21-22E illustrate graphical programs or VIs implementing functionality according to one embodiment of the present invention, as described above. In this embodiment, the graphical programs are portions of CSI.vi, the graphical program that executes on the CSI device. The graphical programs shown are LabVIEW graphical programs, although graphical programs developed in other graphical program development environments are also contemplated.

As noted above, LabVIEW graphical programs (VIs) comprise a block diagram and/or a front panel, where the block diagram may include a plurality of interconnected icons or nodes that visually indicate the functionality of the block diagram, and where the front panel includes one or more indicator and/or controls for displaying or receiving data, respectively. In some applications, a block diagram may execute on a first device, e.g., a CSI, while a corresponding front panel executes on a second device, e.g., a PDA. Alternatively, as described above, the corresponding front panel may also execute on the first device (the CSI), and communicate the front panel information, including data to be displayed, to the second device (the PDA) via Front Panel Protocol (FPP) via SLIP (Serial Link IP), resulting in the second device displaying the front panel. Note that this FPP-based communication is bi-directional, and so data, e.g., user input, may also be transmitted from the second device (the PDA) to the first device (the CSI).

Collectively, the graphical programs shown in FIGS. 21-22E are executable on the CSI to read data from a sensor (accelerometer) and deposit the data into a local CSI memory location. The data are then sent from this location via Front Panel Protocol for display (e.g., on a graph) on the PDA screen (See FIGS. 17 and 18). The PDA runs or displays the panel for this application (via FPP), and so the data are shown on this panel display. Additionally, the data (the same acceleration data stored in the local CSI memory location) are also sent via IrDA to any IrDA receiver device that may discover the CSI, e.g., a second PDA running an application that monitors for IrDA connections in the vicinity. The second PDA operates to intercept the data sent from the CSI, and display the data on a graph, i.e., on a front panel executing locally on the second PDA, e.g., independently from the CSI. In other words, the second PDA runs a local LabVIEW application (including the front panel), and so does not utilize or receive the FPP-based communication from the previous case.

FIG. 20—CSI.VI: FPP CSI to PDA

FIG. 20 presents one embodiment of a graphical program for transmitting data from the CSI to the PDA via FPP (Front Panel Protocol) for display on the PDA. In this embodiment, the graphical program is a portion (a LabVIEW frame) of the graphical program CSI.vi. This graphical program executes on the CSI, and as FIG. 20 shows, reads data, X and Y axis acceleration from sensor, deposits the data in CSI memory, scales readings to acceleration units, and displays the data via FPP on a front panel (e.g., on a graph included in the front panel) on the host PDA.

In one embodiment, the PDA is connected to the CSI via a serial cable, and runs the graphical program application (e.g., CSI.VI), described below. Before loading the application onto the PDA, the user may specify that it will be executed on a device at an IP address (e.g., 192.168.4.1), i.e., the CSI. When the user runs the VI on the PDA, e.g., when the user presses the Run button of the VI on the PDA, the graphical program or VI is transferred or deployed to the CSI via SLIP (Serial Link IP) protocol over serial cable, and the application starts running on the CSI, displaying its front panel on the PDA via FPP. Thus, the graphical program shown in FIG. 20 operates to acquire data on the CSI and display the data in a graph on the PDA via FPP.

FIGS. 22A-22E—CSI.VI: CSI_IR_to_PDA

The graphical programs represented in FIGS. 22A-22E are a sequence of LabVIEW frames included in the graphical program CSI.vi. This sequence of code (frames) executes on the CSI. In parallel with the execution of the FPP_CSI_to_PDA graphical program described above with reference to FIG. 21, the CSI graphical program also executes to detect IrDA devices outside the CSI, e.g., PDAs, using IrDA hardware comprised on the CSI. In other words, if a PDA is pointed towards the CSI, and the PDA has an IrDA interface, and the PDA is running a graphical program that is also attempting detection of IrDA interfaces, than the two devices will see each other and communicate, e.g., will perform a mutual discovery process. The sequence of frames presented in FIG. 22A-22E implement this functionality.

More specifically, frame1, shown in FIG. 22A, sees the (IrDA-enabled) PDA and resets itself. Frame2, shown in FIG. 22B, sends a message to the PDA that it is available for contact. Frame3, shown in FIG. 22C, sends a message to the PDA with the (local) address and name of the CSI device. Frame4, shown in FIG. 22D, puts measurement data from the acceleration sensor into an IrDA transmission buffer on the CSI device. Frame5, shown in FIG. 22E, sends the measurement data from the IrDA buffer to the PDA. The PDA may then display or otherwise process the received data. The above sequence may then be repeated or terminated as desired.

Figure 23A:
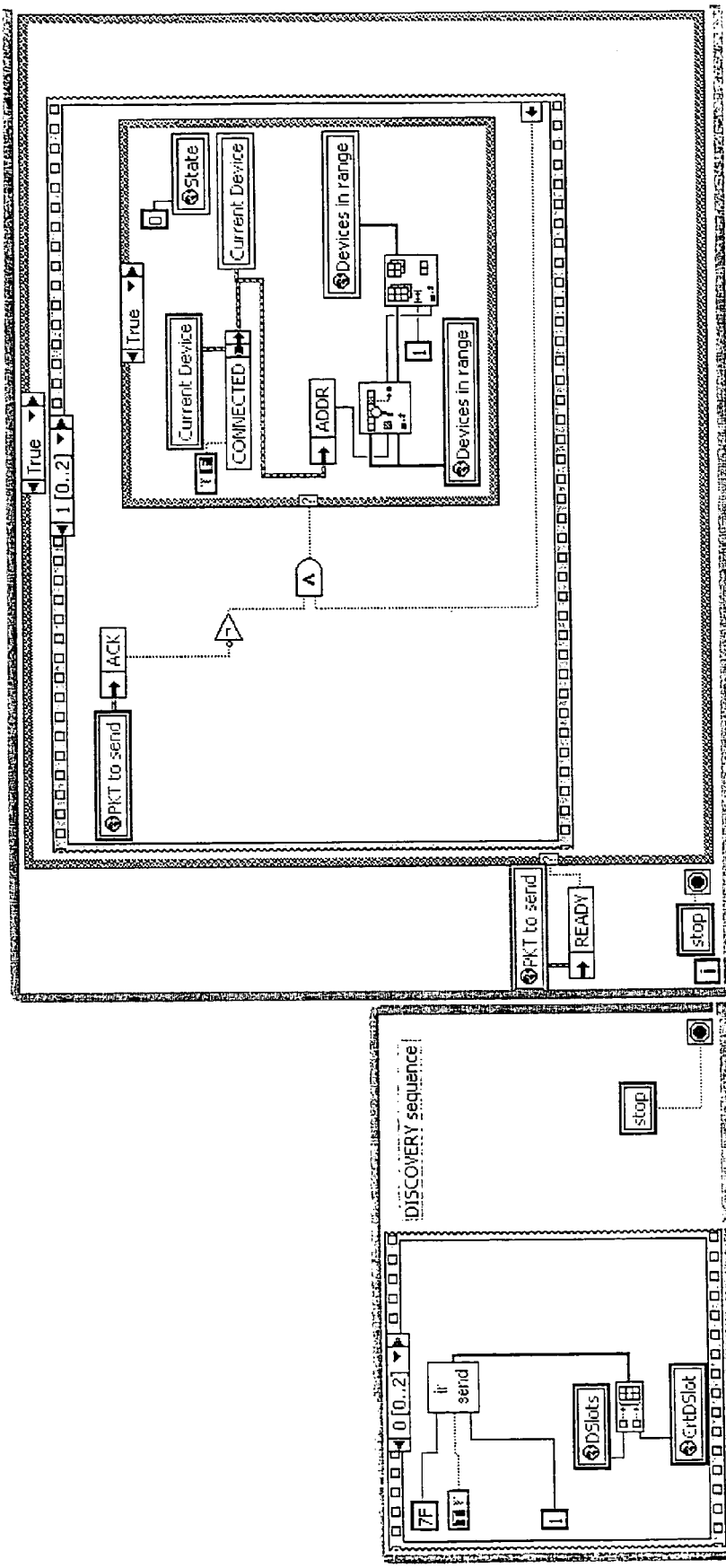
Figure 23B:
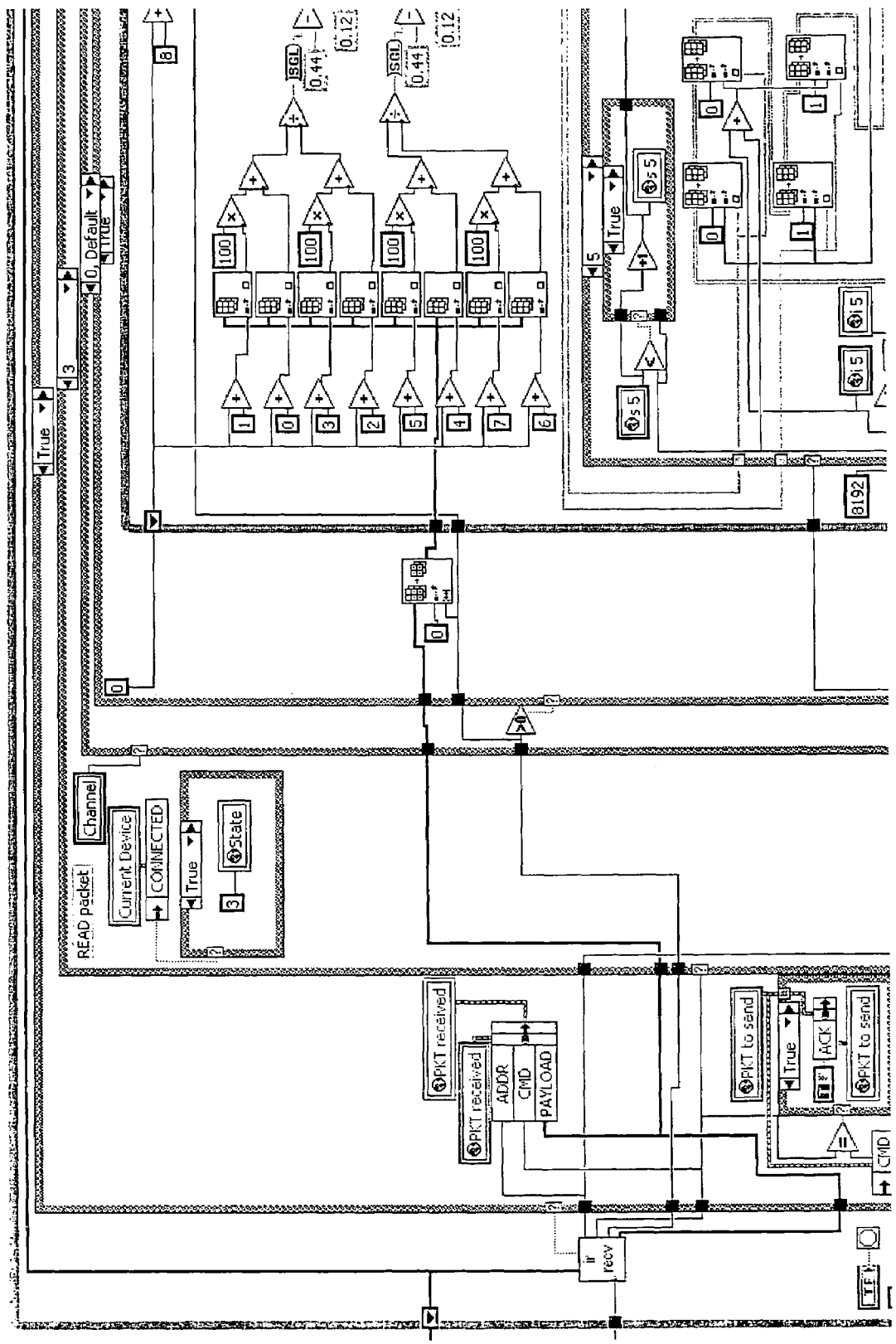

FIGS. 23A and 23B—PDA.vi

FIGS. 23A and 23B illustrate a graphical program, e.g., PDA.vi, that implements functionality corresponding to the PDA front panel VI described above with reference to FIG. 18. The graphical program executes on the PDA to detect and interact with the CSI. Note that in this embodiment, the graphical program has two parts, e.g., two graphical programs.

FIG. 23A illustrates a first graphical program (a first portion of the PDA.vi graphical program) that sends information from the PDA related to identification, and confirmation of communication to the CSI.

FIG. 23B illustrates (relevant portions of) a second graphical program (a second portion of the PDA.vi graphical program) that receives data from the CSI. The data are converted and presented or displayed on the PDA, e.g., in the PDA.vi panel (see FIG. 18).

Note that PDA.vi runs on the PDA, i.e., independently of the graphical program (e.g., CSI.vi) running on the CSI, communicating with that graphical program (application) via IR calls, e.g., receiving data from it (and/or sending to it).

Figure 24:
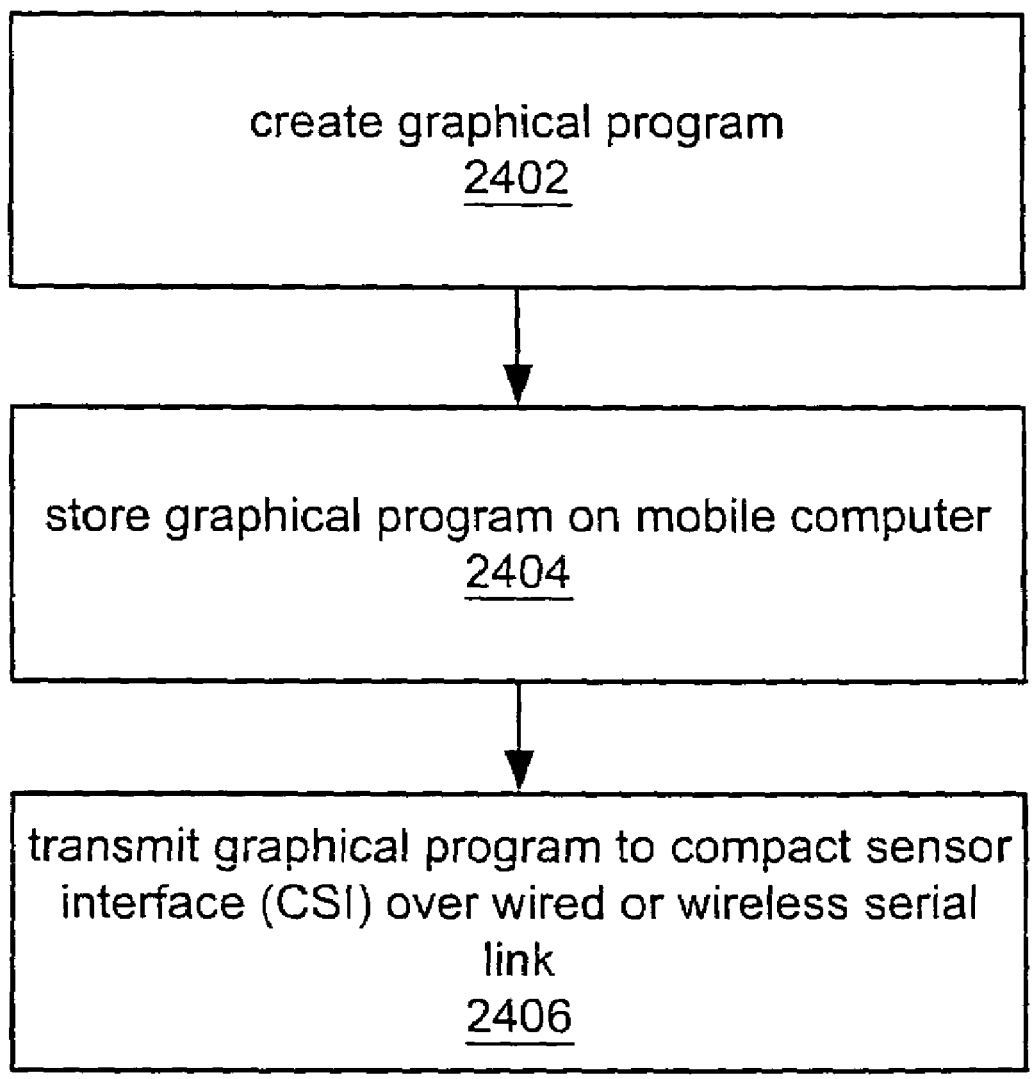
FIG. 24 is a high level flowchart of a method for programming a CSI with a mobile computer.

FIG. 24—High Level Method for Programming a CSI with a Mobile Computer

FIG. 24 is a high level flowchart of one embodiment of a method for programming an embedded device, e.g., a compact sensor interface (CSI), with a mobile computer, e.g., a PDA. Note that in other embodiments, various of the steps described may be performed concurrently, in a different order than shown, or omitted. Additional steps may also be performed as desired.

As FIG. 24 shows, in one embodiment, a graphical program may be created, as indicated in 2402. The graphical program may be created on the mobile computer, or may be created on a different computer system and transmitted to the mobile computer. The mobile computer preferably comprises a Personal Digital Assistant (PDA), although other mobile computers are also contemplated for use, including for example, tablet computers, laptop computers, or other handheld computers, among others.

In 2404, the graphical program may be stored on the mobile computer.

Finally, in 2406, the graphical program may be transmitted from the mobile computer to the embedded device over a serial link, wherein after said transmitting, the embedded device is operable to execute the graphical program to perform the specified function.

In a preferred embodiment, the embedded device comprises a sensor interface, e.g., a compact sensor interface (CSI), as described above. The CSI may include, or may couple to one or more sensors. The serial link may be any of a variety of serial links, e.g., a serial cable, or a wireless serial link, such as, for example, an infrared serial link, e.g., an IrDA serial link. In another embodiment, the wireless serial link may be a Bluetooth serial link.

A more detailed description of the method is provided below with reference to FIG. 25.

Figure 25:
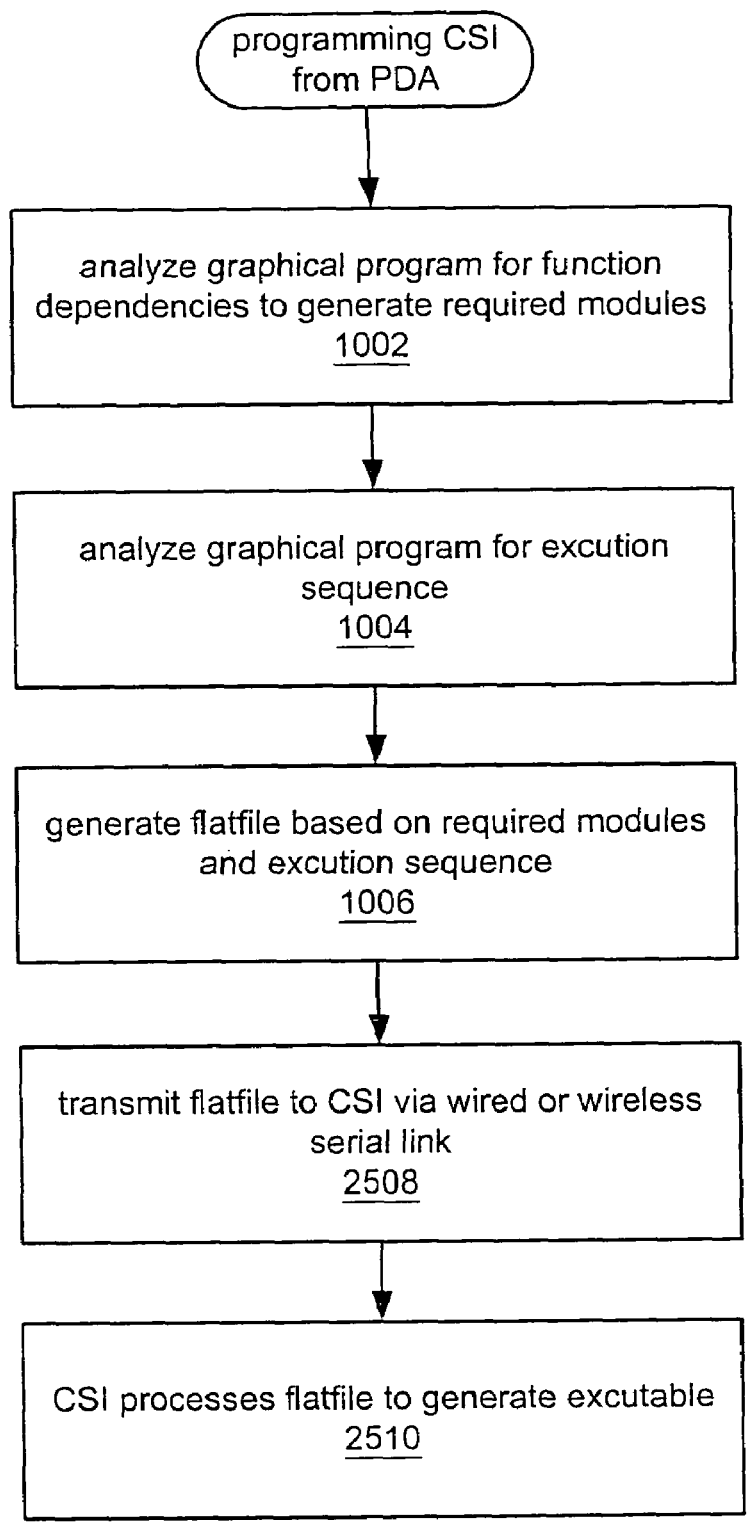
FIG. 25 is a detailed flowchart of the method of FIG. 24, according to one embodiment.

FIG. 25—Method for Programming the CSI from a Mobile Computer

FIG. 25 is a more detailed flowchart of the method of FIG. 24, according to one embodiment. As mentioned above, in various embodiments, one or more of the steps may be performed in a different order than shown, or may be omitted. Additional steps may also be performed as desired. Note that some of the steps are substantially the same as in the method of FIG. 10.

As FIG. 25 shows, in 1002, a graphical program 202 may be analyzed with respect to function dependencies to generate a list or collection of required modules. In other words, a dependency checker residing on the host computer system 102 may determine the functions used in the graphical program, then select modules from the modularized callback system 206 which contain those functions to generate required modules 902.

After (or before or during) the required modules 902 are determined, the graphical program 202 may be analyzed to determine an execution sequence or order of the functions called by the program (or by other functions in the program 202). In other words, the program flow for the graphical program 202 may be determined.

In 1006, the flatfile 207 may be generated based on the required modules 902 and the execution sequence for the program. In one embodiment, the flatfile 207 may be generated by including the required modules 902 in the flatfile 207 along with sequencing information and/or module dependency information. The flatfile contains the functionality of the graphical program. An exemplary structure and format of the generated flatfile 207 is presented above with reference to FIGS. 11A-11C.

In 2508, the flatfile may be transmitted to the embedded device over the serial link.

Finally, in 2510 the embedded device may process the flatfile to generate an executable, after which the embedded device is operable to execute the executable to perform the specified function.

Figure 26:
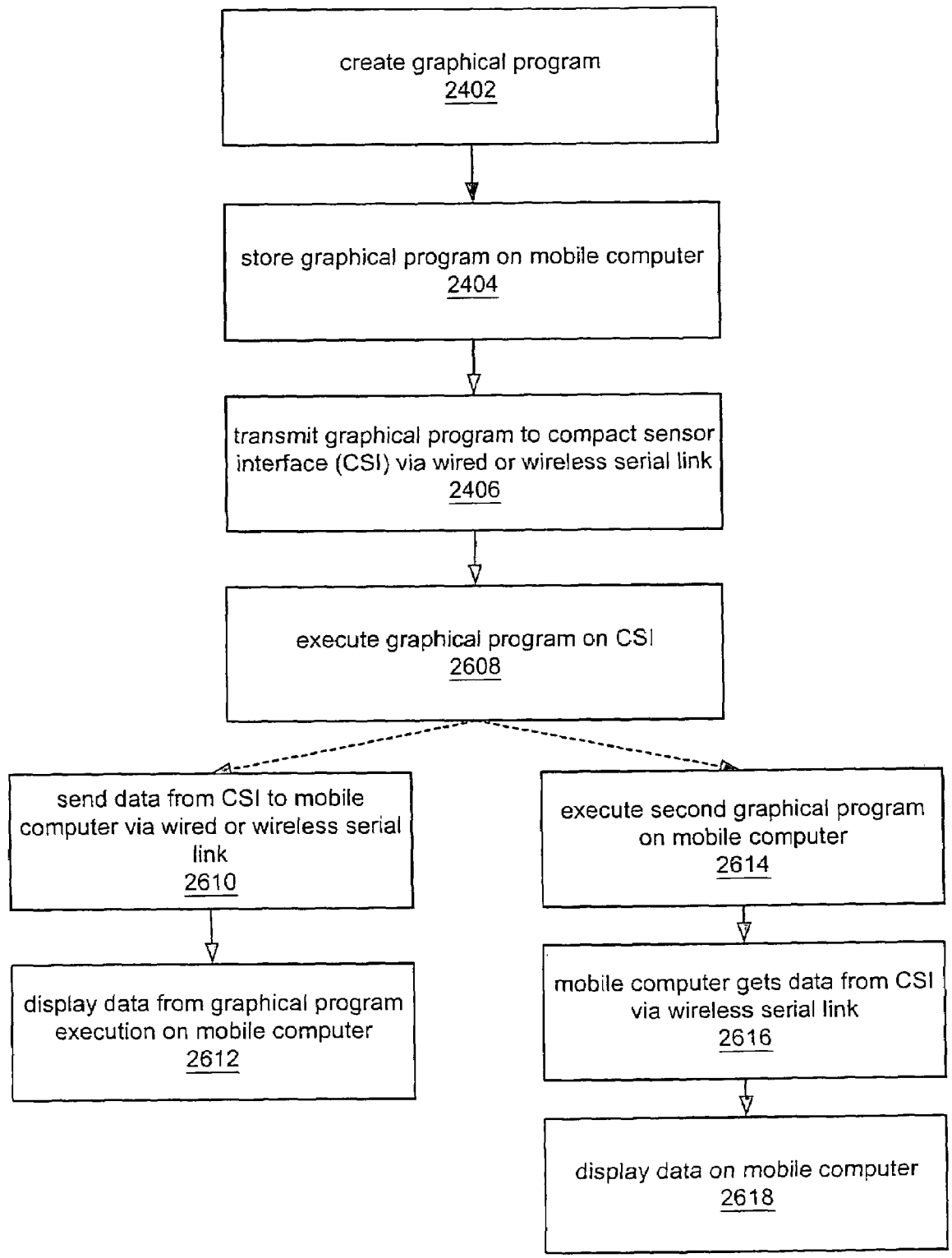
FIG. 26 flowcharts a method for operating a CSI in conjunction with a mobile computer, according to one embodiment.

FIG. 26—Method for Operating a CSI in Conjunction with a Mobile Computer

FIG. 26 flowcharts one embodiment of a method for programming and operating an embedded device, e.g., a compact sensor interface (CSI), with a mobile computer, e.g., a PDA. Note that in other embodiments, various of the steps described may be performed concurrently, in a different order than shown, or omitted. Additional steps may also be performed as desired.

As FIG. 26 shows, in one embodiment, a graphical program may be created, as indicated in 2402. As mentioned above with reference to FIG. 24, the graphical program may be created on the mobile computer, or may be created on a different computer system and transmitted to the mobile computer. As also noted above, the mobile computer preferably comprises a Personal Digital Assistant (PDA), although other mobile computers are also contemplated for use, including for example, tablet computers, laptop computers, or other handheld computers, among others.

In 2404, the graphical program may be stored on the mobile computer.

Then, in 2406, the graphical program may be transmitted from the mobile computer to the embedded device over a serial link, wherein after said transmitting, the embedded device is operable to execute the graphical program to perform the specified function. The serial link may be any of a variety of serial links, e.g., a serial cable, or a wireless serial link, such as, for example, an infrared serial link, e.g., an IrDA serial link. In another embodiment, the wireless serial link may be a Bluetooth serial link.

As indicated in 2608, the embedded device may then execute the graphical program to perform the function. As described above, the embedded device preferably comprises a sensor interface, e.g., a compact sensor interface (CSI), as described above. The CSI may include, or may couple to one or more sensors. Thus, in executing the graphical program, data may be generated.

As indicated in 2610, in one embodiment, the embedded device may send the data to the mobile computer over a wired or wireless serial link, e.g., over a serial cable, an infrared serial link such as IrDA, Bluetooth, etc.

Then, in 2612, the mobile computer may display the data. In a preferred embodiment, the embedded device sending the data to the mobile computer and the mobile computer displaying the data are performed using a Front Panel Protocol via SLIP (Serial Link IP).

Alternatively, as FIG. 26 shows, in one embodiment, a different graphical program may be executed on the mobile computer, as indicated in 2614, where executing the different graphical program may include performing a discovery operation to detect and establish communications with the embedded device.

The mobile computer may then retrieve the data from the embedded device via a wireless serial transmission medium, as indicated in 2616. The wireless serial transmission medium may be an infrared link, e.g., an IrDA serial link, a Bluetooth serial link, or any other type of wireless serial transmission medium.

Finally, the mobile computer may display the data on the mobile computer. For example, the mobile computer may execute a front panel VI that displays the retrieved data, as described above.

Thus, in various embodiments of the present invention, a PDA (or other mobile computer) may send or deploy a graphical program to an embedded device (e.g., a CSI) via different buses, e.g., serial cable or IR link. The embedded device preferably has its own graphical programming environment run-time engine and is capable of running the graphical program deployed from the PDA. The embedded device may be capable of communicating with the PDA via a Front Panel Protocol (FPP) or wireless interface. Alternatively, the entire application program may be stored and executed by the embedded device independent from the PDA, where the embedded device may optionally discover a proximate PDA, and communicate with the PDA over a wireless link, e.g., over an IR link such as IrDA.

Various embodiments further include receiving or storing instructions and/or data implemented in accordance with the foregoing description upon a medium, e.g., a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for programming an embedded sensor device, the method comprising, creating a graphical program, wherein the graphical program specifies a function to be performed by the embedded sensor device, wherein the graphical program comprises a block diagram that includes a plurality of interconnected nodes or icons which visually indicate the functionality of the program, and a graphical user interface (GUI) portion implementing a GUI for displaying information from the program or providing user input to the program, and wherein the embedded sensor device comprises one or more sensors, and wherein the embedded sensor device does not include a display;

storing the graphical program on a personal digital assistant (PDA);

transmitting the block diagram of the graphical program from the PDA to the embedded sensor device over a serial link, wherein the GUI portion of the graphical program is not transmitted to the embedded sensor device, and wherein after said transmitting, the embedded sensor device is operable to execute the block diagram of the graphical program to perform the specified function;

the embedded sensor device executing the block diagram to perform the function, wherein the embedded sensor device executing the block diagram generates data;

the embedded sensor device sending the data to the PDA; and the PDA executing the GUI portion to display the data in the GUI.

2. The method of claim 1, wherein the embedded sensor device comprises a compact embedded sensor device between approximately 3 cm×3 cm and approximately 6 cm×6 cm.

3. The method of claim 1, wherein said creating the graphical program is performed on the PDA.

4. The method of claim 1, wherein the serial link comprises a serial cable.

5. The method of claim 1, wherein the serial link comprises a wireless serial link.

6. The method of claim 5, wherein the wireless serial link comprises an infrared serial link.

7. The method of claim 6, wherein the infrared serial link comprises a short-range infrared serial link.

8. The method of claim 5, wherein the wireless serial link comprises a short-range wireless serial link or an 802.11 serial link.

9. The method of claim 1, further comprising, analyzing the graphical program for function dependencies to generate required modules;

analyzing the graphical program to determine an execution sequence; and generating a flatfile based on the required modules and execution sequence, wherein the flatfile contains the functionality of the block diagram of the graphical program.

10. The method of claim 9, wherein said transmitting the block diagram of the graphical program from the PDA to the embedded sensor device over a serial link comprises, transmitting the flatfile to the embedded sensor device over the serial link.

11. The method of claim 10, further comprising, the embedded sensor device processing the flatfile to generate an executable, wherein, in the embedded sensor device being operable to execute the block diagram of the graphical program to perform the specified function, the embedded sensor device is operable to execute the executable to perform the specified function.

12. The method of claim 1, wherein the embedded sensor device sending the data to the PDA; and the PDA executing the GUI portion to display the data are performed using a Front Panel Protocol.

13. The method of claim 1, wherein said sending the data to the PDA comprises sending the data to the PDA over a serial cable.

14. The method of claim 1, wherein sending the data to the PDA comprises sending the data to the PDA over a wireless serial link.

15. The method of claim 14, wherein the wireless serial link comprises an infrared serial link.

16. The method of claim 14, wherein the infrared serial link comprises a short-range infrared serial link.

17. The method of claim 14, wherein the wireless serial link comprises a short-range wireless serial link or an 802.11 serial link.

18. The method of claim 1, the method further comprising, executing a different graphical program on the PDA, wherein said executing the different graphical program comprises, performing a discovery operation to detect and establish communications with the embedded sensor device;

retrieving the data from the embedded sensor device via a wireless serial transmission medium; and displaying the data on the PDA.

19. The method of claim 18, wherein the wireless serial transmission medium comprises an infrared serial link.

20. The method of claim 19, wherein the infrared serial link comprises a short-range infrared serial link.

21. The method of claim 19, wherein the wireless serial link comprises a short-range wireless serial link or an 802.11 serial link.

22. A computer-accessible memory medium which stores program instructions for programming an embedded sensor device, wherein the program instructions are executable by a personal digital assistant (PDA) to perform, creating a graphical program, wherein the graphical program specifies a function to be performed by the embedded sensor device, wherein the graphical program comprises a block diagram that includes a plurality of interconnected nodes or icons which visually indicate the functionality of the graphical program, and a graphical user interface (GUI) portion implementing a GUI for displaying information from the program or providing user input to the program, and wherein the embedded sensor device comprises one or more sensors, and wherein the embedded sensor device does not include a display;

storing the graphical program on the PDA;

transmitting the block diagram of the graphical program from the PDA to the embedded sensor device over a serial link, wherein the GUI portion of the graphical program is not transmitted to the embedded sensor device, and wherein after said transmitting, the embedded sensor device is operable to execute the block diagram of the graphical program to perform the specified function;

the embedded sensor device executing the block diagram to perform the function, wherein the embedded sensor device executing the block diagram generates data;

the embedded sensor device sending the data to the PDA; and the PDA executing the GUI portion to display the data in the GUI.

23. A system for programming an embedded sensor device, the system comprising, a personal digital assistant (PDA), comprising, a processor;

a memory medium coupled to the processor, wherein the memory medium stores a first portion of a program, a graphical user interface (GUI) portion implementing a GUI of the program, and a plurality of components of a program execution system, wherein the memory medium also stores program instructions executable to analyze the first portion of the program to determine a subset of the plurality of components required for execution of the first portion of the program; and a display coupled to the processor and memory medium; and an embedded sensor device coupled to the computer system via a serial transmission medium, wherein the embedded sensor device comprises, a processor;

a memory medium coupled to the processor, wherein the memory medium stores a minimal execution system; and one or more sensors, coupled to the processor and memory medium, wherein the embedded sensor device does not include a display;

wherein the memory medium of the PDA further stores program instructions which are executable by the processor of the PDA to, transmit the first portion of the program and the subset of the plurality of components to the embedded sensor device over the serial transmission medium wherein the GUI portion of the graphical program is not transmitted to the embedded sensor device;

wherein the minimal execution system is executable by the processor of the embedded sensor device to execute the first portion of the program using the subset of the plurality of components; and wherein the PDA is operable to receive data from the embedded sensor device and execute the GUI portion to display the data on the display in the GUI.

24. A hand-held computer, comprising:

a processor;

a memory medium coupled to the processor, wherein the memory medium stores a graphical program, wherein the graphical program specifies a function to be performed by a sensor interface device, and wherein the graphical program comprises a block diagram that includes a plurality of interconnected nodes or icons which visually indicate the functionality of the graphical program, and a graphical user interface (GUI) portion implementing a GUI for displaying information from the program or providing user input to the program; and a display coupled to the processor and memory medium;

wherein the memory medium further stores program instructions which are executable by the processor to:

analyze the graphical program;

convert the block diagram of the graphical program into a format suitable for transmission over a serial link to the sensor interface device; and transmit the converted block diagram of the graphical program from the hand-held computer to the sensor interface device over the serial link, wherein the GUI portion of the graphical program is not transmitted to the embedded sensor device;

wherein after said transmitting, the sensor interface device is operable to execute the converted block diagram of the graphical program to perform the specified function; and wherein the memory medium further stores program instructions which are executable by the processor to:

receive data from sensor interface device during execution of the converted block diagram of the graphical program; and execute the GUI portion to display the received data on the display in the GUI.

* * * * *

UNITED STATES PATENT AND TRADEMARK OFFICE
CERTIFICATE OF CORRECTION

PATENT NO. : 7,647,562 B2
APPLICATION NO. : 10/733735
DATED : January 12, 2010
INVENTOR(S) : Ghercioiu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1593 days.

Signed and Sealed this

Sixteenth Day of November, 2010

David J. Kappos
*Director of the United States Patent and Trademark Office*